Figure 1A:
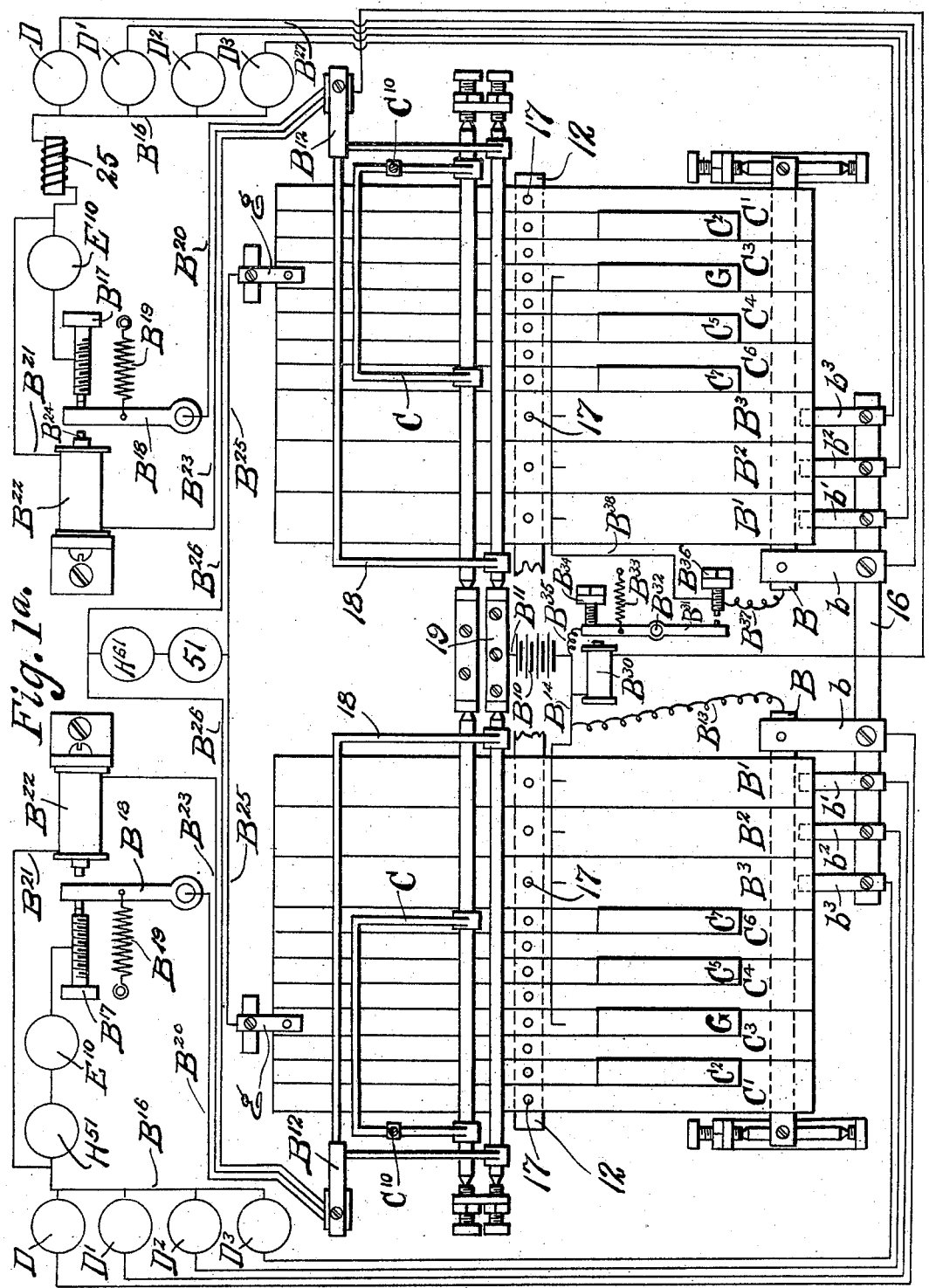

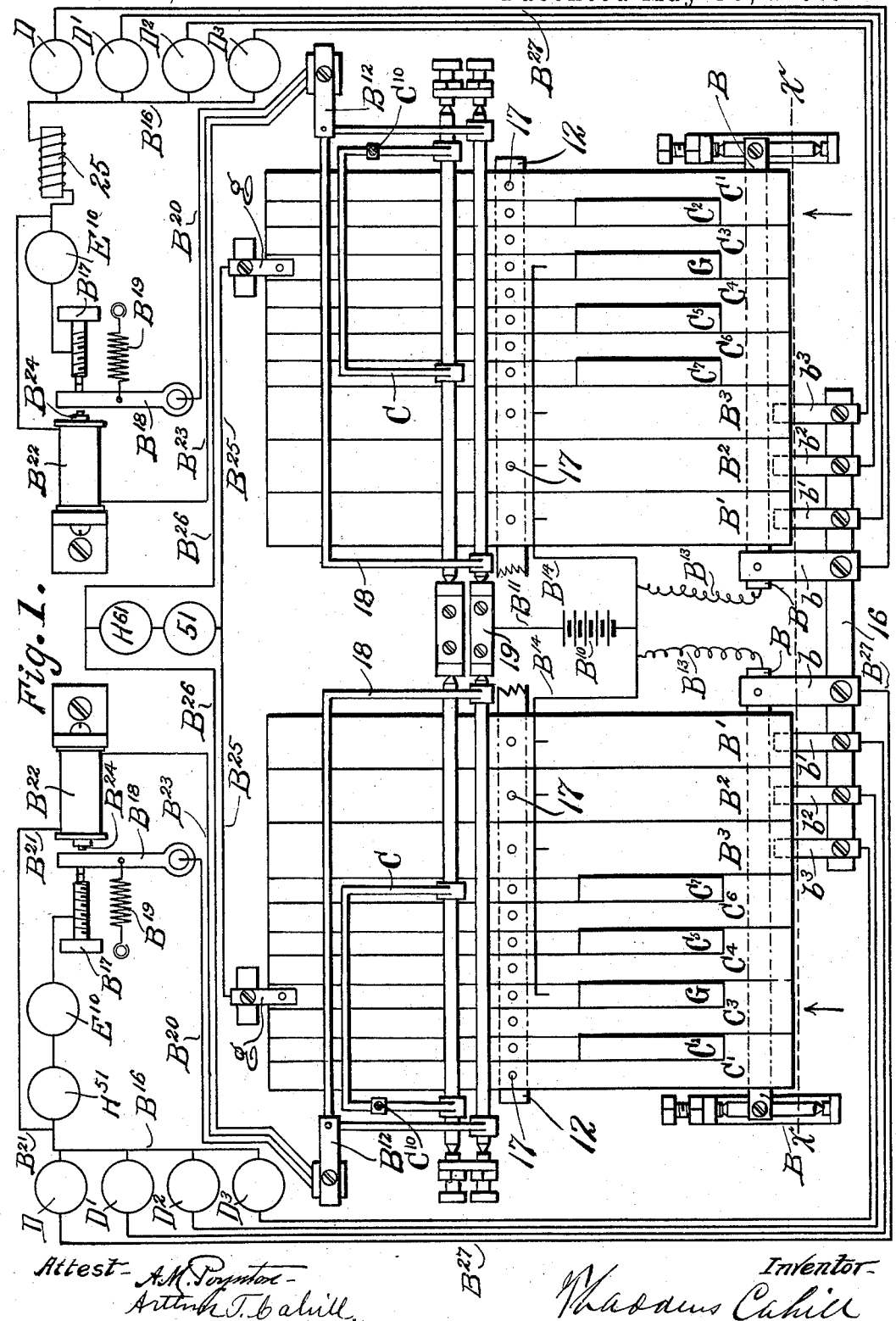

(No Model.)

13 Sheets—Sheet 2.

T. CAHILL.
TYPE WRITING MACHINE, &c.

No. 604,001. Patented May 10, 1898.

Attest. A. M. Poynton. Arthur T. Cahill.

Inventor— Thaddeus Cahill

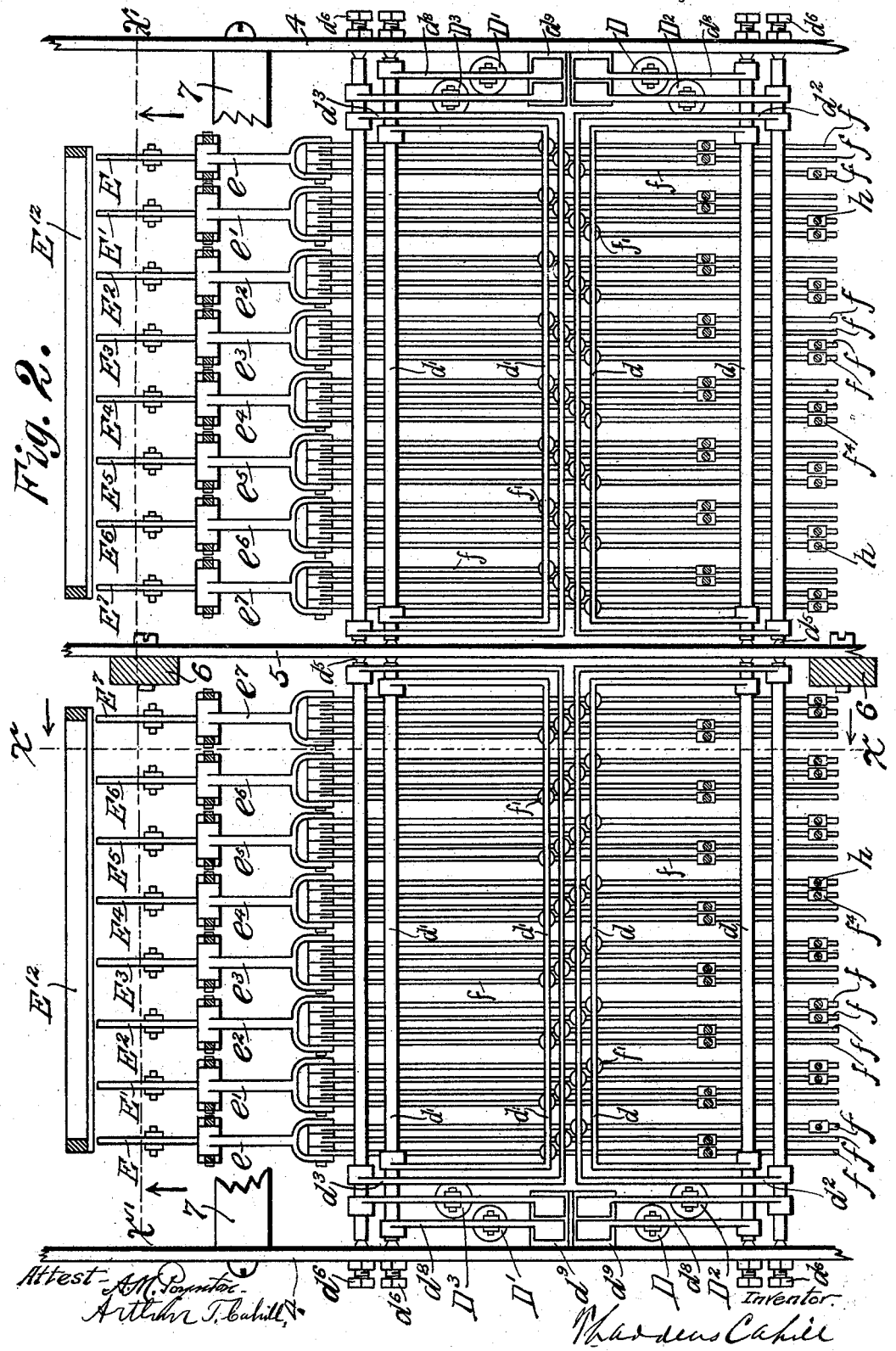

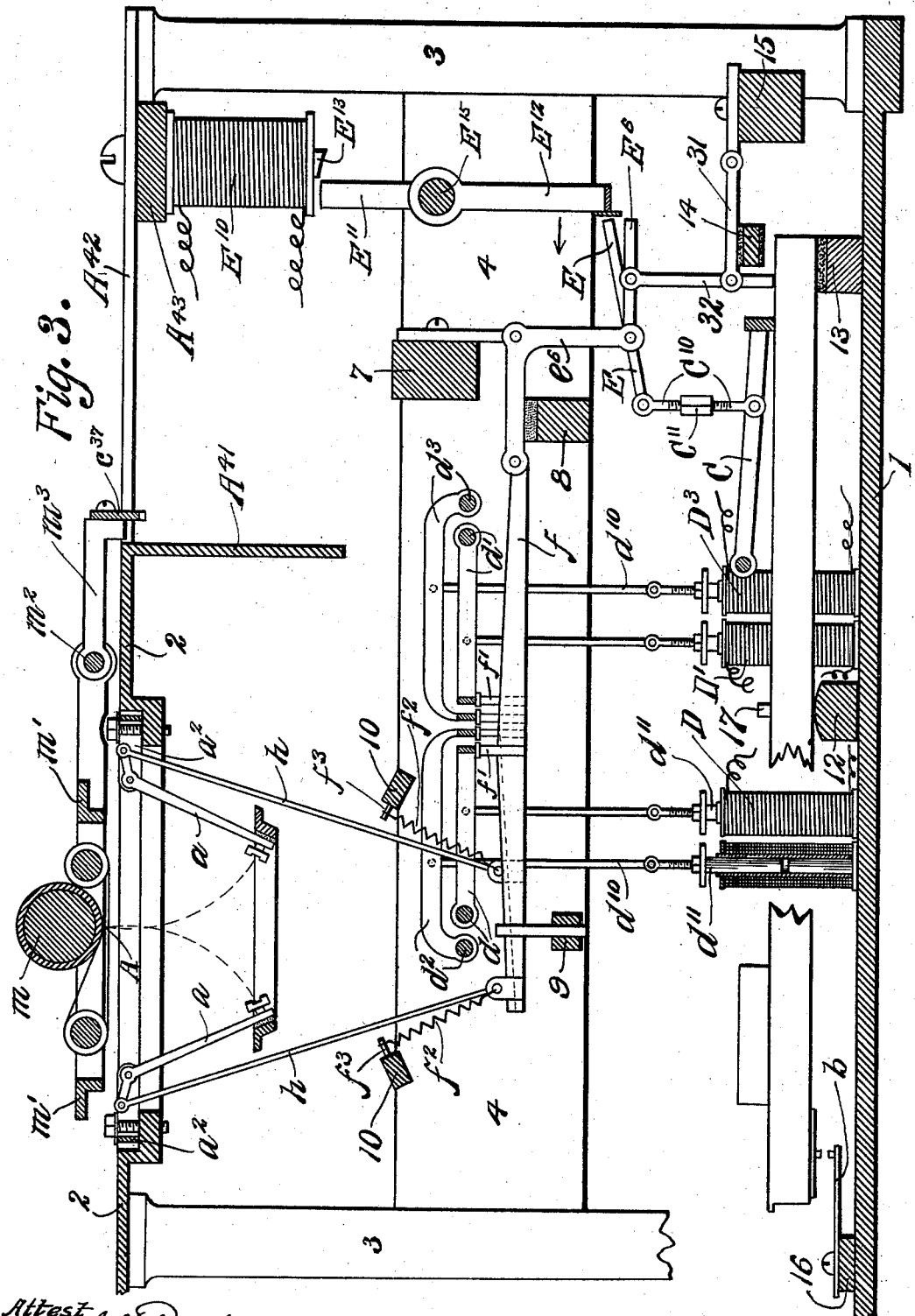

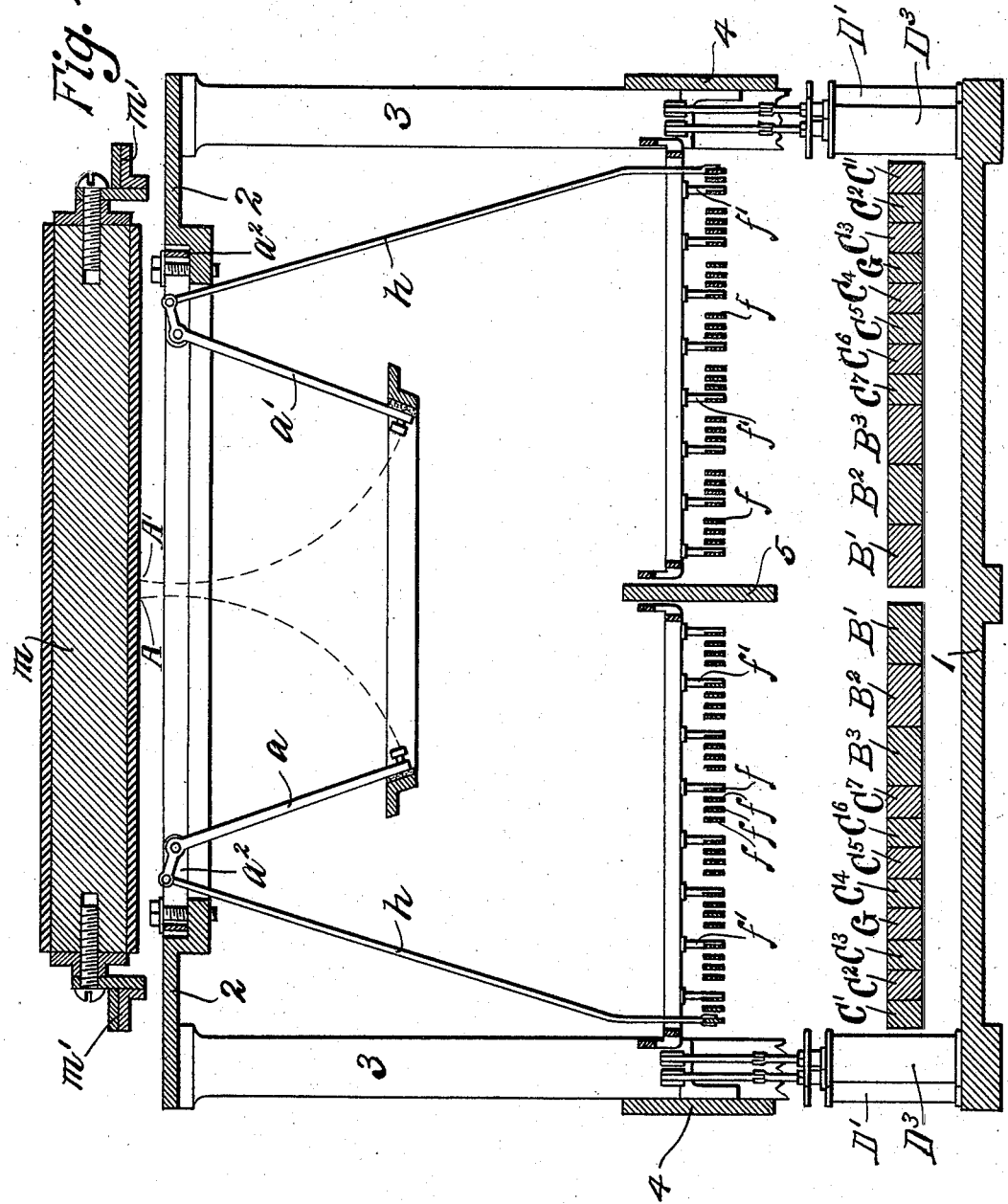

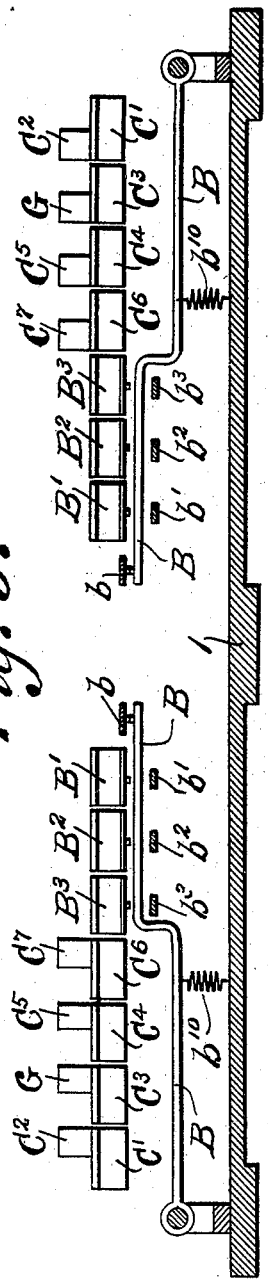

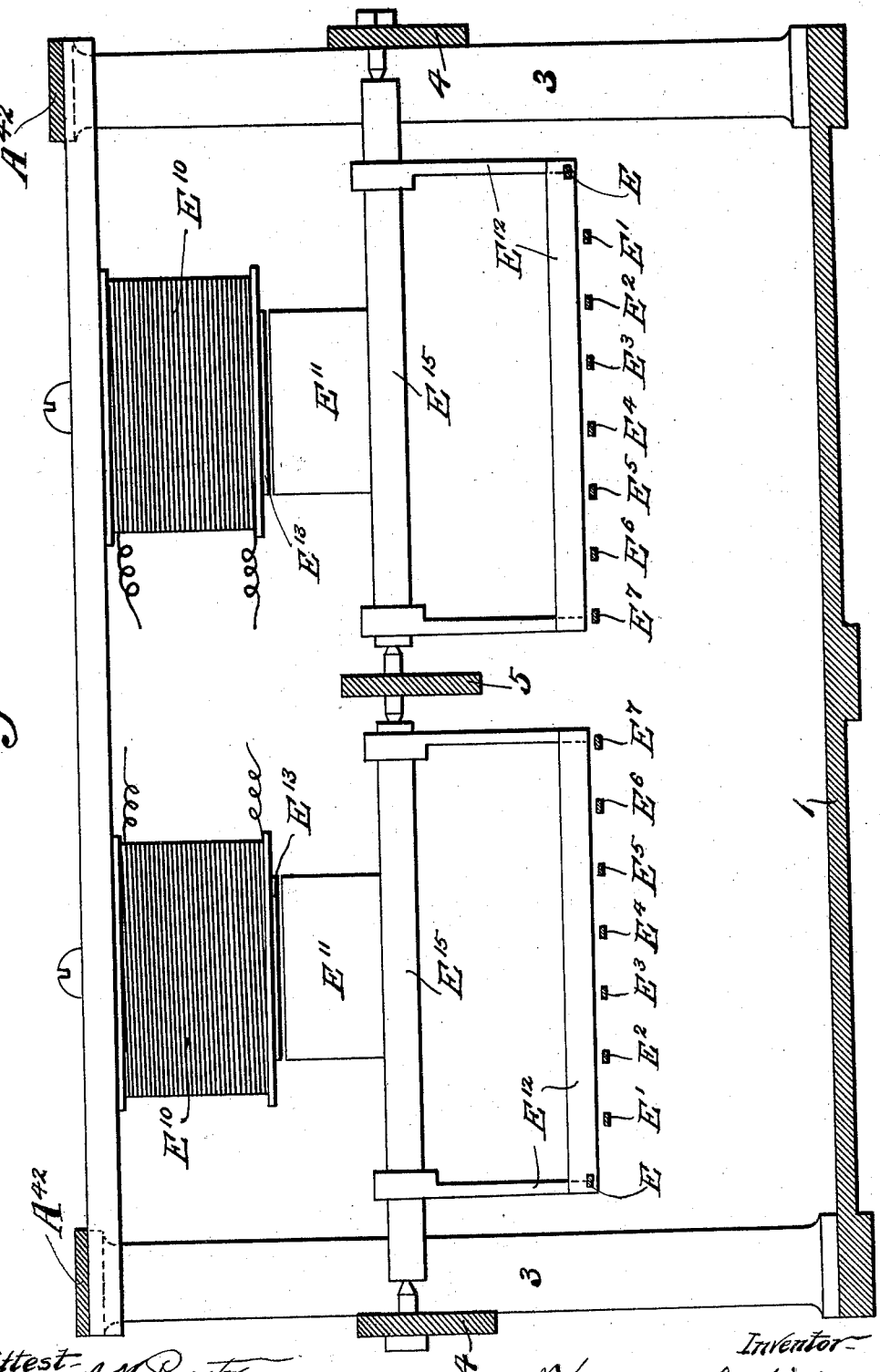

(No Model.)  13 Sheets—Sheet 8.

T. CAHILL.
TYPE WRITING MACHINE, &c.

No. 604,001.  Patented May 10, 1898.

Attest,  
A. M. Poynter.  
Arthur T. Cahill.

Inventor:  
Thaddeus Cahill

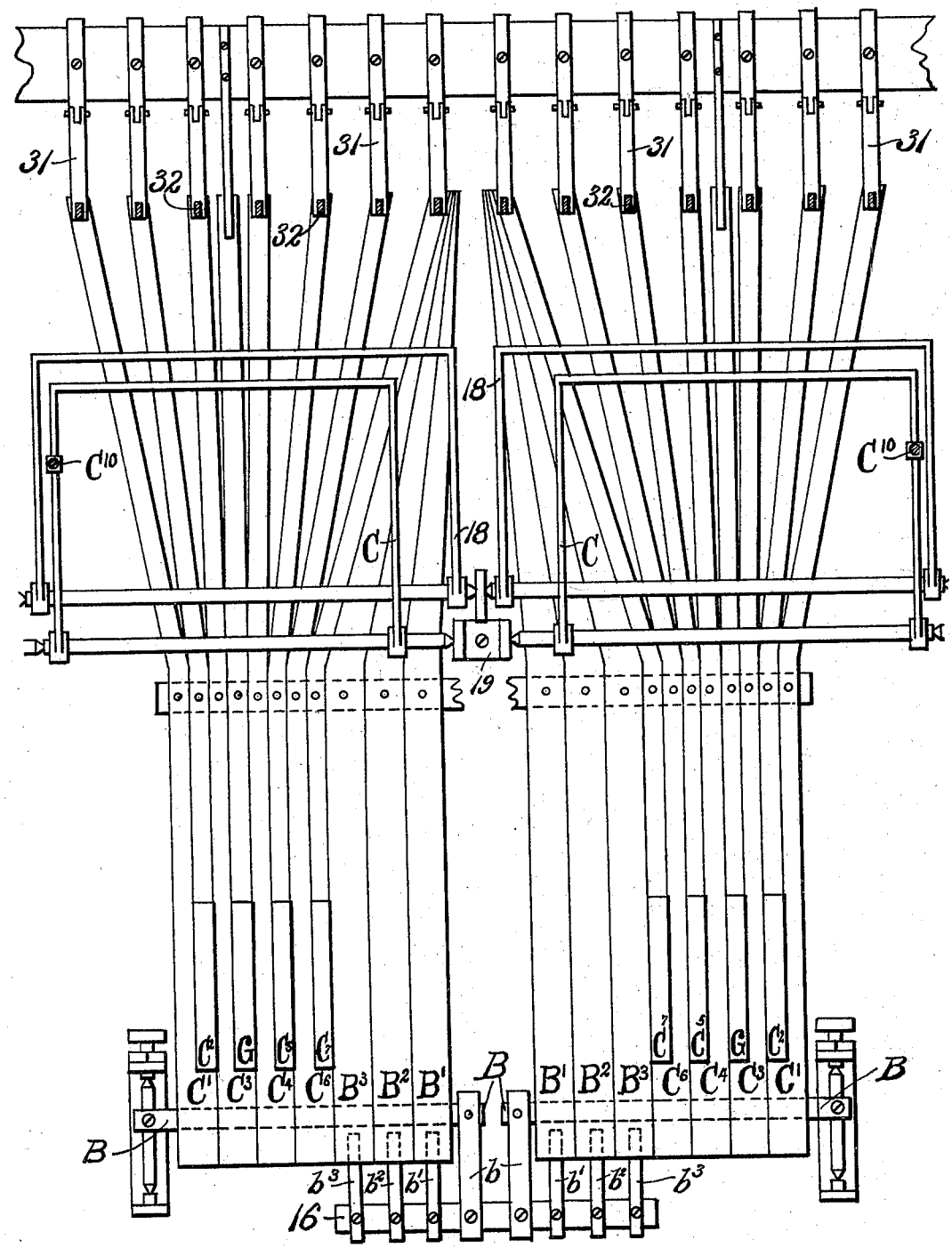

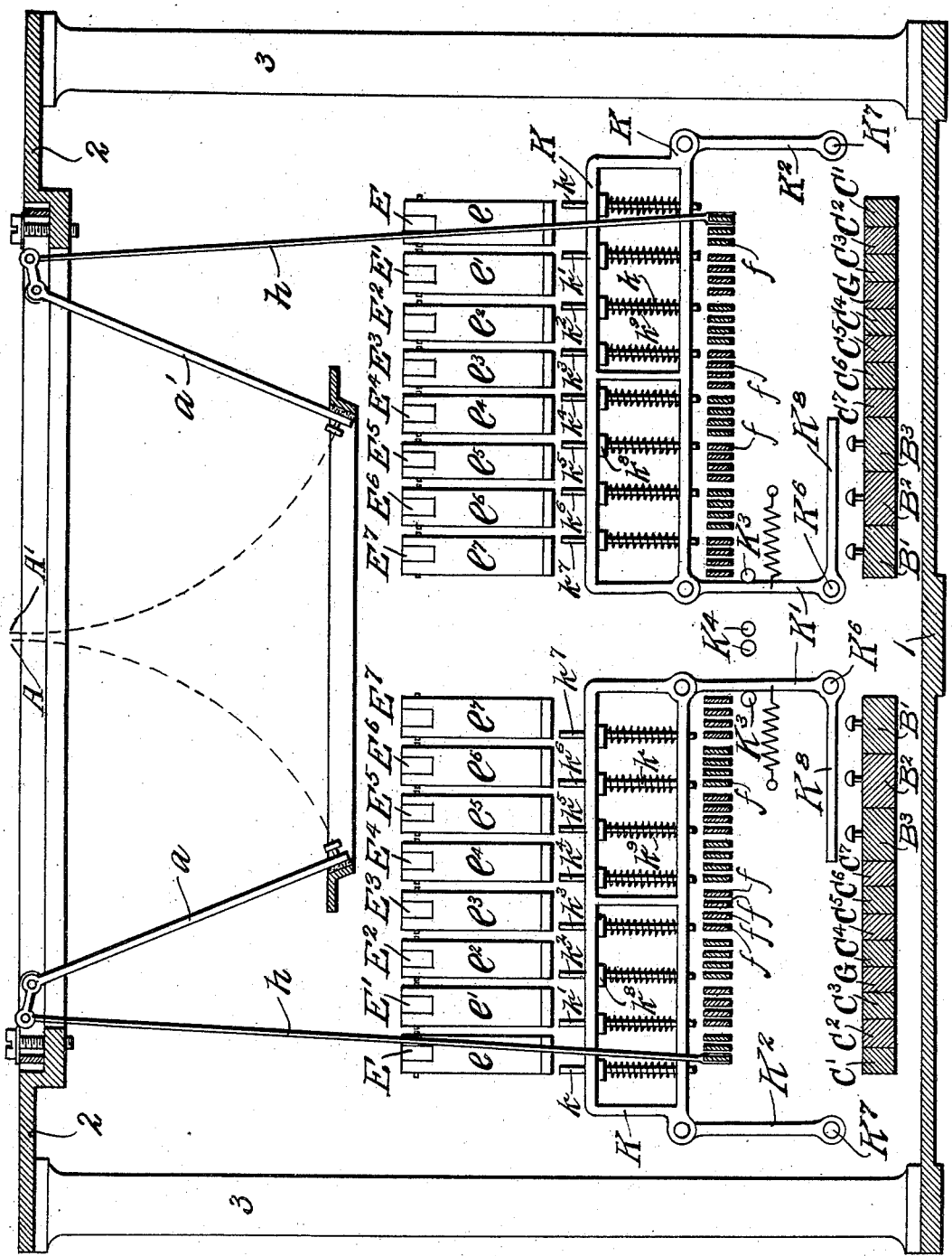

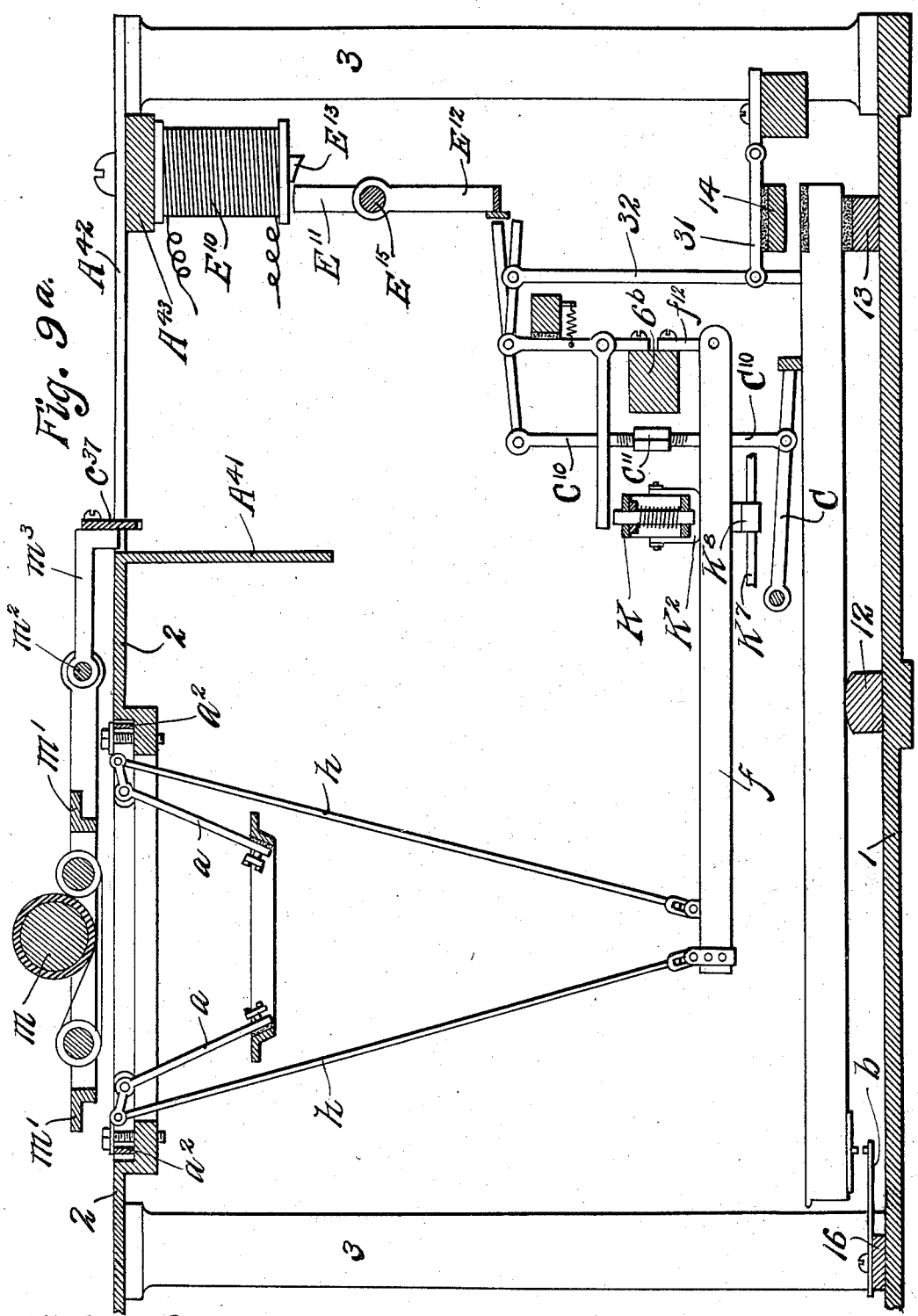

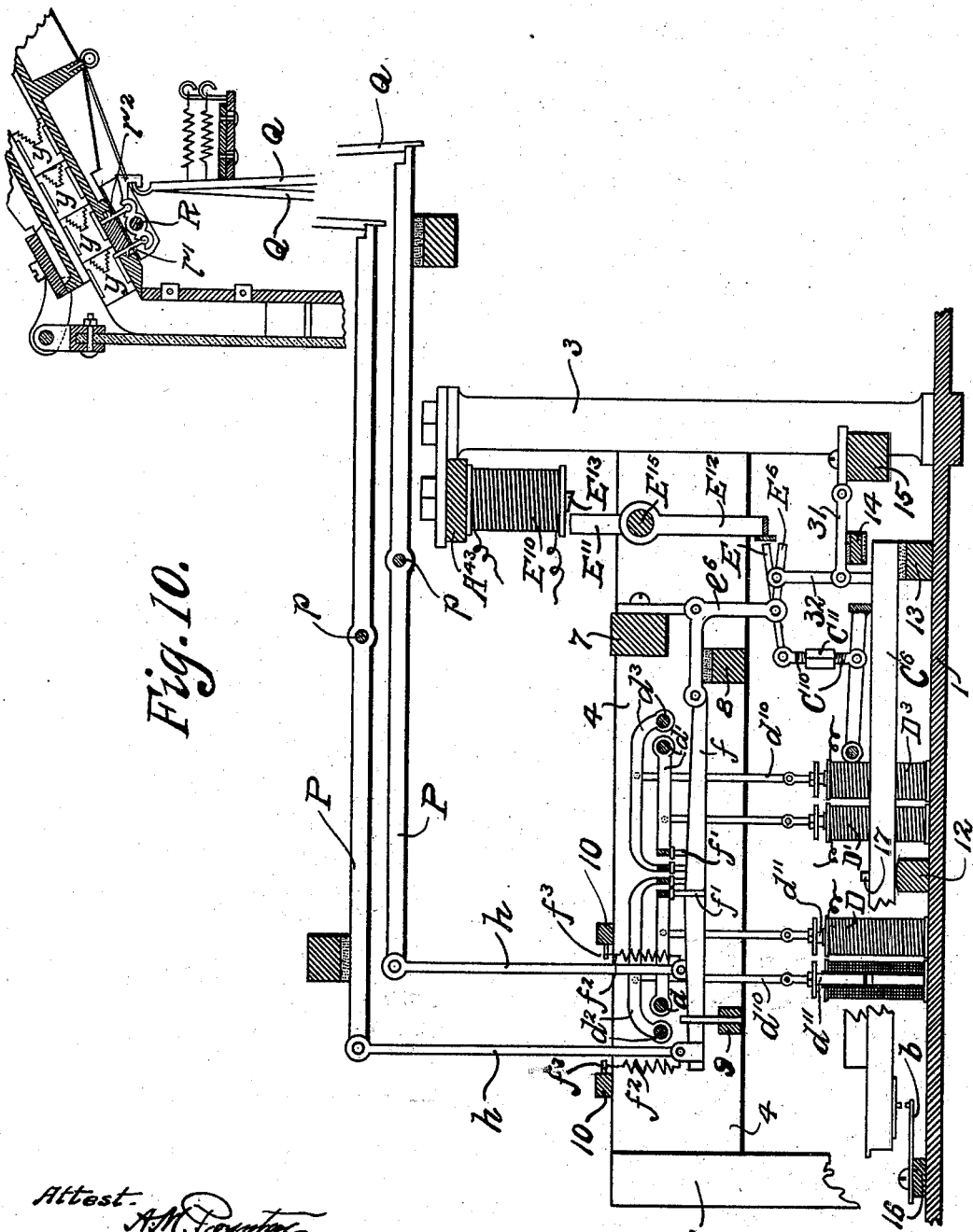

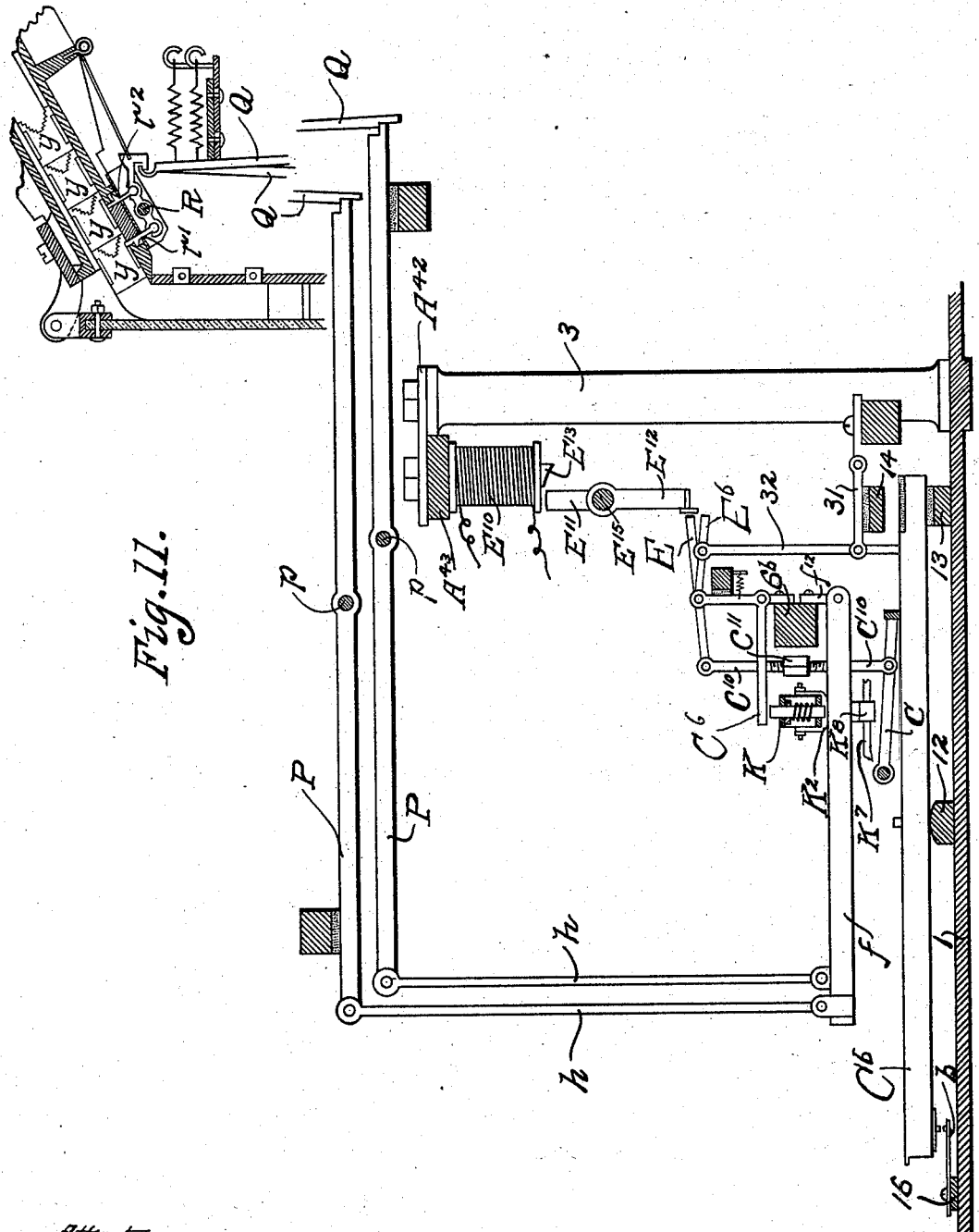

UNITED STATES PATENT OFFICE.

THADDEUS CAHILL, OF NEW YORK, N. Y., ASSIGNOR TO JAMES B. LAMBIE, E. HILTON JACKSON, GEORGE FREDERICK CAHILL, AND ARTHUR T. CAHILL, TRUSTEES.

TYPE-WRITING MACHINE, &c.

SPECIFICATION forming part of Letters Patent No. 604,001, dated May 10, 1898.

Application filed June 19, 1897. Serial No. 641,518. (No model.)

*To all whom it may concern:*

Be it known that I, THADDEUS CAHILL, a citizen of the United States, and a resident of the city, county, and State of New York, but temporarily residing at Washington, in the District of Columbia, have invented certain new and useful Improvements in Type-Writing Machines, Linotyping-Machines, Matrix-Making Machines, Type-Setting Machines, and other Similar Instruments, of which the following is a specification.

The objects of my invention are to increase the ease and rapidity with which work can be done upon machines of the sort hereinbefore mentioned and to increase the simplicity and cheapness of the mechanism; and my invention consists in the parts, improvements, and combinations hereinafter described and claimed.

I shall first describe my invention as applied to a type-writing machine, and after that will point out briefly how it may be applied to type-setting machines, linotyping-machines, matrix-making machines, and other similar instruments.

My invention relates more particularly to two essential features, to wit: (a) to an improved form of permutational letter-selecting device, by means of which a large number of letters are produced by a small number of keys acting singly and in various permutations or combinations, and (b) to means for producing a plurality of letters simultaneously or substantially simultaneously. Both these features belong to the preferred form of machine illustrated in the drawings, but each is capable of being used independently of the other.

Figure 7:
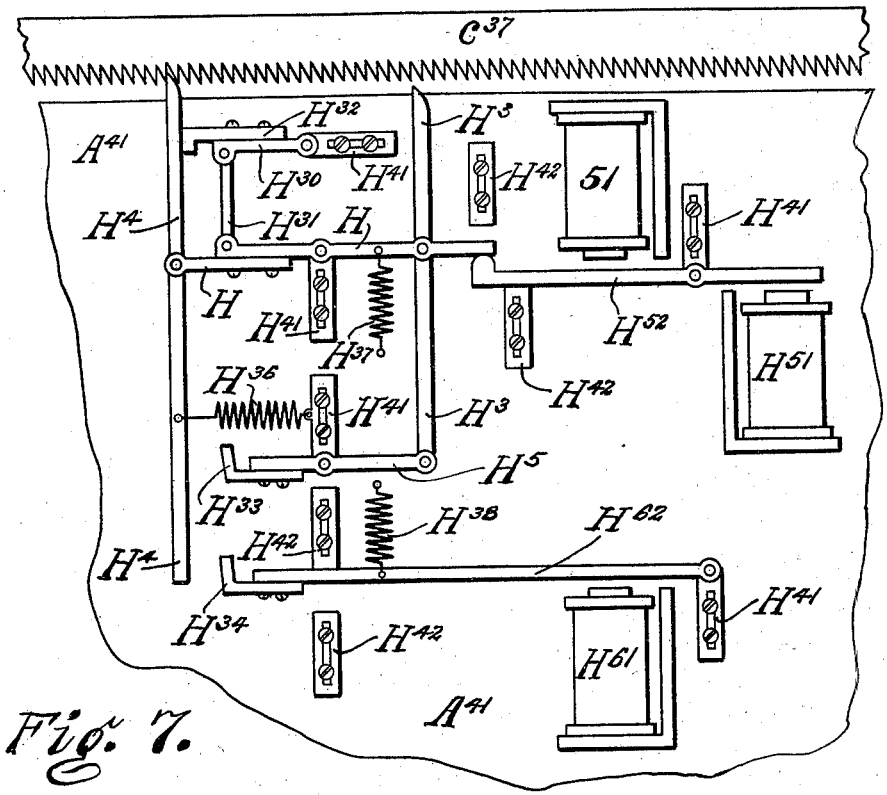

In the accompanying drawings, Figure 1 is a diagrammatic view with the keyboard in plan, illustrating the general scheme of the electrical connections. Fig. 1ª is a view similar to the preceding figure, but illustrating a modified construction. Fig. 2 is a plan view, partly in section, illustrating important portions of the permutational character-selecting mechanism. Fig. 3 is a vertical section, partly in elevation, through the machine on the line $x\ x$ of Fig. 2, illustrating certain essential features of construction. Fig. 4 is a vertical section of the machine, partly in elevation, through the center of the paper-roll and in a plane at a right angle to the plane of the preceding figure, illustrating certain essential features of the construction. Fig. 5 is a detail, a sectional elevation on the line $x\ x$, Fig. 1. Fig. 6 is a detail, a sectional elevational on the line $x'\ x'$, Fig. 2. Fig. 7 is a detail, a rear elevation, illustrating the spacing mechanism, whereby the carriage is advanced from line to line as the printing proceeds. Fig. 8 is a detail, a diagrammatic plan view, illustrating the manner in which the keys are bent or formed back of the fulcrum to bring each one to the proper position to act upon the corresponding one of the push-ups 32 32, hereinafter described, which push-ups, for reasons which will clearly appear when the whole plan of the machine has been illustrated, should stand equidistant or nearly equidistant one from another. Fig. 9, which is a view corresponding to Fig. 4, and Fig. 9ª, which is a view corresponding to Fig. 3, illustrate modified or alternative constructions. Figs. 10 and 11 are views similar, respectively, to Figs. 3 and 9ª, illustrating different forms of my permutational character-selecting mechanism, connected to operate the escapement devices of a linotype-machine, by the action of which escapement devices the matrices corresponding to the different letters and other characters are released, one by one, as required, and left free to fall upon the conveying-belt or equivalent, by which they are carried to the assembling mechanism.

The drawings illustrate the essential features of the construction figured in them without attempting to illustrate all the usual details well known in the art, nor do they attempt to show sizes and proportions of parts. Some of the figures are, indeed, diagrammatic, sacrificing to some extent form and proportion and occasionally even the relative positions of the parts to a clearer illustration of the essentials of the construction. This is particularly true of Figs. 1 and 1ª. Enough, in short, is shown to clearly illustrate the essential features of the construction, and no effort is made to show non-essential details of construction, which are entirely within the range of ordinary mechanical skill and which every constructor varies to suit his own views and the special peculiarities of his machine.

The preferred form of type-writing machine illustrated in Figs. 1 to 8 consists, essentially, of (a) two sets of type-bars, the bars of each set being disposed around an arc and arranged so that they strike to a printing-point common to the bars of such set, the printing-points of the two sets of bars being adjacent to each other upon the same line of writing; (b) two sets of keys controlling the two sets of type-bars above mentioned, the two sets of keys being adapted to be operated simultaneously by the operator for the making of two consecutive letters at the same time, one letter from each set of keys; (c) two permutational letter-selecting devices, one for each set of keys, each such permutational letter-selecting device being controlled by its own set of keys and serving to connect such keys with the corresponding set of type-bars; (e) releasing mechanism whereby the type-bars are left free to return to their normal positions after they have printed their respective letters, notwithstanding the fact that the keys which have caused them to act are still held down by the operator; (f) means whereby the two letters which are produced substantially simultaneously are made to print one a short interval of time in advance of the other, so that the bars of the two sets can print as close together as desired without interfering with each other; (g) a suitable paper-carriage, and (h) spacing mechanism whereby the requisite spaces between the successive letters and words are obtained. The ribbon mechanism, alarm-bell, interlinear-spacing mechanism, and other minor details, of which many forms are well known in the art, no particular one of which is essential to my invention, are not illustrated.

In its functions the apparatus above described is similar to that illustrated in a prior application of mine, filed in the United States Patent Office on or about October 21, 1896, Serial No. 609,489, and when considered in their broad general features there is much similarity between the mechanism herein illustrated and that illustrated in the pending application before mentioned. The principal difference, in fact, between the structure herein illustrated and that illustrated in the pending application before mentioned relates to the construction of the permutational letter-selecting devices, the construction in this case being such that a single motor-magnet for each permutational letter-selecting device takes the place of the set of motor-magnets illustrated in the pending application before mentioned, Serial No. 609,489, filed October 21, 1896.

At the outset I wish it to be clearly understood that in describing the structure illustrated in Figs. 1 to 8 I am describing only the construction of my preferred form of type-writing machine, so as to enable any person skilled in the art to carry out the invention in that mode which I consider as on the whole best, but that I am not setting out the dry essentials of my invention or distinguishing between what is new and what is old, such pointing out of the essentials of the invention and distinguishing between what is new and old being done in the latter part of this specification after the form of device figured in the drawings has been fully explained.

*The main frame.*—The main frame consists, essentially, of a bed-plate 1, a top plate 2, vertical columns 3 3 3 3, attached to the bed-plate and serving to support the top plate 2, side bars 4 4, attached to the vertical posts 3 3, a center rail 5, lying parallel with the side bars 4 4 and midway between them, vertical posts 6 6, attached to the bed-plate and serving to support the center rail 5, and a number of minor parts, as hereinafter described. The top plate 2 is screwed down upon the front pair of columns 3 3, and it is furnished with rearward extensions $A^{42} A^{42}$, which are screwed down upon the rear pair of columns 3 3. A rail $A^{43}$, from which the motor-magnets $E^{10} E^{10}$ depend, is screwed fast to the rearward extensions $A^{42} A^{42}$ of the top plate. Rails 7, 8, 9, 10, and 10, (see particularly Fig. 3,) secured to the side bars 4 4, extend across the machine from right to left. The rail 7 serves to support the flanges or hangers by which certain bell-crank levers $e, e', e^2, e^3, e^4, e^5, e^6$, and $e^7$ belonging to the permutational letter-selecting devices are fulcrumed. The rail 8 is covered on its top with felt, and the horizontal arms of the bell-cranks above mentioned rest normally down upon said felt. The rail 9 serves to carry guide-pins driven fast into it, which hold the front ends of the type-bar-connected levers $f f f$ in their proper places. The rails 10 10 carry pins, to which are attached the upper ends of the contractile springs $f^2 f^2$, whose lower ends are connected with the type-bar-connected levers $f f f$ and serve to hold them in their normal positions. 12 is a rail attached to the bed-plate and extending across it from right to left, into which rail the pins 17 17 are driven, upon which the keys are fulcrumed. The rear ends of the keys rest normally down upon a felt-covered rail 13. A rail 14, covered with felt, lying above the rail 13 and supported by it, serves to arrest the upward movement of the rear ends of the keys when the front ends are depressed by the operator. The guide-levers 31 31, hereinafter described, rest normally down upon the felt-covered top of said rail 14. A rail 15, screwed to the two rear vertical columns 3 3 and extending across the machine from right to left, serves to support flanges by which the guide-levers 31 31, hereinafter described, are hung. An insulating-bar 16, suitably attached to the bed-plate, lying at the front of the machine and extending from right to left, serves to carry the contact-springs $b\ b'\ b^2\ b^3\ b\ b'\ b^2\ b^3$, hereinafter described. To the top plate 2 the various type-bar hangers, the paper-carriage, the motor-spring device for the paper-carriage, the inking-ribbon mechanism, and the alarm-bell device (the last-mentioned three devices not being illustrated in the drawings) may be attached in any suitable manner—say, for example, after the fashion employed in the machine long well known in the art and trade as the "Remington Standard Type-Writer No. 2," or the parts named may be arranged in any other known or suitable manner. The top plate 2 is furnished with a downward-extending part $A^{41}$, to which the spacing mechanism is attached in the manner hereinafter described. Other details of the framework will be described hereinafter.

*The two sets of type-bars.*—I have said that I employ two sets of type-bars, the bars of each set being disposed around an arc and arranged so that they strike to a printing-point common to the set, the printing-points of the two sets of bars being adjacent to each other upon the same line of printing. The construction is illustrated in Figs. 3 and 4, which are sectional views. $a\,a$ are the type-bars of the one set, controlled by the left-hand-operated keys and occupying the left half of the type-bar circle viewed from in front, and $a'\,a'$ are the type-bars of the other set, controlled by the right-hand-operated keys and occupying the right-hand half of the type-bar circle viewed from in front. The dotted lines in Fig. 3, drawn from the type-bars $a\,a$ to the printing-point A, common to such bars, are intended to illustrate the fact that all the bars of a set strike to a printing-point common to all the bars of such set, and the similar dotted lines in Fig. 4, drawn from the type-bars $a\,a'$, (belonging, respectively, to the left-hand and to the right-hand sets of bars,) respectively, to the corresponding printing-points A and A', are intended to illustrate the fact that the printing-points of the two sets of bars are adjacent to each other along the line of printing a distance apart equal to one letter-space, so that when letters are printed simultaneously, one from the set of bars $a$, controlled by the left-hand keys, and the other from the set of bars $a'$, controlled by the right-hand keys, the two letters thus produced substantially simultaneously stand in proper consecutive order upon the line of printing, the letter printed by the bar $a$ standing first in the line and that printed by the bar $a'$ following it in proper order.

*Of the two sets of keys.*—It has been said that there are two sets of keys controlling the two sets of type-bars, the two sets of keys being adapted to be operated simultaneously by the operator for the making of two letters at the same time, one letter from each set of keys. The two sets of keys are similar, so that a description of one set is a description of both sets. Each set, as figured in the drawings, consists of (a) three keys marked, respectively, B', $B^2$, and $B^3$, which with a lever B, controlled by said keys B', $B^2$, and $B^3$, control four frames $d$, $d'$, $d^2$, and $d^3$, hereinafter described, belonging to the permutational selecting device proper to such set of keys; (b) seven keys C', $C^2$, $C^3$, $C^4$, $C^5$, $C^6$, and $C^7$, which with a frame C (controlled by said keys C', $C^2$, $C^3$ $C^4$, $C^5$, $C^6$, and $C^7$) and the motor-magnet $E^{10}$, hereinafter described, control the eight bell-crank levers $e$, $e'$, $e^2$, $e^3$, $e^4$, $e^5$, $e^6$, and $e^7$, hereinafter described, which coact with the four frames $d$, $d'$, $d^2$, and $d^3$, before mentioned, in selecting letters, as hereinafter described, and (c) a space-key G. For convenience sake the keys B', $B^2$, and $B^3$ will sometimes be termed hereinafter the "B-group" keys, and the keys C', $C^2$, $C^3$, $C^4$, $C^5$, $C^6$, and $C^7$ will sometimes be termed hereinafter the "C-group" keys. The keys are preferably arranged somewhat like those of a pianoforte, as illustrated in the drawings. (See Fig. 1.) They may be centered by means of pins 17 17, driven into a fulcrum-bar 12, as in a pianoforte, or they may be fulcrumed in any other suitable manner whatever. The rear ends of the keys rest normally down upon a felt-covered bar 13, Fig. 3. The lever B and the frame C will be described with the electrical connections after the other essential parts of the selecting device have been described.

*Of the permutational selecting devices.*—The function of the permutational selecting devices is to enable a large number of letters to be made by a small number of keys. There are two such selecting devices, one for the right-hand set of keys and the other for the left-hand set of keys. The two devices are similar, so that a description of one is a description of both. (See particularly Figs. 2 and 3.) $d'$, $d^2$, $d^3$, and $d$ are frames corresponding, respectively, to the three keys B', $B^2$, and $B^3$ and the frame B. Said frames, as illustrated in the drawings, may consist each of a center rod or shaft, and a bent side and end portion firmly attached to the center rod, or they may be made of any other suitable form. The center rods are fulcrumed by means of points 5 5, set fast in the center rail 5, and pointed screws $d^6\,d^6$, set in the side bars 4 4 and held in place by lock-nuts. $e'$, $e^2$, $e^3$, $e^4$, $e^5$, $e^6$, $e^7$, and $e$ are bell-crank levers corresponding, respectively, to the keys C', $C^2$, $C^3$, $C^4$, $C^5$, $C^6$, and $C^7$ and the frame C. The frames $d'$, $d^2$, $d^3$, and $d$ are each operated by electromagnets D', $D^2$, $D^3$, and D, hereinafter described, controlled, respectively, by the keys B', $B^2$, $B^3$ and the lever B. The bell-crank levers $e'$, $e^2$, $e^3$, $e^4$, $e^5$, $e^6$, $e^7$, and $e$ are all alike operated by one common electromagnet $E^{10}$, Figs. 3 and 6, each of said bell-cranks being connected with said magnet whenever it requires to be operated. $f\,f\,f$ are levers, Figs. 2 and 3, corresponding to the type-bars of the set which they control, and said levers $f\,f\,f\,f$ are connected each by a pull-down wire $h$, attached to one end of said lever $f$, with the corresponding type-bar. (See Fig. 3.) The other end of each of said levers $f\,f\,f\,f$—that is to say, the end of said lever remote from the end to which the pull-down wire $h$ is connected—is pin-jointed to the horizontal arm of one of the bell-crank levers $e$, $e'$, $e^2$, $e^3$, $e^4$, $e^5$, $e^6$, or $e^7$, four of said levers $f\,f\,f\,f$ being pin-jointed to each of the bell-crank levers $e'$, $e^2$, $e^3$, $e^4$, $e^5$, $e^6$, and $e^7$ and three to the bell-crank lever $e$. The frames $d$, $d'$, $d^2$, and $d^3$ overlie the levers $f\,f$ intermediate the points at which said levers are connected $(a)$ with the frames $e$, $e'$, $e^2$, $e^3$, $e^4$, $e^5$, $e^6$, or $e^7$, as the case may be, and $(b)$ with the pull-down wires $h\,h$, by which said levers are connected, it will be remembered, with the type-bars. Said levers $f\,f\,f\,f$ are operated each by the coacting of some one of the frames $d$, $d'$, $d^2$, and $d^3$ corresponding to the B-group keys and some one of the bell-crank levers $e$, $e'$, $e^2$, $e^3$, $e^4$, $e^5$, $e^6$, and $e^7$ corresponding to the C-group keys, and each different lever $f$ is operated by a different combination of the frames and bell-cranks above mentioned, and every different combination of a frame $d$, $d'$, $d^2$, or $d^3$, as the case may be, and a bell-crank lever $e$, $e'$, $e^2$, $e^3$, $e^4$, $e^5$, $e^6$, or $e^7$, as the case may be, operates a different one of the levers $f\,f$, and thereby a different type-bar. Each of the frames $d$, $d'$, $d^2$, and $d^3$ affects one of the levers $f\,f\,f\,f$, connected with each of the bell-crank levers $e$, $e'$, $e^2$, $e^3$, $e^4$, $e^5$, $e^6$, and $e^7$, (except that the frame $d$, for reasons which will hereinafter appear, does not affect any of the levers $f\,f\,f$ connected with the bell-crank lever $e$,) and in each group of levers $f\,f\,f\,f$ belonging to one of the bell-crank levers $e$, $e'$, $e^2$, $e^3$, $e^4$, $e^5$, $e^6$, or $e^7$ each of the frames $d$, $d'$, $d^2$, and $d^3$ affects a different lever $f$ from what any other one of said frames affects. To this end a projection $f'$ is attached to each of the levers $f\,f$, &c., immediately underneath that one of the frames $d$, $d'$, $d^2$, or $d^3$ which is designed to operate the particular lever $f$ to which such projection is attached. The top surfaces of said projections $f'\,f'$ stand above the top surfaces of the levers $f\,f$ a distance somewhat greater than the maximum movement of said levers $f\,f$ or of the frames $d$, $d'$, $d^2$, and $d^3$ at that point, so that any particular lever in any one of the groups of levers $f\,f$ connected to one of the bell-crank levers $e$, $e'$, $e^2$, $e^3$, $e^4$, $e^5$, $e^6$, or $e^7$ can coact with the corresponding frame $d$, $d'$, $d^2$, or $d^3$, as the case may be, without affecting or being affected by any other of said frames.

In my preferred construction the frames $d$, $d'$, $d^2$, and $d^3$ lie normally with their lower surfaces in close proximity to the upper surfaces of the projections $f'\,f'$, attached to the levers $f\,f$. Contractile springs $f^2\,f^2$, which are attached at one end to the levers $f\,f$ at the points at which said levers are connected with the pull-down wires $h\,h$ and at the other end to pins $f^3\,f^3$, driven into the bars 10 10, (which latter extend across the machine from one of the side bars 4 4 to the other,) serve to pull upwardly upon each of the levers $f\,f$ with a force greater than is required to lift one of the frames $d$, $d'$, $d^2$, or $d^3$. When, therefore, any of the bell-crank levers $e$, $e'$, $e^2$, $e^3$, $e^4$, $e^5$, $e^6$, or $e^7$ are tilted by the action of the magnet $E^{10}$, armature $E^{11}$, and motor-frame $E^{12}$, Figs. 3 and 6, so that the arm of said bell-crank lever connected with the levers $f\,f$ is raised, each of said levers $f\,f$, connected with the bell-crank lever that is tilted, will move upon its point of connection with the pull-down wire $h$ as a fulcrum and will raise that one of the frames $d$, $d'$, $d^2$, or $d^3$ which lies over it (supposing said frame not to be held down by the action of the appropriate magnet D, D', $D^2$, or $D^3$, as the case may be) without at all affecting the pull-down wires $h\,h$ or the type-bars with which said pull-down wires connect the levers $f\,f$; but if when any of the bell-crank levers $e$, $e'$, $e^2$, $e^3$, $e^4$, $e^5$, $e^6$, and $e^7$ are tilted in the manner above described any one of the frames $d$, $d'$, $d^2$, or $d^3$ be held at rest (either by the action of the appropriate magnet D, D', $D^2$, or $D^3$ or in any other suitable manner) such frame so held at rest will give a fulcrum to that one of the levers $f$ lying under it which is raised by the bell-crank lever $e$, $e'$, $e^2$, $e^3$, $e^4$, $e^5$, $e^6$, or $e^7$ that is tilted. Said lever $f$ will move upon its point of bearing on the frame $d$, $d'$, $d^2$, or $d^3$, as the case may be, so held at rest as a fulcrum, and the end of said lever $f$ connected with the pull-down wire $h$ will move down, thus through the pull-down wire $h$ throwing up the corresponding type-bar, so that said type-bar prints its proper character; but the other three frames of the set of frames $d$, $d'$, $d^2$, and $d^3$ which are not held down will be raised lightly by the levers $f\,f\,f$ underlying them, and the type-bars connected with such levers $f\,f\,f$ will be in no wise affected. Thus it will be seen each of the bell-crank levers $e'$, $e^2$, $e^3$, $e^4$, $e^5$, $e^6$, and $e^7$ serves for the printing of four different letters—one by the coacting of the frame $d$ when said frame is held at rest, one by the coacting of the frame $d'$ when said frame is held at rest, another by the coacting of the frame $d^2$ when said frame is held at rest, and a fourth character by the coacting of the frame $d^3$ when said frame is held at rest; but the bell-crank lever $e$ serves for the printing of three characters only—to wit, one by the coacting of the frame $d'$, another by the coacting of the frame $d^2$, and a third by the coacting of the frame $d^3$. In other words, the bell-crank lever $e$, unlike the bell-crank levers $e'$, $e^2$, $e^3$, $e^4$, $e^5$, $e^6$, and $e^7$, and for reasons which will clearly appear hereinafter, has no lever $f$ adapted to coact with the frame $d$. In the preferred construction illlustrated in the drawings electromagnets D', $D^2$, $D^3$, and D, connected with the frames $d'$, $d^2$, $d^3$, and $d$, respectively, (through links $d^{10}$ connecting the armatures $d^{11}$ of said magnets with the arms $d^8$, attached fast to the center rods of the frames aforesaid,) and controlled by the keys B' $B^2$ $B^3$ and the lever B, respectively, serve to hold said frames at rest, each as required, with the magnet-connected arm $d^8$ resting fast down upon the stop $d^9$, so that the frame thus held at rest affords an effective fulcrum to the lever $f$ in moving its type-bar, and the electromagnet $E^{10}$ serves in a manner hereinafter described to operate the bell-crank levers $e'$, $e^2$, $e^3$, $e^4$, $e^5$, $e^6$, $e^7$, and $e$, each as required.

I prefer, as before said, to have the frames $d$, $d'$, $d^2$, and $d^3$ lie in their normal positions, with their lower faces in close proximity to the upper surfaces of the projections $f'$ $f'$ attached to the type-bar-connected levers $f f$, so that when any one of said frames $d$, $d'$, $d^2$, or $d^3$ is held down it furnishes an effective fulcrum for the lever $f$ underlying it raised by the action of the proper bell-crank lever $e$ $e'$ $e^2$, &c., and so that such of said frames $d$, $d'$, $d^2$, and $d^3$ as are not held down are lifted by the raising of those levers $f f f$ lying underneath them which are raised by the action of that one of the bell-crank levers $e$ $e'$ $e^2$, &c., which acts to make a letter; but instead of employing this arrangement the frames $d$, $d'$, $d^2$, and $d^3$ may be made to lie each normally with its lower surface above the top surfaces of the projections $f'$ $f'$ a distance as great as or slightly greater than the distance which such projections $f'$ $f'$ are lifted by the tilting of the bell-crank levers $e$ $e'$ $e^2$, &c., and each of the frames $d$, $d'$, $d^2$, and $d^3$ when it acts for the printing of a letter may be pulled down from such (its normal) position either by an electromagnet, as illustrated in the drawings, or in any other suitable manner, so that it will press down upon the lever $f$ to be operated in the middle at the same time that such lever $f$ is raised at the rear end by the tilting of the corresponding bell-crank lever $e$ $e'$ $e^2$, &c., as the case may be.

It has now been made clear that each different combination of a frame $d$, $d'$, $d^2$, or $d^3$, as the case may be, and a bell-crank lever $e$, $e'$, $e^2$, $e^3$, $e^4$, $e^5$, $e^6$, or $e^7$, as the case may be, actuates a different one of the type-bar-connected levers $f f f$ and a different type-bar, thereby printing a different character. This statement, however, is to be taken subject to the exception that the frame $d$ and the bell-crank lever $e$, for reasons which will clearly appear hereinafter, are not adapted to act together in printing a character, the bell-crank lever $e$ carrying but three of the type-bar-connected levers $f f f$, which serve for the frames $d'$, $d^2$, and $d^3$, respectively, no lever $f$ being furnished by the bell-crank lever $e$ for the frame $d$ to act upon.

*Of the electrical connections, the motor-magnet, and the connections between said motor-magnet and the bell-crank levers E, E', E$^2$, E$^3$, E$^4$, E$^5$, E$^6$, and E$^7$.*—The electromagnets D, D', D$^2$, and D$^3$, as before said, control the frames $d$, $d'$, $d^2$, and $d^3$, respectively, and another electromagnet E$^{10}$ serves to give movement to the bell-crank levers $e$, $e'$, $e^2$, $e^3$, $e^4$, $e^5$, $e^6$, and $e^7$, each as required. The construction of the magnets D, D', D$^2$, and D$^3$ is fully illustrated in the drawings, and will be referred to hereinafter; but it is sufficient for my present purposes to call attention to the fact that each consists, essentially, of (*a*) a fixed core screwed fast to the bed-plate; (*b*) a movable armature connected to the frame $d$, $d'$, $d^2$, or $d^3$ with which such magnet corresponds and which it serves to control, and (*c*) an energizing coil or solenoid wound about a hollow tube, which incloses both the fixed core and the movable armature. When a current is passed through said energizing-coil, the inclosed core and armature become magnetized and attract each other.

The electromagnet E$^{10}$, Figs. 3 and 6, which serves, as before mentioned, to give movement to all of the bell-crank levers $e$, $e'$, $e^2$, $e^3$, $e^4$, $e^5$, $e^6$, and $e^7$, each as required, has a core E$^{13}$, of soft iron, about which the energizing-coil is wound. Said magnet is provided with a lateral approach armature E$^{11}$, fulcrumed by means of a shaft E$^{15}$ and having the motor-frame E$^{12}$ attached fast to it. The effect of energizing any one of the magnets D, D', D$^2$, or D$^3$ is to cause said magnet to pull down upon the corresponding frame $d$, $d'$, $d^2$, or $d^3$, and the effect of energizing the magnet E$^{10}$ is to cause it to attract its armature E$^{11}$, thereby moving the frame E$^{12}$ in the direction of the arrow, Fig. 3, so giving an inward movement to that one of the bell-crank levers $e$, $e'$, $e^2$, $e^3$, $e^4$, $e^5$, $e^6$, or $e^7$ whose tilting piece E, E', E$^2$, E$^3$, E$^4$, E$^5$, E$^6$, or E$^7$ lies in the path of movement of said frame, thereby elevating the horizontal arm of said bell-crank lever and the ends of the type-bar-connected levers $f f f$ connected thereto.

The B-group keys control the magnets D, D', D$^2$, and D$^3$, and the C-group keys, acting upon the push-pieces 32 32, serve to actuate the tilting pieces E, E', E$^2$, E$^3$, E$^4$, E$^5$, E$^6$, and E$^7$, thereby connecting the different bell-crank levers $e$, $e'$, $e^2$, $e^3$, $e^4$, $e^5$, $e^6$, and $e^7$ with the motor-frame E$^{12}$, each as required. A separate key might obviously be employed for each of the magnets D, D', D$^2$, and D$^3$, and another separate key for each of the tilting pieces E, E', E$^2$, E$^3$, E$^4$, E$^5$, E$^6$, and E$^7$, in which case no letter could be printed except by the simultaneous depressing of two keys, for no key acting singly would affect a type-bar. I have, however, contrived things in such a manner that a number of the most frequently-occurring letters of the alphabet (ten with the construction illustrated in the drawings, constituting about seventy-six per cent. of running letters) can be printed by the action of a single key, the other characters being produced by the simultaneous depressing of two keys. I employ in the construction figured in the drawings (*a*) three keys B', B$^2$, and B$^3$, which serve to close the circuits, respectively, of the magnets D', D$^2$, and D$^3$; (*b*) seven keys C', C$^2$, C$^3$, C$^4$, C$^5$, C$^6$, and C$^7$, which serves to throw the tilting pieces E', E$^2$, E$^3$, E$^4$, E$^5$, E$^6$, and E$^7$, respectively, in the path of motion of the motor-frame $E^{12}$, thereby connecting the bell-crank levers $e'$, $e^2$, $e^3$, $e^4$, $e^5$, $e^6$, and $e^7$, each as required, with the motor-frame $E^{12}$; (c) a lever B, lying underneath the keys $B'$, $B^2$, and $B^3$, which serves to close the circuit of the magnet D when any of the keys $C'$, $C^2$, $C^3$, $C^4$, $C^5$, $C^6$, or $C^7$ is depressed and when no one of the keys $B'$, $B^2$, or $B^3$ is depressed, which lever B is acted upon by each of the keys $B'$, $B^2$, and $B^3$ when depressed, so that it breaks the circuit of its magnet D about the instant that the key $B'$, $B^2$, or $B^3$ depressed closes the circuit of the magnet $D'$, $D^2$, or $D^3$ corresponding to it, and (d) I employ a frame C, (seen in sectional elevation in Fig. 3 and in plan diagrammatically in Fig. 1,) lying above the keys $C'$, $C^2$, $C^3$, $C^4$, $C^5$, $C^6$, and $C^7$, back of their fulcrums, which serves to control the tilting piece E, connected with the bell-crank lever $e$, which said tilting piece E lies normally in the path of movement of the motor-frame $E^{12}$, so that said motor-frame cannot move under the influence of the magnet $E^{10}$ and armature $E^{11}$ when one of the keys $B'$, $B^2$, or $B^3$ is depressed and no one of the keys $C'$, $C^2$, $C^3$, $C^4$, $C^5$, $C^6$, or $C^7$ is depressed without giving movement to the bell-crank lever $e$; but when any of the keys $C'$, $C^2$, $C^3$, $C^4$, $C^5$, $C^6$, or $C^7$ is depressed (whereby the corresponding one of the tilting pieces $E'$, $E^2$, $E^3$, $E^4$, $E^5$, $E^6$, and $E^7$ is thrown into the path of movement of the motor-frame $E^{12}$, so that the corresponding bell-crank lever $e'$ $e^2$ $e^3$, &c., is moved by said motor-frame) such key in rising back of the center raises the frame C, overlying all said keys $C'$, $C^2$, $C^3$, $C^4$, $C^5$, $C^6$, and $C^7$, and the frame C through the link $C^{10}$ (which is formed of two parts joined together by an adjustment-coupling $C^{11}$) rocks the tilting piece E down out of the path of movement of the motor-frame $E^{12}$, so that said motor-frame can move under the influence of the magnet $E^{10}$ and give movement to the tilting piece $E'$, $E^2$, $E^3$, $E^4$, $E^5$, $E^6$, or $E^7$, as the case may be, thrown into its path of motion by the C-group key depressed, without at all affecting the tilting piece E or bell-crank lever $e$. There is also a space-key G, as before mentioned, and there is a rocking frame 18 lying across all the keys, both those of the B group and those of the C group, which serves, when raised by the depressing of any key, to close the otherwise open battery-circuit; and by "depressing a key," it may be well to say here, is meant the pressing down of the front end of it by the operator, which of course causes the rear part of the key which the frame 18 overlies to rise, thereby raising the frame 18 before mentioned.

Let us now consider the arrangement of the electrical circuits more in detail. (See particularly the diagrammatic view, Fig. 1.) The electrical connections for the two sets of keys are for the most part exactly alike. I shall first describe the connections of the left-hand set of keys and after that will describe the connections of the right-hand set of keys.

$B^{10}$ is a battery (or other suitable source of electrical current) one pole of which is connected by a wire $B^{11}$ with the metal standard 19, which supports one end of each of the metal frames 18 18 and is electrically connected with each of said frames. Overlying each of the frames 18 18 is a contact-spring $B^{12}$, which is insulated from the bed-plate. Each of the frames 18 18 is normally out of connection with the corresponding contact-spring $B^{12}$, but comes in contact therewith when any of the keys underlying it is acted upon by the operator. On the depressing, then, of any one of the keys it will be seen one pole of the battery $B^{10}$ is brought into electrical connection with the contact-spring $B^{12}$, overlying the frame 18. The other pole of said battery $B^{10}$ is connected by a wire $B^{13}$ with the lever B and by a wire $B^{14}$ with the keys $B'$, $B^2$, $B^3$, and G. For the sake of greater convenience of description and illustration we may suppose said keys $B'$, $B^2$, $B^3$, and G to be themselves conducting and to be insulated from the bed-plate, the main frame, the frame 18, &c. If any C-group key be depressed and no B-group key be depressed at the same time, the current will flow from the battery $B^{10}$ through the wire $B^{13}$ to the lever B, and from said lever to the contact-spring $b$, against which the lever B is normally pressed by a light spring $b^{10}$, (see Fig. 5,) and from the contact-spring $b$ the current will flow through the wire $B^{27}$ to the magnet D and through the winding of the magnet D to the trunk-wire $B^{16}$, where the current divides, the principal part of it passing through the space-magnet $H^{51}$ and the motor-magnet $E^{10}$, which are of relatively low resistance, to the adjustable contact-screw $B^{17}$, lever $B^{18}$, (which is of soft iron and is held by the contractile spring $B^{19}$ normally in contact with the screw $B^{17}$,) and thence back by the wire $B^{20}$, contact-spring $B^{12}$, conducting-frame 18, conducting-standard 19, and wire $B^{11}$ to the other pole of the battery $B^{10}$ aforesaid. A smaller portion of the current passes from the trunk-wire $B^{16}$ before mentioned through the branch wire $B^{21}$ to the releasing-magnet $B^{22}$, and thence back by the wire $B^{23}$, contact-spring $B^{12}$, conducting-frame 18, conducting-standard 19, and wire $B^{11}$ to the battery $B^{10}$. The function and operation of the releasing-magnet will be described hereinafter.

The arrangement of the circuits being as above described, it will be understood that if any C-group key be depressed without any B-group key being depressed at the same time the effect will be that the current will flow from the battery $B^{10}$ to the magnet D and from said magnet D through the space-magnet $H^{51}$, motor-magnet $E^{10}$, releasing-magnet $B^{22}$, and other parts above described back to the battery $B^{10}$. The keys $B'$, $B^2$, and $B^3$, which we have already seen are each connected with one pole of the battery $B^{10}$ by the wire $B^{14}$, each serves when depressed (a) to break the connection between the battery $B^{10}$ and the magnet D, moving the lever B down away from the contact-spring $b$, and (b) to close the circuit of said battery $B^{10}$ through the corresponding contact-piece $b'$, $b^2$, or $b^3$ and its own proper magnet $D'$, $D^2$, or $D^3$ to the trunk-wire $B^{16}$, from which the current flows, as before described, through the space-magnet $H^{51}$, motor-magnet $E^{10}$, releasing-magnet $B^{22}$, and other parts before described back to the other pole of said battery $B^{10}$. The key B' when depressed establishes connection between the battery $B^{20}$ and the contact-piece $b'$, which latter is connected with the trunk-wire $B^{16}$ through the magnet $D'$. Key $B^2$ when depressed establishes connection between the battery $B^{10}$ and the contact-spring $b^2$, which latter is connected with the trunk-wire $B^{16}$ through the magnet $D^2$, and the key $B^3$ when depressed makes connection between the battery $B^{10}$ and the contact-piece $b^3$, which latter is connected with the trunk-wire $B^{16}$ through the magnet $D^3$. Each of the keys $B'$, $B^2$, and $B^3$ when depressed sends the current from the battery through its own magnet $D'$, $D^2$, or $D^3$ to the trunk-wire $B^{16}$, from which the current flows through the space-magnet $H^{51}$, motor-magnet $E^{10}$, releasing-magnet $B^{22}$, and other parts before described back to the other pole of said battery $B^{10}$.

If then, it will be seen, any one of the C-group keys be depressed, no one of the B-group keys being depressed at the same time, the current at the same time that it flows through the space-magnet $H^{51}$, motor-magnet $E^{10}$, and releasing-magnet $B^{22}$ will flow through the magnet D, which, becoming energized, will hold the frame $d$ firmly in its normal position, thereby affording a fulcrum to that one of the levers $fff$ which is adapted to engage with the frame $d$ among the levers $ffff$ carried by the particular bell-crank lever $e'$, $e^2$, $e^3$, $e^4$, $e^5$, $e^6$, or $e^7$, according to the key depressed, to which movement is given by the motor-magnet $E^{10}$; but if any one of the keys $B'$, $B^2$, or $B^3$ be depressed the current, instead of flowing through the magnet D, which controls the frame $d$, will flow through the magnet $D'$, $D^2$, or $D^3$, as the case may be, according to whether the key B' or the key $B^2$ or the key $B^3$ is depressed, and the frame $d'$, $d^2$, or $d^3$, corresponding to the magnet $D'$, $D^2$, or $D^3$ through which the current flows, will be held firmly in its normal position, so as to afford a fulcrum to that particular one of the levers $ffff$ which is adapted to engage with said frame among the levers $ffff$ carried by the particular bell-crank lever $e$, $e'$, $e^2$, $e^3$, $e^4$, $e^5$, $e^6$, or $e^7$, according to the key depressed, to which movement is given by the motor-magnet $E^{10}$.

In brief, if a C-group key be depressed and no B-group key be depressed at the same time, the current will flow through the magnet D, which controls the frame $d$. If the key B' be depressed, the current will flow instead through the magnet $D'$, which controls the frame $d'$. If the key $B^2$ be depressed, the current will flow instead through the magnet $D^2$, which controls the frame $d^2$, and if the key $B^3$ be depressed the current will flow instead through the magnet $D^3$, which controls the frame $d^3$.

Whatever key be depressed it will be seen the current flows through the motor-magnet $E^{10}$. Said motor-magnet $E^{10}$, becoming energized by the passage of the current, attracts its armature $E^{11}$, thereby swinging the motor-frame $E^{12}$ on the shaft $E^{15}$ as a center in the direction of the arrow, Fig. 3.

The tilting pieces $E'$, $E^2$, $E^3$, $E^4$, $E^5$, $E^6$, and $E^7$, Figs. 2, 3, and 6, which are connected, respectively, with the keys $C'$, $C^2$, $C^3$, $C^4$, $C^5$, $C^6$, and $C^7$, and also, respectively, with the bell-crank levers $e'$, $e^2$, $e^3$, $e^4$, $e^5$, $e^6$, and $e^7$, lie when in their normal positions out of the path of movement of the motor-frame $E^{12}$, while the tilting piece E, connected with the frame C and the bell-crank $e$, lies normally in the path of movement of said motor-frame $E^{12}$; but if any of the C-group keys be depressed (whether a B-group key be depressed at the same time or not) the C-group key depressed will, as before said, (a) raise the frame C, thus moving the tilting piece E, connected with said frame and with the bell-crank lever $e$, down out of the path of movement of the motor-frame $E^{12}$, and will at the same time (b) throw the tilting piece $E'$, $E^2$, $E^3$, $E^4$, $E^5$, $E^6$, or $E^7$ corresponding to itself up into the path of movement of said motor-frame, so that said motor-frame will give movement to the particular bell-crank lever $e'$, $e^2$, $e^3$, $e^4$, $e^5$, $e^6$, or $e^7$ corresponding to the C-group key depressed, raising the horizontal arm of said bell-crank and the rear ends of the levers $ff$ $ff$, pin-jointed to it. Some one of said levers $ffff$ (to wit, the one adapted to engage with the frame $d$ if no B-group key be depressed, the one adapted to engage with the frame $d'$ if the key B' be depressed, the one adapted to engage with the frame $d^2$ if the key $B^2$ be depressed, and the one adapted to engage with the frame $d^3$ if the key $B^3$ be depressed) will find a fulcrum in one of the frames $d$, $d'$, $d^2$, or $d^3$, and will in consequence give movement to the type-bar with which it is connected, throwing said type-bar to the printing-point, while the rest of said levers $ffff$ will rise, moving lightly upon their points of connection with the pull-downs $hh$ as fulcrums and lifting the frames $d$, $d'$, $d^2$, or $d^3$ overlying them without at all affecting the type-bars with which they are connected.

To again briefly recapitulate, if a C-group key be depressed and no B-group key be depressed simultaneously with it the current flows through the magnet D, and the frame $d$, controlled by said magnet, coöperates in the making of the letter; but if any one of the keys $B'$, $B^2$, or $B^3$ be depressed the current will flow instead through the magnet $D'$, $D^2$, or $D^3$ corresponding to the key depressed and the frame $d'$, $d^2$, or $d^3$ controlled by such magnet and corresponding to the key depressed will coact in the making of the letter or other character printed. If a B-group key be depressed and no C-group key be depressed at the same time, the motor-magnet $E^{10}$ will give movement to the bell-crank lever $e$, whose tilting piece E, connected with the frame C, it will be seen, Figs. 3 and 6, lies normally in the path of movement of the motor-frame $E^{12}$; but if any one of the keys $C'$, $C^2$, $C^3$, $C^4$, $C^5$, $C^6$, or $C^7$ be depressed it throws its own tilting piece $E'$, $E^2$, $E^3$, $E^4$, $E^5$, $E^6$, or $E^7$ up into the path of movement of the motor-frame $E^{12}$, at the same time, as before explained, raising the frame C and throwing the tilting piece E, connected with said frame and with the bell-crank lever $e$, down out of the path of movement of said motor-frame, so that said motor-frame gives movement to that one of the bell-crank levers $e'$, $e^2$, $e^3$, $e^4$, $e^5$, $e^6$, or $e^7$ which corresponds to the C-group key depressed.

The lever B, controlling the magnet D and frame $d$, makes it possible to produce a letter from each of the C-group keys without at the same time depressing a B-group key, and the frame C, controlling the tilting piece E and bell-crank lever $e$, makes it possible to produce a letter from each one of the B-group keys without at the same time depressing a C-group key. If the lever B and the frame C were omitted, it would be necessary to add another B-group key to control the magnet D and frame $d$ and another C-group key to control the tilting piece E and bell-crank lever $e$, and it would be necessary always to depress two keys, belonging one to the B group and the other to the C group, to produce any letter whatever; but the frame C, it will be seen, in effect serves the function of a C-group key and enables the operator to print letters from the B-group keys, acting singly, without being to the necessity of depressing a C-group key to control a bell-crank lever in the group of bell-crank levers $e$ $e'$ $e^2$ $e^3$ $e^4$ $e^5$ $e^6$ $e^7$, and in like manner the lever B, it will be seen, in effect serves the function of a B-group key and enables the operator to print letters from the keys of the C group, acting singly, without being to the necessity of depressing a B-group key to control one of the frames $d$ $d'$ $d^2$ $d^3$. Thus while the making of any letter requires the coacting of a frame from the group of frames $d$ $d'$ $d^2$ $d^3$ and a bell-crank lever from the group of bell-crank levers $e$ $e'$ $e^2$ $e^3$ $e^4$ $e^5$ $e^6$ $e^7$ I make it possible, it will be seen, to print from each of the keys, acting singly, and thereby with the arrangement figured in the drawings I in fact make the ten most frequently-occurring letters of the alphabet (being about three-quarters of running letters) by the action of a single key, the other letters being made, as before described, by the simultaneous depressing of two keys belonging one to the B group and the other to the C group.

Two keys belonging to the same B group should not be depressed simultaneously; nor should two keys belonging to the same C group be depressed simultaneously; but any B-group key may be depressed in combination with any C-group key. Each key, whether belonging to the B group or to the C group, will make its own letter when depressed by itself alone, and any two keys belonging one to the B group and the other to the C group may be depressed simultaneously, and when so depressed will produce a letter or other character proper to such combination, and every different combination of two keys belonging one to the B group and the other to the C group actuates a different one of the levers $f$ $f$ $f$, thereby operating a different type-bar and printing a different character from any other key or combination of keys.

In type-writers as ordinarily constructed the type-bar remains up at the printing-point so long as the key is held down. It can only retreat from the printing-point when the operator releases the key. It is very advantageous, however, to release the type-bar automatically, so that it will retreat immediately upon delivering its blow and without waiting for the releasing of the key, for thereby speed of operation is greatly favored in any type of machine, and special advantages are obtained in a machine of the sort herein described, having two sets of type-bars striking to adjacent printing-centers, which will more clearly appear hereinafter. I effect the automatic release of the type-bar very conveniently by means of the electrical devices illustrated diagrammatically in Fig. 1 and in part described hereinbefore. Thus it has already been made clear that the current, which on the depressing of a key flows from the battery $B^{10}$ through some one of the magnets D $D'$ $D^2$ $D^3$ to the trunk-wire $B^{16}$, divides at said wire, a portion going through the space-magnet $H^{51}$ and motor-magnet $E^{10}$, adjustable contact-screw $B^{17}$ and lever $B^{18}$, wire $B^{20}$, contact-spring $B^{12}$, conducting-frame 18, conducting-standard 19, and wire $B^{11}$ back to the battery $B^{10}$, while another portion of the current flows through the releasing-magnet $B^{22}$, wire $B^{23}$, spring $B^{12}$, frame 18, standard 19, and wire $B^{11}$ to the battery. The portion of the current which passes through the magnet $B^{22}$ serves to magnetize said magnet, thereby attracting the armature-lever $B^{18}$ away from the adjustable contact-screw $B^{17}$ and breaking the circuit of the space-magnet and of the motor-magnet $E^{10}$, which, instantly losing its magnetism, leaves the type-bar free to retreat from the printing-point and all the other parts free to return to their normal positions. A bronze stop-pin $B^{24}$ projects a slight distance in front of the core of the magnet $B^{22}$, so as to prevent the armature $B^{18}$ from coming in contact with the core of said magnet $B^{22}$ and sticking on it after its circuit has been broken. By adjusting ($a$) the play of the armature-lever $B^{18}$, and particularly the distance which it stands from magnet $B^{22}$ when held in its normal position of contact with the screw $B^{17}$ by the spring $B^{19}$, (b) the strength of the returning-spring $B^{19}$, and (c) the self-induction, also, if desired, of the circuit of said magnet $B^{22}$, the releasing-magnet $B^{22}$ may be given such a time of action that it will cut off the current from the motor-magnet $E^{10}$ at the instant desired. I have found it advantageous to adjust all the parts in such a manner that the releasing-magnet $B^{22}$ cuts off the current from the motor-magnet $E^{10}$ when the type-bar has approached close to but has not yet quite reached the printing-point.

The printing mechanism controlled by the left-hand set of keys has now been fully described. It remains to describe that controlled by the right-hand set of keys. In most respects the two are alike, as the drawings show. The type-bars $a'$ $a'$, however, controlled by the right-hand keys, strike to the printing-point $A'$, standing one letter-space to the right of the printing-point A, to which the type-bars $a$ $a$, controlled by the keys of the left-hand set, strike. (See on this point Fig. 4.) The keys of the left-hand set serve, when two letters are produced simultaneously, to make the first letter of the simultaneously-produced pair of letters, and the keys of the right-hand set serve, when two letters are made simultaneously, to make the second letter of such pair of simultaneously-produced letters. Hence the difference in the location of the two printing-points A and $A'$, serving, respectively, for the left-hand and right-hand sets of keys. The levers $f f f f$, frames $d, d', d^2$, and $d^3$, electromagnets $D, D', D^2,$ and $D^3$, bell-crank levers $e, e', e^2, e^3, e^4, e^5, e^6$, and $e^7$, tilting pieces $E, E', E^2, E^3, E^4, E^5, E^6$, and $E^7$, motor-magnet $E^{10}$, armature $E^{11}$, and motor-frame $E^{12}$, with the keys and the electrical connections, of the right-hand set are preferably exactly like those of the left-hand set, as the drawings show, subject to certain differences in respect of some of the electrical connections, which will now be pointed out. The electrical connections of the left-hand set of keys and of the right-hand set of keys might, indeed, be made in every respect exactly alike; but for reasons which will appear clearly hereinafter it is advantageous to make certain differences between them, which I will now describe.

In constructing a type-writing machine it is advantageous to arrange matters in such a manner that the letters when printed will stand close together in the line, as in ordinary printed matter; but where two letters are printed simultaneously by means of two type-bars striking at the same time to adjacent printing-points it is obvious that without very delicate work the type-bars cannot be made always all of them to strike very close together without sometimes interfering, particularly after the joints have worn a little, as they inevitably do in practical use. It becomes necessary, therefore, to adjust the printing-points such a distance apart as admits of the free working of the bars of both sets without interference under ordinary circumstances and allowing a little for the inevitable wear and loosening of the joints resulting from practical use, and the distance between the printing-points which this necessitates tends to spread the letters apart more than is usual in good printing and more than is at all desirable; but if we arrange matters so that one bar shall strike an instant before the other and retreat from the printing-point a short distance before the other reaches it it becomes possible to print the letters as close together as in ordinary type-writer work, and those imperfections in alinement which it is well known develop in the best machines in the course of time as they are subjected to practical use can exist without the bars of the one set striking or becoming entangled with those of the other set when two bars print together. I accomplish this result in the device illustrated in the drawings by making the circuits belonging to one set of keys a little slower-acting than the circuits belonging to the other set of keys, so that the keys of the two sets being depressed simultaneously the type-bar operating belonging to one set strikes a little before the bar belonging to the other set and in rebounding passes at a little distance from the printing-point, where the bars diverge, the approaching type-bar of the other set controlled by the slower-acting circuits of the other set of keys. In the drawings the circuits of the left-hand set, already described, are the quick-acting circuits, and the circuits of the right-hand set are the slow-acting circuits, though of course the arrangement might be reversed. The circuits of the right-hand set in Fig. 1 are made slower-acting by putting a suitable self-induction 25 of small resistance and consisting of a coil wound about a mass of iron (which should preferably form a closed iron magnetic circuit) in the circuits of the right-hand set. The greater self-induction thus given to the circuits of the right-hand set retards the rise of the current on closing circuit, so that the type-bars of the right-hand set begin to move an instant later than the bars of the left-hand set and do not reach the printing-point (when the self-induction is properly adjusted to the circuit) until the left-hand-controlled type-bar has retreated a short distance therefrom, said left-hand-controlled type-bar being, it will be remembered, automatically released by the action of the releasing-magnet $B^{22}$ upon the lever $B^{18}$, said magnet drawing said lever away from the contact-screw $B^{17}$ and breaking the circuit of the motor-magnet $E^{10}$. The amount of self-induction should be made such that, allowing for the fact that the depressing of the keys of the two sets, though apparently simultaneous, is probably not in fact absolutely simultaneous, the retreating bar of the left-hand-controlled set and the aproaching bar of the right-hand-controlled set will (even when the right-hand-controlled key is depressed such a short fraction of a second in advance of the left-hand-controlled key as may happen when the operator depresses them, so far as he can tell, simultaneously) pass each other such a distance below their centers as will permit them to clear, notwithstanding any slight imperfections in the alinement. The adjustment is readily made by varying the magnitude of the self-induction 25 or by varying the adjustment of the magnet $B^{30}$ and armature $B^{31}$ in Fig. 1ª, herein described.

Obviously the two frames 18 18 might be mounted fast upon the same shaft, so that they will move together. In this way all interference between the type-bars as they approach their closely-adjacent printing-points is avoided without any practical loss in speed and without in any wise complicating the mechanism, and it becomes possible to print the letters as close together as desired.

The different keys and the different combinations of keys may be made to print the different letters and other characters in any order desired. In other words, to each key and to each combination of keys may be assigned such letter or other character as the constructor thinks fit. The principle is simple; the variations endless. Probably no two designers, acting independently of each other, would assign the various characters to the different keys in exactly the same order; but whatever plan of arrangement be pursued the whole arrangement should be in general such that the most frequently occurring letters will be produced by the keys or combinations of keys most readily depressed, a regard being had to the normal position of the hand with reference to the various keys. In making any desired arrangement one has only to remember the following simple rules: To produce any given letter by a given B-group key acting singly, assign such letter to the type-bar connected with the particular lever $f$ that is operated by the conjoint action of the bell-crank lever $e$ and the frame $d'$, $d^2$, or $d^3$, as the case may be, controlled by such B-group key. To produce any given letter by the depressing of a given C-group key acting singly, assign such letter to the type-bar connected with the particular lever $f$ that is operated by the conjoint action of the frame $d$ and the bell-crank lever $e'$, $e^2$, $e^3$, $e^4$, $e^5$, $e^6$, or $e^7$, as the case may be, controlled by such C-group key. To produce any given letter or other character by a given combination of two keys belonging one to the B group and the other to the C group, assign such character to the type-bar connected with the particular lever $f$ that is operated by the conjoint action of the frame $d'$, $d^2$, or $d^3$, as the case may be, controlled by the B-group key belonging to such combination of keys and the bell-crank lever $e'$, $e^2$, $e^3$, $e^4$, $e^5$, $e^6$, or $e^7$, as the case may be, controlled by the C-group key belonging to such combination of keys.

*The spacing mechanism.*—$c^{37}$ is the space-rack, Fig. 7, attached to the carriage, so that it moves with it, and hinged (see Fig. 3) to enable it to be lifted off of the space-dogs when required.

H is the dog-carrying lever, made in two parts adjustable with relation to each other, so as to bring the loose dog and the fast dog nearer together or farther apart, as required.

$H^3$ is the fast dog, and $H^4$ the loose dog.

$H^5$ is a bridle-lever connected with the fast dog and carrying an adjustable stop $H^{33}$. $H^{62}$ is another lever carrying another adjustable stop $H^{34}$. Flanges $H^{41}$ $H^{41}$, &c., screwed fast to the downward extension of the top plate $A^{41}$, serve to fulcrum the various levers above mentioned, the armature-levers, hereinafter described, &c. $H^{42}$ $H^{42}$ are adjustable stops serving to limit the play of these levers.

$H^{30}$ is a lever connected by a link $H^{31}$ with the dog-carrying lever and carrying a stop $H^{32}$, against which the loose dog $H^4$ rests when all the parts occupy their normal positions. The other mechanical parts will require no description.

$H^{51}$ is the principal spacing-magnet. It is in circuit with the battery $B^{10}$, (see Fig. 1,) so that when the circuit of said battery is closed the current flows through the wire of the magnet $H^{51}$. $H^{52}$ is the armature of said magnet. When the current flows through the magnet $H^{51}$, (which it does whenever a key is depressed,) said magnet attracts its armature $H^{52}$, which thereupon tilts the dog-carrying lever H, raising the fast dog $H^3$ up into the teeth of the rack $c^{37}$ and withdrawing the loose dog $H^4$ from engagement with said rack, so that said loose dog when released from said rack moves under the influence of its contractile spring $H^{36}$ until it is arrested by the stop $H^{34}$, attached to the lever $H^{62}$. The parts are all adjusted in such a manner that this movement of the loose dog is just sufficient to admit of the carriage making two letter-spaces, and when the current is cut off from the magnet $H^{51}$ by the action of the releasing-magnet $B^{22}$ upon its armature $B^{18}$ in the manner before described the armature $H^{52}$, impelled by the contractile spring $H^{37}$, returns to its normal position, the fast dog is withdrawn from engagement with the rack $c^{37}$, the loose dog is again brought into engagement with it, and the carriage, no longer held back by the fast dog, moves on until it is arrested by the loose dog $H^4$ coming in contact with the stop $H^{32}$, so making two letter-spaces. This operation takes place whenever a printing-key or a plurality of printing-keys is depressed. At the end of a word a space is needed between it and the next following word to separate the two. If the word contains an odd number of letters (as three, five, or seven letters) and the letters be printed, as they should be, in pairs as far as possible, beginning with the first pair of letters in the word, and so continuing pair by pair, the final letter will be printed by itself alone, and the two letter-spaces made by the spacing mechanism in the manner already described will thus give, without any action upon a space-key, the necessary space at the end of the word; but in writing words containing an even number of letters the operator must make the space at the end of the word. To this end the keyboard is furnished with a space-key G, which serves when acted upon by the operator to make connection with the contact-piece $g$, which is connected through the wire $B^{25}$, the auxiliary space-magnet 51, the space-enlarging magnet $H^{61}$, and wire $B^{26}$ with the contact-spring $B^{12}$, and thence through the frame 18, standard 19, and wire $B^{11}$ with the other pole of the battery $B^{10}$. The key G is to be acted upon by the operator simultaneously with the key or keys which make the last letters of a word, and when acted on it closes circuit through the space-enlarging magnet $H^{61}$ and the auxiliary space-magnet 51. The action of the auxiliary space-magnet 51 upon the armature $H^{52}$ and related parts is exactly the same as the action of the principal space-magnet $H^{51}$, before described. The space-enlarging magnet, when energized, attracts its armature $H^{62}$, which carries the stop $H^{34}$ down out of the way of the loose dog, so that the loose dog, when freed from the rack $c^{37}$, now moves under the influence of the spring $H^{36}$ until it is arrested by the stop $H^{33}$, which stop is so set that the enlarged movement which it permits to the loose dog is sufficient to permit a movement of the carriage of three letter-spaces when the various parts return to their normal positions. In a word, the space-magnets $H^{51}$ or 51, either or both, with the armature $H^{52}$, operate to actuate the spacing-dogs, and the space-enlarging magnet $H^{61}$, with its armature $H^{62}$, operates to enlarge the space by increasing the movement of the loose dog.

$H^{37}$ and $H^{38}$ are contractile returning-springs serving to return the dog-carrying levers and the armatures to their normal positions.

$m$ is the paper roll or platen; $m'$, the frame of the paper-carriage; $m^2$, the back rod, on which the carriage runs, and $m^3$ the frame hinged to the carriage-frame and to which the space-rack $c^{37}$ is attached.

In respect to the details of construction of the paper-carriage, the arrangement of a shift (not shown in the drawings, being universally understood in the art) whereby the platen or paper-roll is moved from its lower-case position to its upper-case position, or vice versa, the interlinear spacing mechanism, and the ribbon mechanism the machine illustrated in the drawings is intended to follow the details of construction well known to the public in the old "Remington No. 2" machine; but none of these details form any part whatever of my invention, and any suitable plan or construction whatever may be followed for them.

It will be observed from the drawings (see particularly Fig. 3) that I place two types on each bar of each set. I prefer to place on twenty-six of the bars $a\,a$ the twenty-six letters of the alphabet, upper and lower case, and to place frequently-occuring marks of punctuation on the other bars of the set $a\,a$, and I prefer to place on twenty-six of the bars of the set $a'\,a'$ lower-case letters in the lower-case position, corresponding to the letters of the alphabet, and figures, marks of punctuation, and other characters on the same twenty-six bars in the upper-case position. On the other bars of the set $a'\,a'$ any suitable characters whatever may of course be placed; but I prefer to place on them, both in the upper-case and lower-case positions, the same marks of punctuation that are placed upon the corresponding bars of the other set. By this means the upper-case shift (which being universally understood in the art is not figured in detail in the drawings) is made to give capitals from the set of bars $a\,a$, which print the first letter of two simultaneously-produced letters, and figures and marks of punctuation, &c., from the bars $a'\,a'$, and thus with a moderate number of bars (sixty-two for the device figured in the drawings) all the letters of the alphabet, both upper and lower case, all the figures, all the usual marks of punctuation, and all other necessary marks and characters are readily obtained, and that with a device having two sets of bars adapted to play simultaneously to adjacent printing-points for the printing of consecutive letters simultaneously; but a different arrangement from that which I have described may of course be employed, if desired.

Instead of employing four frames $d$, $d'$, $d^2$, and $d^3$ obviously a greater or a smaller number may be employed, as desired, and so with the set of bell-crank levers $e$, $e'$, $e^2$, $e^3$, $e^4$, $e^5$, $e^6$, and $e^7$ a greater or less number of said levers may be employed, as desired. If frames be added to the set $d\,d'\,d^2\,d^3$, corresponding B-group keys and controlling-magnets interposed between said keys and the frames should be added, and if the number of the frames $d\,d'\,d^2\,d^3$ be decreased the number of B-group keys will also be decreased. If the number of bell-crank levers $e\,e'\,e^2\,e^3\,e^4\,e^5\,e^6\,e^7$ be increased, additional C-group keys must be added. If the number of said bell-cranks be decreased, the number of the C-group keys will also be decreased. The proper number of the levers $f\,f\,f$ belonging to a set of keys, it will be seen, is equal to the number of the frames $d\,d'\,d^2\,d^3$ multiplied by the number of the bell-crank levers $e\,e'\,e^2\,e^3\,e^4\,e^5\,e^6\,e^7$, one being subtracted from the product.

Instead of connecting the levers $f\,f$ with the pull-down wires $h\,h$ at one end and with the bell-cranks $e\,e'\,e^2$, &c., at the other end, the frames $d$, $d'$, $d^2$, and $d^3$ being arranged to act upon said levers $ff$ intermediate said points of connection, the frames $d$, $d'$, $d^2$, and $d^3$ might obviously be arranged to act upon the ends of the levers $fff$ remote from the frames $e$ $e'$ $e^2$, &c., the pull-down wires $h$ $h$ being connected to such levers $ff$ intermediate the points of action of the frames $d$, $d'$, $d^2$, and $d^3$ and the frames $e$ $e'$ $e^2$ $e^3$, &c.; but the arrangement illustrated in the drawings is the better and in any form of the device obviously the positions of the frames $d$, $d'$, $d^2$, and $d^3$ and the bell-cranks $e$, $e'$, $e^2$, $e^3$, $e^4$, $e^5$, $e^6$, and $e^7$ might be interchanged.

A modified form of permutational selecting device is illustrated in Figs. 9 and 9$^a$. The type-bar-connected levers $fff$ are centered at one end by means of flanges or hangers $f^{12}$, screwed fast to the bar 6$^b$. A frame K, carrying eight pins $k$, $k'$, $k^2$, $k^3$, $k^4$, $k^5$, $k^6$, and $k^7$, each furnished with a collar $k^8$, lying just below the top of the frame and normally spring-pressed upward by an expansive spring $k^9$, lies over the ends of the levers $ffff$, &c. Immediately above the tops of the pins $k$, $k'$, $k^2$, $k^3$, $k^4$, $k^5$, $k^6$, and $k^7$ are the bell-crank levers $e$, $e'$, $e^2$, $e^3$, $e^4$, $e^5$, $e^6$, and $e^7$, controlled by the frame C and the keys C′, C$^2$, C$^3$, C$^4$, C$^5$, C$^6$, and C$^7$ and the motor-magnet E$^{10}$, as before described. The frame K is mounted by means of levers K′ and K$^2$ and traverses across the levers $ffff$ between the stops K$^3$ and K$^4$, against the first of which it is normally held by the contractile spring K$^5$. The levers K′ and K$^2$ are mounted upon shafts K$^6$ and K$^7$, to which they are firmly attached. An arm K$^8$, attached fast to the shaft K$^6$ and lever K′, is raised by the keys B′, B$^2$, and B$^3$ different distances, respectively. In its normal position, in which it is shown in Fig. 6$^A$, each of the pins $k'$, $k^2$, $k^3$, $k^4$, $k^5$, $k^6$, and $k^7$ overlies the outmost one of a group of type-bar-connected levers $fff$, corresponding to one of the bell-crank levers $e'$, $e^2$, $e^3$, $e^4$, $e^5$, $e^6$, and $e^7$. The key B$^3$ when depressed acts upon the part K$^8$, thereby moving the frame K from its normal position in the direction of the arrow $a$ distance equal to the distance between two of the adjacent levers $ff$ of a group, so that each of the pins $k$, $k'$, $k^2$, $k^3$, $k^4$, $k^5$, $k^6$, and $k^7$ comes over a different one of the type-bar-connected levers $ff$. The key B$^2$ when depressed acts in like manner upon the part K$^8$, and thereby moves the frame K from its normal position in the direction of the arrow a distance equal to that between the first and the third levers of one of the groups of levers $ff$, corresponding to one of the bell-crank levers $e'$ $e^2$, &c., so that each of the pins $k$, $k'$, $k^2$, $k^3$, $k^4$, $k^5$, $k^6$, and $k^7$ comes over a different one of the type-bar-connected levers $ff$, &c. The key B′ when depressed acts in like manner upon the part K$^8$, and thereby moves the frame K from its normal position in the direction of the arrow a distance equal to the space between the first and the fourth levers of one of the groups of levers $ff$, corresponding to one of the bell-cranks $e'$ $e^2$ $e^3$, &c., thereby bringing each of the pins $k$ $k'$ $k^2$, &c., over a different one of the levers $ff$, &c.

Each of the pins $k'$, $k^2$, $k^3$, $k^4$, $k^5$, $k^6$, and $k^7$ (but not the pin $k$,) it will be seen, when in its normal position overlies one of the type-bar-connected levers $ff$, and each of the keys B′, B$^2$, and B$^3$ serves, when depressed by the movement which it gives to the frame K, to bring each of said pins $k'$, $k^2$, $k^3$, $k^4$, $k^5$, $k^6$, and $k^7$, as also the pin $k$, over a different type-bar-connected lever $f$. Overlying the pins $k$, $k'$, $k^2$, $k^3$, $k^4$, $k^5$, $k^6$, and $k^7$ are the horizontal arms of the bell-crank levers $e$, $e'$, $e^2$, $e^3$, $e^4$, $e^5$, $e^6$, and $e^7$, respectively, which are connected, it will be remembered, (see Fig. 2,) by the tilting pieces E, E′, E$^2$, E$^3$, E$^4$, E$^5$, E$^6$, and E$^7$, respectively, with the frame C and the keys C′, C$^2$, C$^3$, C$^4$, C$^5$, C$^6$, and C$^7$ and controlled, respectively, by said frame and keys and by the motor-magnet E$^{10}$. Each of said bell-crank levers is of such a width that the particular pin corresponding to it ($k$, $k'$, $k^2$, $k^3$, $k^4$, $k^5$, $k^6$, or $k^7$, as the case may be) is not moved out from under it by the traversing of the frame K. Each of the bell-crank levers $e'$, $e^2$, $e^3$, $e^4$, $e^5$, $e^6$, and $e^7$, when connected by the depressing of the proper key with the motor-frame E$^{12}$ and moved thereby, serves, it will be seen, in this case, as in the other before described, to actuate a certain one of the type-bar-connected levers $fff$ when one of the C-group keys is depressed by itself alone and a different one of said type-bar-connected levers $ff$ $ff$ when one of the keys B′, B$^2$, or B$^3$ is depressed simultaneously with such key of the C group; and the bell-crank lever $e$, controlled by the frame C, serves to actuate three different type-bar-connected levers $fff$—to wit, one when the key B′ is depressed, another when the key B$^2$ is depressed, and a third when the key B$^3$ is depressed, no C-group key being depressed at the same time. The pins $k$, $k'$, $k^2$, $k^3$, $k^4$, $k^5$, $k^6$, and $k^7$, moved into different positions by the other parts before described, take the place of the frames $d$, $d'$, $d^2$, and $d^3$, belonging to the preferred construction and before fully described.

In connection with the preferred construction employing the frames $d$, $d'$, $d^2$, and $d^3$ it has been said hereinbefore that I prefer to use said frames ($d$, $d'$, $d^2$, and $d^3$) each in its turn as fixed fulcrums, their magnets serving simply to hold them firm as fulcrums, because with this arrangement of the parts the noise is less than it is when the working frame $d$, $d'$, $d^2$, or $d^3$, as the case may be, moves positively down upon the lever $f$ to be operated at the same time that such lever is lifted at its non-type-bar-connected end by the movement of the proper bell-crank lever $e$, $e'$, $e^2$, $e^3$, $e^4$, $e^5$, $e^6$, or $e^7$. If the arrangement which I consider best to be used, in which the frames $d$, $d'$, $d^2$, and $d^3$ each, when operating, serves merely as a fulcrum to the lever $f$, raised by the movement of the proper bell-crank lever $e$, $e'$, $e^2$, $e^3$, $e^4$, $e^5$, $e^6$, or $e^7$, the construction of the magnets D, D′, D$^2$, and D$^3$ should, as indeed the drawings show, to secure the best results, be made somewhat different from that of the motor-magnet $E^{10}$. The magnets D, D', $D^2$, and $D^3$ should be what I may term "clutch-magnets," capable of exerting a considerable attraction over a short range, while the motor-magnet $E^{10}$, which does the work, should be made to exert a moderate force more evenly over a greater distance. To this end I employ what I may term a "direct-approach magnet" for the frames $d$, $d'$, $d^2$, and $d^3$, and what I may term a "lateral-approach magnet" for the motor-frame $E^{12}$. By a "direct-approach magnet" I mean a magnet in which the armature moves toward the core along the lines or along the general trend of the lines of magnetic flux joining the two, and by a "lateral-approach magnet" I mean a magnet in which the armature approaches the core upon lines transverse to the general trend of the lines of magnetic flux joining the two. A very simple, cheap, and effective direct-approach magnet is illustrated in section in Fig. 3, (marked $D^3$.) The magnets D, D', and $D^2$ are like unto it. Said magnet $D^3$ consists of two cylinders of soft iron, one attached to the bed-plate and serving as a fixed core, the other connected by a link $d^{10}$ with the arm $d^8$ of the frame $d^3$, and serving as the armature. Both cylinders lie within a non-ferruginous tube, outside which the magnetizing-coil is wound, and each cylinder is furnished outside the coil with an enlarged head, which serves to conduct the lines of magnetic force from the iron to the air. The air-gap between the armature and the fixed core being in the center of the magnetizing-coil is in a strong magnetic field, where the leakage of magnetic lines is a minimum, and the large iron heads outside the coil reduce the reluctance of the magnetic circuit, which, being composed largely of air, demagnetizes rapidly. When the adjacent faces of the two soft-iron cylinders stand close together within the magnetizing-coil, a very moderate magnetomotive force gives a strong attraction, so that the magnet-connected arm $d^8$ of the frame $d^3$ is held firmly down upon the stop $d^9$ and the frame made to afford a firm fulcrum to that one of the levers $f\, f$ which is being raised by the movement of the proper one of the bell-crank levers $e$, $e'$, $e^2$, $e^3$, $e^4$, $e^5$, $e^6$, or $e^7$.

A convenient form of lateral-approach magnet is illustrated in Fig. 3 for the motor-magnet $E^{10}$. The armature $E^{11}$ is pivoted by means of the shaft $E^{15}$ and tilts in front of the core E. By this construction a gradual pull is obtained over a considerable space; but any other suitable form of lateral-approach magnet may be used instead of it. Indeed, a direct-approach magnet of any suitable sort—and many kinds are known—might be used for the motor-frame $E^{12}$; but it would make more noise and would rack all the joints more, and obviously lateral-approach magnets of any suitable sort might be used for the frames $d$, $d'$, $d^2$, and $d^3$; but in this case larger magnets would be required; but if the frames $d$, $d'$, $d^2$, and $d^3$ be made to operate by moving positively down upon the levers $f$ at the same time that such lever is being raised by the movement of the proper one of the bell-crank levers $e$ $e'$ $e^2$ $e^3$, &c., it would be advantageous to employ suitable lateral-approach magnets for the frames $d$, $d'$, $d^2$, and $d^3$.

I do not at all limit myself to working or locking the frames $d$, $d'$, $d^2$, and $d^3$ by the magnets D, D', $D^2$, and $D^3$, for other mechanism may be used instead of said magnets. Thus mechanical detents or catches might be used for the frames $d$, $d'$, $d^2$, and $d^3$ instead of the electromagnets D, D', $D^2$, and $D^3$, said mechanical detents or catches being controlled, respectively, by the lever B and the keys B', $B^2$, and $B^3$. Any suitable locking device whatever may, in fact, be used.

I show two sets of type-bars and a set of keys and selecting mechanism for each set of type-bars in the drawings. Such a machine is best for rapid writing; but obviously a single set of type-bars with a single set of keys and selecting mechanism to control said bars might be used instead. I, in fact, contemplate using a single set of type-bars with the necessary keys—a single set—and selecting mechanism in simple machines intended for the use of clergymen, lawyers, journalists, and others whose writing requires close thought.

Moreover, permutational selecting mechanism of the sort herein described may be used with two sets of keys and a single set of type-bars to print letters in rapid succession when the keys are depressed simultaneously. I have, in fact, constructed a machine upon this principle, and an application for a patent covering such machine is now in course of preparation by me.

It is not necessary that the two sets of type-bars $a\, a$ and $a'\, a'$ should have separate printing-points, though it is advantageous that they should have. A single printing-point might, however, be used for all the bars of both sets by making the set of bars $a'\, a'$ so much slower acting than the set $a\, a$ that the bars of the set $a\, a$ will have time to retreat from the printing-point before the bars of the set $a'\, a'$ reach it when keys of the two sets are depressed simultaneously, the carriage being advanced in such case a letter-space between the time of striking of the first bar and the time of striking of the second. For this purpose the normal play of the loose dog $H^4$ should be reduced, so that it will make a single letter-space, and everything should be adjusted in such manner that the circuit of the left-hand-controlled magnets will be broken (by the action of the left-hand releasing-magnet $B^{22}$ upon its armature $B^{18}$) a little time before the rise of current in the right-hand-controlled magnets has reached the effective point for the moving of their armatures, and the space-magnet $H^{51}$ should be wound with two coils, one outside the other, one serving for the left-hand-controlled circuits and the other for the right-hand-controlled circuits, said coils preferably being oppositely wound, so that the current in passing through from the right-hand keys will reverse the magnetism produced by the previous current passing through from the left-hand keys; but it is more advantageous to have separate printing-points for the two sets of type-bars, for thereby either (a) less rapid movements of the type-bars are required, the bars of the two sets moving practically about the same time, but one a little in advance of the other—a difference, in short, in phase relation—or (b) the work can be done more rapidly when two blows are delivered and two letters printed almost at the same instant than when one type-bar has to completely clear the printing-point and return to its normal position before the other can come up to print.

On the other hand it is not at all indispensable that the bars of the one set be made slower acting than the bars of the other set. The inductance 25 might be omitted and the time-constants of the two sets of circuits made to be the same. It would not be possible to print the letters so close together nor to make so neat a page; but notwithstanding this the machine would be capable of doing good work and of writing with great speed.

Instead of making the circuits of the one set of keys slower acting than the circuits controlled by the other set of keys by giving them a greater amount of self-induction the same effect may be produced by arranging matters so that the admitting of the current to the magnet or magnets of the one set will be postponed a little after the admitting of the current to the magnets of the other set, when keys of the two sets are depressed simultaneously. A convenient arrangement of parts for this purpose is illustrated in the diagrammatic detail view Fig. 1$^A$, which is a view similar in general to Fig. 1, but illustrating a modification of the apparatus illustrated in Fig. 1. A magnet $B^{30}$, wound with fine wire of high resistance, has one terminal connected with the positive pole of the battery $B^{10}$ and its other terminal connected with the contact-spring $B^{12}$, overlying the circuit-closing frame 18 of the right-hand set of keys, so that when any of said keys is depressed a portion of the battery-current flows from battery $B^{10}$ through the magnet $B^{30}$ to the contact-spring $B^{12}$, and thence by the frame 18, standard 19, and wire $B^{11}$ back to the other pole of said battery. The magnet $B^{30}$ controls a soft-iron lever-armature $B^{31}$, which is centered at $B^{32}$ and normally held by a contractile spring $B^{33}$ in contact with an adjustable stop-screw $B^{34}$. Said lever-armature $B^{31}$ is connected with the positive pole of battery $B^{10}$ by a wire $B^{35}$. An instant after the circuit of magnet $B^{30}$ is completed by the depressing of a right-hand key said magnet attracts its armature $B^{31}$, tilting it on its center $B^{32}$ until its further magnetward movement is arrested by the adjustable contact-screw $B^{36}$, with which said lever-armature $B^{31}$ thereupon makes connection. Said contact-screw $B^{36}$ is connected by a wire $B^{37}$ with the lever B, underlying the right-hand keys, and by another wire $B^{38}$ with the keys B', $B^2$, and $B^3$ and the space-key G of the right-hand set. The lever B, it will be remembered, sends the current from the battery $B^{10}$ through the magnet D to the trunk-wire $B^{16}$, and the keys B', $B^2$, and $B^3$, respectively, send the current from said battery when any one of them is depressed through the corresponding magnet D', $D^2$, or $D^3$ to the same trunk-wire $B^{16}$, from which in either case the current flows through the motor-magnet $E^{10}$ and the releasing-magnet $B^{22}$ of the right-hand set to the contact-spring $B^{12}$, and thence by the frame 18, standard 19, and wire $B^{11}$ back to the battery $B^{10}$. The effect of the modification illustrated in Fig. 1$^A$, it will be seen, is such that with the left-hand keys the instant the keys are depressed the circuit is closed through the working magnets $E^{10}$ and D, D', $D^2$, or $D^3$ of the left-hand set, while with the keys of the right-hand set the circuit of the working magnets is not closed until the magnet $B^{30}$ (which forms, it will be seen, a parallel circuit to the working circuit of the right-hand set) has thrown its armature $B^{31}$ into contact with the screw $B^{36}$. The right-hand-controlled type-bars are thus made to start into motion a short interval of time after the left-hand-controlled type-bars have begun to move. This interval may be made greater or less, as desired, by regulating some or, if desired, all of the following, to wit: (a) the positions of the screws $B^{34}$ and $B^{36}$; (b) the strength of the spring $B^{33}$; (c) the weight of the armature-lever $B^{31}$ with reference to the strength of the magnet $B^{30}$, or, conversely, the strength of said magnet with relation to the weight of said armature, and (d) by throwing greater or less amounts of self-induction into the circuit of the magnet $B^{30}$, and this self-induction may be made, as every electrician knows, to be in the magnet itself or in a portion of the circuit extra the magnet. If the positions of the screws $B^{34}$ and $B^{36}$ be adjusted so that the armature $B^{31}$ lies close to the magnet and has but little movement, it will act more rapidly than if it be adjusted to lie remote from the magnet and to have a larger movement. The stronger the spring $B^{33}$ the longer the interval after the closing of the circuit of magnet $B^{30}$ before the working circuit is closed, and of course, as all skilled electricians know, all variations in the time-constant of the circuit itself, whether by increasing or decreasing the self-induction or the resistance, affect the speed of operation of the magnet.

The device of Fig. 1, in which the right-hand circuits are made slow-acting by increasing their self-induction, I consider preferable where a slight lead only is desired to be given to the left-hand-operated type-bars, while the device of Fig. 1ᴬ, in which the working current for the working magnets of the right-hand side is not sent through until the retarding-magnet B³⁰ has first acted, is deemed preferable wherever a large lead is desired to be given to the one set of type-bars over the other set. For most operators the larger lead will be preferable. The inductance 25 may be retained in the device of Fig. 1ᴬ, or it may be omitted, as desired. If a great lead is desired to be given to the left-hand-controlled type-bars over the right-hand-controlled type-bars, it will be found convenient to retain said inductance.

My permutational selecting mechanism, it has already been made clear, may be used both in machines having a single set of type-bars and in machines having two coöperating sets of type-bars; and in machines having two coöperating sets of type-bars, while it is convenient to use the permutational mechanism herein described for each set of bars, such mechanism may, in fact, be used for one set of bars only, and any other suitable controlling mechanism, whether permutational or non-permutational, may be used for the other set of bars.

Frequently in this specification, and particularly in the statement of claim at the end hereof, I speak of a "set of type-bars," "a set of printing characters," "a set of letter-controlling devices," &c. By the word "set" in such and similar phrases I do not mean to limit myself to using a whole alphabet of characters, for less than an alphabet, particularly in one set, will constitute a useful working set.

In various places in this specification I speak of "two sets of type-bars." By the word "type-bar" or "type-bars," as the same is used in this specification, I refer to the things used in type-writing machines and called "type-bars," whether the same be pivoted swinging bars, as used in the Remington and many other machines, or whether they be sliding bars, tilting bars, or thrust-bars, as used in some other type-writing machines; but I use the word always with reference to an element of a type-writing machine or other instrument similar to a type-writing machine in that the writing or printing is done by impressions produced by the bars acting individually or in pairs and in succession to mark, print, indent, or impress a line. The slugs or linotypes produced by a linotype or line-casting machine are sometimes called "type-bars;" but I do not use the word "type-bar" in this specification in any such sense. So, also, the circulating matrices or type-plates of a linotype or line-casting machine are sometimes called "type-bars;" but I do not use the word "type-bar" in any such sense in this specification. I use the word always with reference to the familiar elements of a type-writing machine (whether such elements be type-levers, sliding type-bars, or thrust type-bars) called "type-bars," or to the similar elements of other machines which, like a type-writing machine, print or indent the successive letters upon the line singly or in pairs, in contradistinction to those machines, like the linotype, in which a whole line is cast, impressed, or otherwise produced at once.

In various places in this specification, and particularly in the statement of claim at the end hereof, I speak of "producing consecutive letters by simultaneous actions of the operator," and of "an organization for producing consecutive letters by simultaneous actions of the operator." By "consecutive letters" I mean letters which follow one another in order in a word or on the line of printing, and I do not use the word "consecutive" in the phrases above mentioned and other similar phrases with reference to sequence in time. The consecutive letters produced by simultaneous actions of the operator may indeed be successive in point of time if the type-bars of the one set be made quick-acting and the type-bars of the other set be made slow-acting, or said consecutive letters may be printed simultaneously in point of time if the two sets of bars be made (as it has already been pointed out that they may) to strike simultaneously; but whether the one construction or the other be followed two letters, one of which follows the other in due order in a word or in position on the line of printing with no letter interposed between them, are consecutive letters, I wish it to be very clearly understood, in the sense in which I use the words "consecutive letters" in the statement of claim at the end hereof whether those letters be produced simultaneously or successively in point of time.

In various places in this specification, and particularly in the statement of claim at the end hereof, I speak of "character-corresponding devices" and of "character-corresponding levers." By a "character-corresponding device" I mean a device corresponding to a character. A type-bar of a type-writing machine is a character-corresponding device, for it corresponds to a character. So in a linotype-machine the matrix-controlling escapements are character-corresponding devices in the sense in which I use the language in this specification, for each such device corresponds to a character and serves when actuated to cause the matrix upon which the character to which it corresponds is formed to start toward the matrix-assembling mechanism, in consequence of which such character takes its proper place in the line of matrices being assembled and is eventually produced in the slug; and by a "character-corresponding lever," as the language is used in the statement of claim at the end hereof, I mean a lever corresponding to a character. (a) A type-lever, such as the levers $a$ or $a'$ in the drawings, is a character-corresponding lever. (b) The levers $fff$ in the drawings are also character-corresponding levers. (c) The key-levers of an ordinary Remington type-writer, for example, or (d) the key-levers of a Mergenthaler linotype-machine are character-corresponding levers, for each of them corresponds to a character and serves by its action to cause or assist in causing the production of the character to which it corresponds. I refer to the foregoing merely as convenient examples and not by way of an exhaustive enumeration of character-corresponding devices, and when I speak in the specification of "different character - corresponding devices serving for different characters or serving for the production of different characters," I mean that the character produced by one character-corresponding device is a different character from the character produced by the other character - corresponding devices of the same set.

In various places in this specification, and particularly in the statement of claim at the end hereof, I speak of "permutational character-selecting mechanism" and sometimes more shortly of "permutational selecting mechanism." By "permutational character-selecting mechanism" or by the abbreviated term "permutational selecting mechanism" I mean mechanism in which a few keys control a much larger number of characters, such keys being adapted to act simultaneously in different combinations or permutations to produce different characters. It is difficult to give an exact and rigid definition of such a term, and the foregoing is intended rather as an indication or explanation than as an exact and rigid definition. Various sorts of permutational character-selecting mechanisms have been heretofore proposed, though none of them, so far as I am aware, has ever gone into practical use. Among the forms of permutational character - selecting mechanism heretofore proposed I would mention, as illustrations and in place of an exact definition, those described, for example, in the patents of the United States of America to Munson, No. 246,411, dated August 30, 1881, and No. 352,143, dated November 9, 1886; to Beyerlen, No. 331,275, dated December 1, 1885; to Ganse, No. 331,629, dated December 1, 1885; No. 382,298, dated May 8, 1888; No. 386,776, dated July 24, 1886, and Nos. 390,768 and 390,769, dated October 9, 1888, and that described in the United States Letters Patent to me, dated August 25, 1896, No. 566,442, for improvements in type-writing machines, type-setting machines, and other similar instruments. I refer to the foregoing merely as tending to show what a permutational character-selecting mechanism is and the state of the art in respect of the permutational character-selecting mechanisms heretofore proposed, and not as expressing in this place any opinion one way or the other as to the utility or practicability of any of said proposed mechanisms. In the same connection the permutational character-selecting mechanisms illustrated in my pending applications, Serial No. 609,489, filed October 21, 1896, and Serial No. 650,111, filed August 31, 1897, should also be mentioned.

In various places in this specification, and particularly in the statement of claim at the end hereof, I speak of "permutatinal type-bar - selecting mechanism." By "permutational type-bar-selecting mechanism" I mean permutational character - selecting mechanism of the sort in which the characters controlled are formed upon or attached to the type-bars. "Permutational type-bar-selecting mechanism" is a narrower term than "permutational character-selecting mechanism." The latter term is a broad one, referring as well, for example, (among other things,) to a permutational character - selecting mechanism operating the matrix-controlling escapements of a linotype-machine as to a permutational character - selecting mechanism operating the type-bars of a type-writing machine.

In various places in this specification, and particularly in the statement of claim at the end hereof, I speak of "controlling elements" or "controlling devices" belonging to or forming parts of the permutational character-selecting or the permutational type-bar-selecting mechanism. I use the terms "controlling elements" and "controlling devices" synonymously. Without attempting an exact and rigid definition I would say, by way of indication, that the controlling elements of a permutational character-selecting mechanism are those parts which operate by their varying combinations to determine what one of the controlled elements shall be brought into action, and the controlled parts are those parts for the operating of which one by one the controlling elements act. Thus in the device illustrated in Figs. 2 and 3 of the accompanying drawings the levers or frames $e$, $e'$, $e^2$, $e^3$, $e^4$, $e^5$, $e^6$, and $e^7$ constitute one set or group of controlling elements and the levers or frames $d$, $d'$, $d^2$, and $d^3$ constitute another group or set of controlling elements, and in the device illustrated in Figs. 9 and $9^a$ the levers $e\ e'\ e^2\ e^3$, &c., (which give movement to the pins $k\ k'\ k^2\ k^3$, &c., levers $f\ f\ f$, and type-bars $a\ a$) may be considered as controlling elements of one group, themselves controlled by the keys $C'\ C^2\ C^3$, &c., and the motor device, while the keys $B'\ B^2\ B^3$, which give movement to the pin-carrier K, thereby shifting the pins $h\ h'\ h^2$, &c., across the different groups of levers $f\ f$, thus controlling what lever of the group shall be actuated, may be considered as the other group of controlling elements.

Although an electromagnet is illustrated in the drawings as the motor device for actuating the controlling elements $e$, $e'$, $e^2$, $e^3$, $e^4$, $e^5$, $e^6$, and $e^7$, I wish it to be very distinctly understood that I do not at all limit myself to using an electromagnet to actuate said controlling elements, for obviously, as before pointed out, either (a) any other suitable form of motor device whatever might be substituted for the electromagnet E[10] in impelling the frame E[12] or its equivalent, or (b) said controlling elements $e$ $e'$ $e^2$, &c., might be operated by the keys directly, a separate key being provided for each of the controlling elements $e$, $e'$, $e^2$, $e^3$, $e^4$, $e^5$, $e^6$, and $e^7$, and so, also, the frames $d$ $d'$ $d^2$ $d^3$ might be operated directly each by its own keys, the keys in each case being, for example, directly connected with said controlling elements $e$ $e'$ $e^2$, &c., $d$ $d'$ $d^2$, &c., to produce the actions thereon which the key-controlled electromagnets E[10] D D' D[2] D[3] produce in the structure illustrated in the drawings, and when I speak in the statement of claim at the end hereof of a "motor" or a "motor device" as an element of a combination I wish it to be very distinctly understood that I do not at all limit or restrict myself to an electromagnetic motor or an electromagnetic motor device, for there are other forms of motor device well known to skilled mechanics generally, and particularly to persons skilled in the construction of keyboard instruments, which may be used instead of an electromagnetic motor as general equivalents thereof. I do not at all limit myself, therefore, to using an electric or electromagnetic motor.

It will be observed that the element $e$ in the group of elements $e$ $e'$ $e^2$ $e^3$, &c., controlled by the keys C C' C[2] C[3], &c., is normally connected with the motor device and that the parts are arranged in such a manner that when any other element of said group is connected with said motor device the element $e$ is disconnected therefrom. This is an important feature of my invention, for by means of it I make it possible to print letters from the keys B', B[2], and B[3], acting singly, whereas without the element $e$ (normally connected with the motor and arranged to be disconnected therefrom when any other element of the same group is connected therewith) it would be necessary to depress some one of the finger-keys simultaneously with one of the thumb-keys to make any letter from the thumb-keys. The thumb-keys acting by themselves alone would not cause any character to print.

By "thumb-keys" I mean the keys that are adapted to be operated regularly by the thumb. By "finger-keys" I mean the keys that are adapted regularly to be operated by the finger. The keys B' B[2] B[3] in the drawings are thumb-keys, while the keys C', C[2], C[3], C[4], C[5], C[6], C[7], and G are finger-keys. Of course a thumb-key may be occasionally operated by a finger and a finger-key may occasionally be operated by the thumb; but notwithstanding this any key which is regularly and properly operated by the thumb is a thumb-key and any key which is regulated and properly operated by a finger is a finger-key in the sense in which I use the language in this specification and the statement of claim at the end hereof.

It will be observed that I have arranged things in such a manner that every character is made either (a) by a finger-key acting singly or (b) by a thumb-key acting singly or (c) by the simultaneous acting of a finger-key and a thumb-key. My permutational type-bar-selecting mechanism involves a double selective action, to wit: (a) a selecting of the groups of type-bars out of which one is to be connected with the motor device and (b) a selecting of what type-bar in such group shall be connected with the motor device. The selecting of the groups, it will be observed, is controlled by the finger-keys and the selecting of the proper type-bar of the group is controlled by the thumb-keys. By this construction I at once render the mechanism simple and the operation easy. The thumb, by the action of which the various combinations are made, is a flexible and active member and combines readily with each of the fingers, and even an untrained hand has but little difficulty in learning to make all necessary combinations.

By the term "double selective devices," as the same is used in this specification, I refer to devices which serve both (a) to select what group of character-corresponding devices shall have one of its character-corresponding devices brought into action and (b) to select what character-corresponding device in such group shall be brought into action. The various forms of selecting mechanisms illustrated in the drawings are all of them double selective devices; but I do not at all limit the term "double selective devices" to devices following the details of construction illustrated in the drawings, for these details may be varied in many particulars by a skilled mechanic without material departure from certain essential features of my invention and without substantial change in result.

"Type-bar-controlling mechanism" is a term used in some of the paragraphs of claim at the end hereof. By "type-bar-controlling mechanism" I refer broadly to any means, device, mechanism, or combination of parts for controlling the type-bars of a writing-machine. "Type-bar-controlling mechanism" is a broader term than "permutational type-bar-selecting device" and includes alike permutational and non-permutational devices used to control the type-bars of a writing-machine.

In various places in the statement of claim at the end hereof I speak of a "member continuously in operative relation to an element (or to a controlling element) and movable to connect said element with the different character-corresponding devices controlled by said element." The sort of members illustrated for this purpose in the drawings are the pins $k$ $k'$ $k^2$ $k^3$, &c.; but any other suitable parts or devices may be used as members in place of said pins. I have used several different kinds of members.

By saying that the member aforesaid is continuously in operative relation to the element controlling it, or by using other language of similar import, I mean that however said member may be moved to bring it into operative relation to the different levers $f\,f\,f\,f$, or their equivalents, it is always, when it is in position to operate any one of said levers $f\,f$ of the group which it controls, in position to be operated by the element controlling it.

An important feature of my invention consists in using a single motor to actuate all the type-bars of a plurality of groups, employing one set or group of elements to control the groups of type-bars aforesaid and another set or group of elements to control what type-bar in a group shall be connected with the motor device. Thus in the device of Figs. 2 and 3 each of the elements $e'\,e^2\,e^3$, &c., (themselves controlled by the keys $C'\,C^2\,C^3$, &c., and the motor $E^{10}$, serving for them all,) controls a different group of type-bars, and the other elements $d$, $d'$, $d^2$, and $d^3$ (themselves controlled by the keys $B'\,B^2\,B^3$) control what type-bar of the group shall be connected with the motor, and in the device of Figs. 9 and $9^a$ each of the elements $e'\,e^2\,e^3$ controls a group of type-bars, and the keys $B'\,B^2\,B^3$, by shifting the pin-carrier K, control what type-bar of a group shall be connected with the motor device. By this construction a single motor can be made to serve for any number of type-bars. The mechanical structure of the device is made to be very simple, (see Figs. 2, 3, 9, $9^a$, 10, and 11,) and the operator, having never to depress more than two keys to make any letter, (to wit, one of the keys $C'$, $C^2$, $C^3$, $C^4$, $C^5$, $C^6$, and $C^7$ controlling the different group-controlling elements $e'$, $e^2$, $e^3$, $e^4$, $e^5$, $e^6$, and $e^7$ and one of the keys $B'\,B^2\,B^3$, which control what type-bar of the group shall be connected with the motor device,) can easily learn and readily operate the device.

The means illustrated in the drawings (see Figs. 2, 3, 9, $9^a$, 10, and 11) of connecting the different type-bars or other character-corresponding devices with the motor device $E^{10}$ (or with any other motor device that may be substituted for it or used instead of it) are as good as any that I know; but I do not at all limit myself to them, for obviously persons skilled in the art can vary the details of the structure shown in the drawings within very wide limits without essential departure from the spirit of my invention and without material change in results. It is to the statement of claim at the end hereof that one must look for a statement of the essentials of the invention and not to the drawings, for the drawings illustrate only two out of many forms of device which I have contrived, all falling within the same essential principles and leading combinations of my invention. In the drawings, indeed, I illustrate that form of my invention which I consider best, and also one out of many modified or alternative constructions falling within the same essential principles of my invention. In the body of this specification I explain in full the details of the construction figured in the drawings, so as to enable any person skilled in the art to construct a machine according to my invention; but it is in the statement of claim alone that I attempt to point out the essentials of the invention itself, which may be embodied in means similar in certain essential features to those illustrated in the drawings, but differing in appearance, in form, and, in some ways, in substance from what is illustrated in the drawings.

In the drawings, Figs. 9 and $9^a$, I show four levers $f\,f$ in each of the groups controlled by the keys $C'$, $C^2$, $C^3$, $C^4$, $C^5$, $C^6$, and $C^7$, and the carrier K is given four positions to bring each of the levers $f\,f$ of a group into operative relation with the corresponding group-controlling lever $e'$, $e^2$, $e^3$, $e^4$, $e^5$, $e^6$, or $e^7$ whereby it is controlled; but obviously a larger number of groups of the levers $f\,f$ might be used, (with a larger number of keys $C'\,C^2\,C^3$, &c., and group-controlling levers $e'\,e^2\,e^3$, &c.,) and a smaller number of levers $f\,f$ might be used in each group, in which case the carrier K would require to be moved into fewer positions. By increasing the number of the group-controlling devices and reducing the number of the levers $f\,f$ in a group and the number of positions to be given to the carrier K, with its pins $k'\,k^2\,k^3$, &c., the vibrations of said carrier when it reaches the required position are more easily subdued. The returning-spring for said carrier does not need to be so strong, and the touch upon the key or keys by which said carrier is positioned is made lighter. On the other hand, a less number of characters can be made with the same number of keys; but these are matters which the constructor can vary to suit his own ideas and the requirements of his special type of machine.

The principle of my invention is the same whether two, three, or four or more levers $f\,f$ be used in a group and whether a small number of group-controlling elements be used, as shown in the drawings, or a larger number. It may be worth while to observe that the magnet $E^{10}$ should not be too quick acting. It should not act so quickly but that the carrier K will have time to assume its proper position to bring the pin upon which the group-controlling lever, as $e'\,e^2$, &c., is to act into operative relation with that one of the levers $f\,f$ which is to be moved before the motor-magnet $E^{10}$ gives movement to said group-controlling lever. As it is common electrical knowledge how to make a magnet quick or slow acting—as, for example, by decreasing or increasing the self-induction of its circuit by varying the cross-section and winding of said magnet, the weight of its armature, the distance which said armature lies from said magnet, the strength of the armature-retaining spring, &c.—I need not go into the matter here further than to say that it is well to so adjust the electrical contacts that the frame 18 will not close the circuit of the motor-magnet E¹⁰ until the keys depressed have reached or almost reached the limit of their depression.

I have spoken of the device illustrated in Figs. 1 to 8 and hereinbefore described as the preferred form of device. I deem it preferable by reason of the fact that the touch of the thumb-keys D', D², and D³ is uniform and the action very rapid; but in respect of simplicity and cheapness of construction the device of Figs. 9 and 9ª is to be preferred. Each device, however, has some advantage peculiar to itself in addition to those advantages which they have in common.

I do not limit myself, I wish it to be very distinctly understood, to the use of electromagnets or electromagnetic mechanism for operating the oscillating frame E¹² or its equivalent, for obviously such an oscillating frame may be operated otherwise than by an electromagnet. It may be operated by the power of the hand. It may be operated by a pneumatic power device of the sort commonly employed in organs to operate the valves thereof in so-called "pneumatic" actions, the frame 18 of the drawings being adapted to control the valve mechanism of said pneumatic power device. A friction-driver motor device may be used to impel said frame E¹² or its equivalent, the frame 18 being adapted to press the contact-piece of said friction-driver motor device against the rotating shaft or wheel thereof, said contact-piece being connected with the frame E¹², so that said contact-piece, when moved by the friction-driver, gives movement to the frame E¹²; or a spring motor device may be used to impel said frame E¹², the frame 18 being arranged to bring said spring-motor into action upon the frame E¹². In any of these cases the frame E¹² controlled by the right-hand keys may be made to be slower acting than the frame E¹² controlled by the left-hand keys by making said right-hand-controlled frame E¹² heavier or giving it a larger initial movement before it acts upon the part E E' E² E³, &c., or in any other suitable manner; and I wish it to be understood that as other forms of motor device may be used than an electromagnetic motor device I do not at all limit myself to an electromagnetic motor device in the carrying out of certain important features of my invention.

The principal features of my invention are applicable to linotype-machines and other type-setting machines, as well as to typewriting machines. For the type-bars, which the selecting devices in the drawings work upon, the matrix-controlling escapement devices of the well-known Mergenthaler linotype-machine (by the action of which escapement devices the matrices corresponding to the various letters and other characters are released, so that they fall one by one upon the conveying-belt, by which they are carried to the assembling mechanism) may be substituted. The levers $fff$ in the drawings, or their equivalents, may be made to control the matrices of a linotype-machine either (a) by connecting said levers $fff$ to the key-levers of a linotype-machine, so that they will pull down the front ends of said key-levers as they now pull down the short ends of the type-levers $a$ $a$ and $a'$ $a'$, or (b) by inverting the parts, so that the rods $h$ $h$ will be thrust upward by the action of the magnets E E' E², &c., upon the levers $ff$, and connecting the levers $fff$ more directly to the escapement devices of the linotype, whereby the matrices are dropped upon the conveying-belt, each as required.

Fig. 10, which is a view similar to Fig. 3, shows one of my permutational character-selecting devices of the sort illustrated in Figs. 2 and 3 connected to operate the escapement devices of a Mergenthaler linotype-machine, and Fig. 11, which is a view similar to Fig. 9ª, shows another kind or species of my character-selecting mechanism connected to operate the escapement devices of a linotype-machine. In each case the levers $ff$, the mechanism for controlling which has already been fully described, are connected, through the pull-downs $hh$, with the levers P P, (centered at $p$ $p$,) which answer to the key-levers of a Mergenthaler linotype and serve to actuate the rods or push-ups Q Q, each of which controls one of the escapement devices R $r'$ $r²$, by the action of which escapement devices the matrices $y$ $y$ are released one by one, as required, and left free to drop upon the conveying-belt, by which they are carried to the assembling mechanism. The parts last mentioned, being well known and, in fact, universally understood in the art and forming no part of my invention, are not illustrated in the drawings.

Obviously by inverting the parts the rods $h$ $h$ might be connected with the escapement devices directly either in the manner above described or by connecting said rods $h$ $h$ to the opposite ends of the escapement-levers from that with which the rods Q Q are connected.

Many other modifications will occur to persons skilled in the art which it would be useless to attempt to enumerate.

In applying my invention to a machine having a very large number of keys the number of the character-corresponding levers $fff$ and of the frames $d$ $d'$ $d²$, &c., $e$ $e'$ $e²$, &c., should be increased. We have already seen that the number of the levers $ff$ cannot exceed the product of the number of frames of one set (as $d$ $d'$ $d²$ $d³$) multiplied by the number of frames of the other set, (as $e$ $e'$ $e²$, &c.) Suppose, for example, that it is desired to construct a permutational character-selecting device such, in substance, as one of those illustrated in Fig. 2, but adapted to operate the ninety escapement devices of a Mergenthaler linotype. We will require ninety of the character-corresponding levers $fff$. For operating these (a) We may use, say, twelve of the group-controlling bell-cranks $e\ e'\ e^2$, &c., controlled by eleven C-group keys and the frame C, and eight of the frames $d\ d'\ d^2$, &c., controlled by seven B-group keys and the frame B, in which case it would be convenient to arrange the B-group keys in two banks, (a bank of long or white keys and a bank of short or black keys.) Some of the bell-cranks $e\ e'\ e^2$, &c., will control eight of the character-corresponding levers $f\ f\ f$, and others of said bell-cranks will control seven of said levers $f\ f\ f$; or (b) We may use, say, twenty-four group-controlling bell-cranks $e\ e'\ e^2$, &c., and use only the four frames $d,\ d',\ d^2$, and $d^3$ already described, reduplicating or repeating the keyboard consisting of keys $B'$, $B^2$, $B^3$, $C^7$, $C^6$, $C^5$, $C^4$, G, $C^3$, $C^2$, and $C'$ three times, (as successive octaves are repeated in the keyboard of a pianoforte or organ.) In this case each of the C-group keys (and two of the G-group keys) should be arranged to control a different one of the bell-cranks $e\ e'\ e^2$, &c., while the three keys $B'$ (one in each of the three sets or octaves above described) would each alike control the same magnet $D'$ and frame $d'$. The three keys $B^2$ would each alike control the magnet $D^2$ and frame $d^2$, and the three keys $B^3$ would each alike control the magnet $D^3$ and frame $d^3$. One of the keys G would control the space-magnet $H^{61}$; but said space-magnet of course, it will be understood, when applied to a linotype-machine, should be connected to actuate the lever well known in the art, by the action of which the space-wedges are caused to drop into their proper positions among the matrices forming into line; or (c) a permutational device having the same number of bell-cranks $e\ e'\ e^2$, &c., and frames $d\ d'\ d^2\ d^3$ as that illustrated in the accompanying drawings might be employed to operate escapements of a linotype controlling the lower-case matrices and the matrices corresponding to certain of the more frequently occurring marks of punctuation, (such as the period, the comma, the semicolon, the apostrophe, and the hyphen,) while the escapements that control the upper-case matrices, the numeral-matrices, and the matrices corresponding to the less-frequently-occurring marks and signs might be controlled by the keys now commonly used for the purpose, a different key for each different escapement.

The permutational character-selecting mechanism illustrated in the drawings and hereinbefore fully described may be used in any sort of type-writing machine, type-setting machine, linotype-machine, monotype-machine, or other similar machines used as a substitute for writing by hand or for setting type by hand and having keys corresponding to the characters produced.

Various ways will occur to skilled mechanics of applying my permutational character-selecting mechanism described herein to the different machines last above mentioned. I will mention one way by which it may be applied to all, retaining the machinery of any type-writing or other machine of the sort mentioned at the beginning of this paragraph: Connect the character-corresponding levers $f\ f$ to operate the keys of such machine.

For all uses of my invention, whether applied to the working of a single set of type-bars or to the working of two sets of type-bars in a type-writing machine or to the working of a single set of matrix-controlling escapements or to the working of two coöperating sets of matrix-controlling escapements in a linotype-machine or to the working of one set or of two sets of letter-controlling devices of any other sort whatever, whether in a type-writing machine or in a linotype or monotype machine or other type-setting machine, I desire full protection, and I wish it to be distinctly understood that I do not dedicate any part of my invention to the public.

I do not claim herein any part of the subject-matter of my other pending applications, Serial No. 601,520, filed August 3, 1896; Serial No. 609,489, filed October 21, 1896; Serial No. 650,111, filed August 31, 1897, the latter being a division of original application, Serial No. 609,489, before mentioned; Serial No. 647,862, filed August 11, 1897, and Serial No. 676,551, filed April 5, 1898, and, finally, I wish it to be very clearly understood that I do not at all limit or restrict myself to the details hereinbefore described in illustration of my invention. Manifestly these can be varied in many particulars by skilled mechanics without material change in result and without essential departure from the spirit of my invention; but

What I claim as my invention, and desire to secure by Letters Patent, is—

1. In a type-writing machine, or other similar instrument, an organization for producing consecutive letters by simultaneous actions of the operator, said organization including (a) two sets of type-bars; (b) two sets of keys; (c) a quick-acting motor device controlled by the keys of one set and serving to impel all the type-bars controlled by said keys, each type-bar as required; and (d) a slow-acting motor device controlled by the keys of the other set and serving to impel all the type-bars controlled by such keys, each type-bar as required; the quick-acting motor device and the slow-acting motor device aforesaid having such differing rapidities of action that when keys of the two sets aforesaid are depressed simultaneously, the type-bars brought into action respectively by them print in rapid succession.

2. In a type-writing machine, or other similar instrument, an organization for producing consecutive letters by simultaneous actions of the operator, said organization including (a) two sets of type-bars; the bars of each set striking to a printing-point common to the bars of such set, the printing-points of the two sets of bars being adjacent to each other; (b) two sets of keys; (c) a quick-acting motor device, controlled by the keys of one set and serving to impel all the type-bars controlled by said keys, each type-bar as required; and (d) a slow-acting motor device controlled by the keys of the other set and serving to impel all the type-bars controlled by such keys, each type-bar as required; the quick-acting motor device and the slow-acting motor device aforesaid having such differing rapidities of action that when keys of the two sets aforesaid are depressed simultaneously, the type-bars brought into action respectively by them print in rapid succession.

3. In a type-writing machine or other similar instrument an organization for producing consecutive letters by simultaneous actions of the operator, said organization including, in combination, two sets of type-bars; a quick-acting motor, operating to impel all the type-bars of one set; and a slow-acting motor, operating to impel all the type-bars of the other set; and permutational character-selecting mechanism for each set of type-bars, whereby the two motors aforesaid are caused each to impel the required type-bar of the set of type-bars controlled by said motor.

4. In a type-writing machine or other similar instrument, an organization for producing consecutive letters by simultaneous actions of the operator, said organization including, in combination, two sets of type-bars; a quick-acting type-bar-controlling mechanism, operating upon the type-bars of one of the sets before mentioned, and serving to bring the bars of such set into action individually; and a slow-acting type-bar-controlling mechanism, operating upon the type-bars of the other set, and serving to bring the bars of such set into action individually; one of said type-bar-controlling mechanisms being a permutational type-bar-selecting device including (a) a motor device whereby all the type-bars of one of the two sets aforesaid are impelled, each type-bar as required; said type-bars being normally disconnected from said motor device; (b) keys, whereby the type-bars aforesaid are connected, each type-bar as required, with the motor device aforesaid; and (c) a motor-controlling device operated by a plurality of the keys aforesaid and serving to bring the motor device aforesaid into action for the impelling of the type-bar connected with it.

5. In a type-writing machine or other similar instrument, an organization for producing consecutive letters by simultaneous actions of the operator, said organization including, in combination, two sets of type-bars; a quick-acting type-bar-controlling mechanism, operating upon the type-bars of one of the sets before mentioned and serving to bring the bars of such set into action individually; and a slow-acting type-bar-controlling mechanism operating upon the type-bars of the other set, and serving to bring the bars of such set into action individually; one of said type-bar-controlling mechanisms being a permutational type-bar-selecting device, said permutational type-bar-selecting device, including (a) controlling elements, by the coacting of which the different type-bars aforesaid are brought into action each as required and (b) a motor device serving to actuate a plurality of the controlling elements aforesaid, each as required.

6. In a type-writing machine or other similar instrument, an organization for producing consecutive letters by simultaneous actions of the operator, said organization including, two sets of type-bars; a quick-acting type-bar-controlling mechanism, operating upon the type-bars of one of the sets before mentioned and serving to bring the bars of such set into action individually; and a slow-acting type-bar-controlling mechanism, operating upon the type-bars of the other set, and serving to bring the bars of such set into action individually; one of said type-bar-controlling mechanisms being a permutational type-bar-selecting device, said permutational type-bar-selecting device, including (a) controlling elements, by the coacting of which the different type-bars aforesaid are brought into action each as required; (b) a motor device, serving to actuate a plurality of the controlling elements aforesaid; (c) key mechanism, whereby the controlling elements aforesaid are connected, each as required, with the motor device aforesaid.

7. In a type-writing machine or other similar instrument, an organization for producing consecutive letters by simultaneous actions of the operator, said organization including, in combination, two sets of type-bars; a quick-acting type-bar-controlling mechanism, operating upon the type-bars of one of the sets before mentioned and serving to bring the bars of such set into action individually; and a slow-acting type-bar-controlling mechanism, operating upon the type-bars of the other set, and serving to bring the bars of such set into action individually; one of said type-bar-controlling mechanisms being a permutational type-bar-selecting device, said permutational type-bar-selecting device, including (a) controlling elements by the coacting of which the different type-bars aforesaid are brought into action, each as required; (b) a motor device serving to actuate a plurality of the controlling elements aforesaid; and (c) keys whereby the controlling elements aforesaid are connected, each as required, with the motor device aforesaid, said keys serving also to bring said motor device into action for the impelling of the controlling element connected with it.

8. In a type-writing machine, a set of type-bars striking to a common printing-center; group-controlling devices, each controlling a group of the type-bars aforesaid, a plurality of the type-bars in each group being normally disconnected from the group-controlling device corresponding to them; means whereby the different type-bars of a group are connected with the proper group-controlling device, each as required; a motor, serving for the impelling of all the type-bars above mentioned; and means whereby the different group-controlling devices aforesaid are connected with said motor, each as required; said group-controlling devices being normally disconnected from said motor.

9. In combination, (A) a set of character-corresponding devices; (B) keys, fewer in number than the character-corresponding devices aforesaid; (C) a single motor device controlled by said keys, and acting to operate the character-corresponding devices aforesaid, each as required; and (D) permutational connections intermediate said motor and the character-corresponding devices aforesaid; said permutational connections being controlled by the keys aforesaid.

10. In combination, (A) a set of character-corresponding devices; (B) keys fewer in number than the character-corresponding devices aforesaid; (C) a motor device controlled by a plurality of said keys and acting to operate the character-corresponding devices aforesaid, each as required; and, (D) permutational connections intermediate said motor and the character-corresponding devices aforesaid; said permutational connections being controlled by the keys aforesaid; said keys serving, when depressed, (a) to affect the permutational connections intermediate the motor aforesaid and the character-corresponding devices, thereby selecting one of said character-corresponding devices to be actuated, and, (b) to bring the motor aforesaid into operation, so that it acts upon said character-corresponding devices.

11. In combination with suitable character-corresponding devices, permutational selecting mechanism, having (a) a plurality of controlling elements; and (b) a motor device, serving to actuate a plurality of the controlling elements before mentioned each as required.

12. In combination with suitable character-corresponding devices, permutational selecting mechanism, having (a) a plurality of controlling elements; (b) a motor device, serving to actuate a plurality of the controlling elements before mentioned, each as required, said controlling elements being normally disconnected from said motor; and (c) key mechanism, whereby the controlling elements last above mentioned are connected, each as required, with the motor device aforesaid.

13. In combination with suitable character-corresponding devices, permutational selecting mechanism, having (a) a plurality of controlling elements; (b) a motor device, serving to actuate a plurality of the controlling elements aforesaid; (c) keys, operating to connect the controlling elements last aforesaid, each as required, with the motor device aforesaid; and (d) means actuated by the keys aforesaid and serving to bring the motor device aforesaid into operation for the actuating of the controlling elements aforesaid.

14. In combination with suitable character-corresponding devices, permutational character-selecting mechanism having (a) controlling elements fewer in number than the character-corresponding devices controlled thereby; and (b) a motor device, serving to actuate a plurality of the controlling elements before mentioned, each as required; the controlling elements before mentioned, acting, when moved by the motor device aforesaid to communicate movement to the proper character-corresponding device.

15. In combination with suitable character-corresponding devices, permutational character-selecting mechanism, having (a) controlling elements fewer in number than the character-corresponding devices controlled thereby; (b) a motor device, serving to actuate a plurality of the controlling elements before mentioned, each as required, said controlling elements being normally disconnected from said motor; and (c) key mechanism, whereby the controlling elements last above mentioned are connected, each as required, with the motor device aforesaid; the controlling elements before mentioned, acting, when moved by the motor device aforesaid, to communicate movement to the proper character-corresponding device.

16. In combination with suitable character-corresponding devices, permutational character-selecting mechanism, having (a) controlling elements fewer in number than the character-corresponding devices controlled thereby; (b) a motor device, serving to actuate a plurality of the controlling elements aforesaid; and (c) keys, whereby the controlling elements last aforesaid are connected, each as required, with the motor device aforesaid, said keys serving also to bring said motor device into action for the actuating of the controlling elements aforesaid; the controlling elements before mentioned, acting, when moved by the motor device aforesaid to communicate movement to the proper character-corresponding device.

17. In a type-writing machine, and in combination therein (A) a set of type-bars arranged in such a manner that they strike to a common printing-center; (B) keys, fewer in number than said type-bars; (C) a single motor device, controlled by said keys and acting to operate the type-bars aforesaid, each as required; and, (D) permutational connections intermediate said motor and the type-bars aforesaid; said permutational connections being controlled by the keys aforesaid.

18. In a type-writing machine, and in combination therein, (A) a set of type-bars arranged in such a manner that they strike to a common printing-center; (B) keys fewer in number than said type-bars; (C) a single motor device controlled by said keys and acting to operate the type-bars aforesaid, each as required; and, (D) permutational connections intermediate said motor and the type-bars aforesaid; said permutational connections being controlled by the keys aforesaid; said keys serving, when depressed, (a) to affect the permutational connections intermediate the motor aforesaid and the type-bars, thereby selecting one of said type-bars to be actuated, and (b) to bring the motor aforesaid into operation, so that it acts upon said type-bar.

19. In a type-writing machine, and in combination therein with the type-bars, arranged to strike to a common printing-center, permutational selecting mechanism, having (a) controlling elements fewer in number than the type-bars controlled by them; and (b) a motor device, serving to actuate a plurality of the controlling elements before mentioned, each as required.

20. In a type-writing machine, and in combination therein with type-bars, arranged to strike to a common printing-center, permutational selecting mechanism, having (a) controlling elements, fewer in number than the type-bars controlled by them; (b) a motor device, serving to actuate a plurality of the controlling elements before mentioned, each as required, said controlling elements being normally disconnected from said motor; and (c) key mechanism, whereby the controlling elements last above mentioned are connected each as required, with the motor device aforesaid.

21. In a type-writing machine, and in combination therein with type-bars, arranged to strike to a common printing-center, permutational selecting mechanism, having (a) controlling elements, fewer in number than the type-bars controlled by them; (b) a motor device, serving to actuate a plurality of the controlling elements aforesaid; and (c) keys, operating to connect the controlling elements last aforesaid, each as required, with the motor device aforesaid, said keys serving also to bring said motor device into action for the actuating of the controlling elements aforesaid.

22. In a type-writing machine, and in combination therein with type-bars, arranged so that they strike to a common printing-center, permutational character-selecting mechanism, having (a) controlling elements fewer in number than the type-bars operated thereby; and (b) a motor device, serving to actuate a plurality of the controlling elements before mentioned, each as required; the controlling elements before mentioned acting, when moved by the motor device, to communicate movement to the proper type-bar.

23. In a type-writing machine, and in combination therein with type-bars, arranged so that they strike to a common printing-center, permutational character-selecting mechanism, having (a) controlling elements fewer in number than the type-bars operated thereby; (b) a motor device, serving to actuate a plurality of the controlling elements before mentioned, each as required, said controlling elements being normally disconnected from said motor; and (c) key mechanism, whereby the controlling elements last above mentioned are connected each as required, with the motor device aforesaid; the controlling elements before mentioned, acting, when moved by the motor device, to communicate movement to the proper type-bar.

24. In a type-writing machine, and in combination therein with type-bars, arranged so that they strike to a common printing-center, permutational character-selecting mechanism, having (a) controlling elements fewer in number than the type-bars operated thereby; (b) a motor device, serving to actuate a plurality of the controlling elements aforesaid; and (c) keys, whereby the controlling elements last aforesaid are connected, each as required with the motor device aforesaid, said keys serving also to bring said motor device into action for the actuating of the controlling elements aforesaid; the controlling elements before mentioned acting, when moved by the motor device, to communicate movement to the proper type-bar.

25. In a type-writing machine, an organization for producing consecutive letters by simultaneous actions of the operator, said organization including, (A) two sets of type-bars, the bars of each set striking to a printing-center common to the bars of such set, the printing-points of the two sets of bars being adjacent to each other; (B) type-bar-controlling mechanism serving for the operating of the bars of one of the two sets above mentioned; said type-bar-controlling mechanism including (a) keys, fewer in number than said type-bars; (b) a single motor device controlled by said keys, and acting to operate the type-bars aforesaid, each as required; and, (c) permutational connections intermediate said motor and the type-bars aforesaid; said permutational connections being controlled by the keys aforesaid; and, (C) suitable means for operating the type-bars of the other one of the two sets above mentioned.

26. In a type-writing machine, an organization for producing consecutive letters by simultaneous actions of the operator, said organization including, (A) two sets of type-bars, the bars of each set striking to a printing-point common to the bars of such set, the printing-points of the two sets of bars being adjacent to each other; (B) type-bar-controlling mechanism serving for the operating of the bars of one of the two sets above mentioned; said type-bar-controlling mechanism including, (a) keys fewer in number than said type-bars; (b), a single motor device controlled by said keys, and acting to operate the type-bars aforesaid, each as required; and, (c) permutational connections intermediate said motor and the type-bars aforesaid; said permutational connections being controlled by the keys aforesaid; said keys serving, when depressed, (1) to affect the permutational connections intermediate the motor aforesaid and the type-bars, thereby selecting one of said type-bars to be actuated, and (2) to bring the motor aforesaid into operation so that it acts upon said type-bar; and, (C) suitable means for operating the type-bars of the other one of the two sets above mentioned.

27. In a type-writing machine, an organization for producing consecutive letters by simultaneous actions of the operator, said organization including, (A) two sets of type-bars, the bars of each set striking to a printing-center common to the bars of such set, the printing-centers of the two sets of bars being adjacent to each other; (B) type-bar-controlling mechanism serving for the operating of the bars of one of the two sets above mentioned; said type-bar-controlling mechanism including (a) keys, fewer in number than said type-bars; (b) a single motor device controlled by said keys, and acting to operate the type-bars aforesaid, each as required; and, (c) permutational connections intermediate said motor and the type-bars aforesaid; said permutational connections being controlled by the keys aforesaid; and, (C) type-bar-controlling mechanism similar to that last above described, serving to operate the type-bars of the other one of the two sets above mentioned.

28. In a type-writing machine, an organization for producing consecutive letters by simultaneous actions of the operator, said organization including, (A) two sets of type-bars, the bars of each set striking to a printing-point common to the bars of such set, the printing-points of the two sets of bars being adjacent to each other; (B) type-bar-controlling mechanism serving for the operating of the bars of one of the two sets above mentioned; said type-bar-controlling mechanism including, (a) keys fewer in number than said type-bars; (b), a single motor device controlled by said keys, and acting to operate the type-bars aforesaid, each as required; and, (c) permutational connections intermediate said motor and the type-bars aforesaid; said permutational connections being controlled by the keys aforesaid; said keys serving, when depressed, (a) to affect the permutational connections intermediate the motor aforesaid and the type-bars, thereby selecting one of said type-bars to be actuated, and, (b) to bring the motor aforesaid into operation so that it acts upon said type-bar; and, (C) type-bar-controlling mechanism similar to that last above described, serving to operate the type-bars of the other one of the two sets above mentioned.

29. In a type-writing machine, an organization for producing consecutive letters by simultaneous actions of the operator, said organization including (A) two sets of type-bars, the bars of each set striking to a printing-point common to the bars of such set, the printing-points of the two sets of bars being adjacent to each other; (B) permutational selecting mechanism, serving for the operating of the bars of one of the two sets before mentioned; said permutational selecting mechanism having (a) controlling elements, fewer in number than the type-bars controlled by them; and (b) a motor device serving to actuate a plurality of the controlling elements before mentioned each as required; and (C) suitable means for operating the type-bars of the other one of the two sets above mentioned.

30. In a type-writing machine, an organization for producing consecutive letters by simultaneous actions of the operator, said organization including (A) two sets of type-bars, the bars of each set striking to a printing-point common to the bars of such set, the printing-points of the two sets of bars being adjacent to each other; (B) permutational selecting mechanism, serving for the operating of the bars of one of the two sets before mentioned; said permutational selecting mechanism having (a) controlling elements fewer in number than the type-bars controlled by them; (b) a motor device, serving to actuate a plurality of the controlling elements before mentioned, each as required, said controlling elements being normally disconnected from said motor; and (c) key mechanism whereby the controlling elements last above mentioned are connected each as required, with the motor device aforesaid; and (C) suitable means for operating the type-bars of the other one of the two sets above mentioned.

31. In a type-writing machine, an organization for producing consecutive letters by simultaneous actions of the operator, said organization including (A) two sets of type-bars, the bars of each set striking to a printing-point common to the bars of such set, the printing-points of the two sets of bars being adjacent to each other; (B) permutational selecting mechanism serving for the operating of the bars of one of the two sets before mentioned; said permutational selecting mechanism having (a) controlling elements, fewer in number than the type-bars controlled by them; (b) a motor device serving to actuate a plurality of the controlling elements aforesaid; and (c) keys, operating to connect the controlling elements last aforesaid, each as required, with the motor device aforesaid, said keys serving also to bring said motor device into action for the actuating of the controlling elements aforesaid; and (C) suitable means for operating the type-bars of the other one of the two sets above mentioned.

32. In a type-writing machine, an organization for producing consecutive letters by simultaneous actions of the operator, said organization including (A) two sets of type-bars, the bars of each set striking to a printing-point common to the bars of such set, the printing-points of the two sets of bars being adjacent to each other; (B) permutational selecting mechanism, serving for the operating of the bars of one of the two sets before mentioned; said permutational selecting mechanism having; (a) controlling elements fewer in number than the type-bars operated thereby; and (b) a motor device, serving to actuate a plurality of the controlling elements before mentioned, each as required; the controlling elements before mentioned acting, when moved by the motor device, to communicate movement to the proper type-bar; and (C) suitable means for operating the type-bars of the other one of the two sets above mentioned.

33. In a type-writing machine, an organization for producing consecutive letters by simultaneous actions of the operator, said organization including (A) two sets of type-bars, the bars of each set striking to a printing-point common to the bars of such set, the printing-points of the two sets of bars being adjacent to each other; (B) permutational selecting mechanism, serving for the operating of the bars of one of the two sets before mentioned; said permutational selecting mechanism having (a) controlling elements fewer in number than the type-bars operated thereby; (b) a motor device, serving to actuate a plurality of the controlling elements before mentioned, each as required, said controlling elements being normally disconnected from said motor; and (c) key mechanism, whereby the controlling elements last above mentioned are connected each as required, with the motor device aforesaid; the controlling elements before mentioned acting, when moved by the motor device, to communicate movement to the proper type-bar; and (C) suitable means for operating the type-bars of the other one of the two sets before mentioned.

34. In a type-writing machine, an organization for producing consecutive letters by simultaneous actions of the operator, said organization including (A) two sets of type-bars, the bars of each set striking to a printing-point common to the bars of such set, the printing-points of the two sets of bars being adjacent to each other; (B) permutational selecting mechanism, serving for the operating of the bars of one of the two sets before mentioned; said permutational selecting mechanism having (a) controlling elements fewer in number than the type-bars operated thereby; (b) a motor device, serving to actuate a plurality of the controlling elements aforesaid; and (c) keys, whereby the controlling elements last aforesaid are connected, each as required with the motor device aforesaid, said keys serving also to bring said motor device into action for the actuating of the controlling elements aforesaid; the controlling elements before mentioned acting, when moved by the motor device, to communicate movement to the proper type-bar; and (C) suitable means for operating the type-bars of the other one of the two sets above mentioned.

35. In a type-writing machine, an organization for producing consecutive letters by simultaneous actions of the operator, said organization including (A) two sets of type-bars, the type-bars of each set striking to a printing-point common to the type-bars of such set, the printing-points of the two sets of type-bars being adjacent to each other; (B) permutational selecting mechanism, serving for the operating of the type-bars of one of the two sets before mentioned; said permutational selecting mechanism having (a) keys fewer in number than the type-bars controlled thereby; (b) a motor device, common to said type-bars and whereby all said type-bars are actuated, each as required; said type-bars being normally disconnected from said motor device; and (c) means whereby said type-bars are connected with the motor device before mentioned, each as required; said motor device being brought into action by the keys before mentioned, and operating thereupon independently of said keys to impel the type-bar corresponding to the key or combination of keys depressed; and (C) suitable means for operating the type-bars of the other one of the two sets above mentioned.

36. In a type-writing machine, an organization for producing consecutive letters by simultaneous actions of the operator, said organization including (A) two sets of type-bars, the type-bars of each set striking to a printing-point common to the type-bars of such set, the printing-points of the two sets of type-bars being adjacent to each other; (B) permutational selecting mechanism, serving for the operating of the type-bars of one of the two sets before mentioned; said permutational selecting mechanism having (a) keys fewer in number than the type-bars controlled thereby; (b) a motor device, common to said type-bars and whereby all said type-bars are actuated, each as required; said type-bars being normally disconnected from said motor device; (c) means whereby said type-bars are connected with the motor device before mentioned, each as required; and (d) means whereby the keys are arrested; the keys serving when depressed to bring the motor device aforesaid into action; said motor serving after the keys have been depressed and arrested, to impel the type-bar independently of the keys; and (C) suitable means for operating the type-bars of the other one of the two sets above mentioned.

37. In a permutational character-selecting device, (a) a motor; (b) a group of elements adapted to be impelled by said motor, each as required; one of said elements being normally connected with said motor; and (c) means whereby the element before mentioned as being normally connected with the motor aforesaid is disconnected from said motor when any other element of the group of elements before mentioned is connected with said motor.

38. In a permutational character-selecting device, (a) a motor; (b) a group of elements adapted to be impelled by said motor, each as required; one of said elements being normally connected with said motor; (c) key mechanism whereby the other elements of the group of elements aforesaid are connected with the motor aforesaid, each as required; and (d) means whereby the element before mentioned as being normally connected with the motor aforesaid is disconnected from said motor when one of the other elements of the group of elements aforesaid is connected with said motor.

39. In a permutational character-selecting device, (a) a motor; (b) a group of elements adapted to be impelled by said motor, each as required; one of said elements being normally connected with said motor; (c) keys whereby the other elements of the group aforesaid are connected with the motor aforesaid, each as required; and (d) means operated by said keys and serving to break the connection between the motor aforesaid and that one of the elements before mentioned as being normally connected with said motor.

40. A permutational character-selecting mechanism, having (a) a plurality of controlling elements; and (b) a motor serving to actuate all said controlling elements, each as required; one of the controlling elements aforesaid being normally adapted to be operated by the motor aforesaid.

41. A permutational character-selecting mechanism, having (a) a plurality of controlling elements; (b) a motor serving to actuate all said controlling elements, each as required; one of the controlling elements aforesaid being normally adapted to be operated by the motor aforesaid; and (c) means whereby the controlling element before mentioned as being normally adapted to be operated by the motor aforesaid, is prevented from being operated thereby when any of the other controlling elements aforesaid is operated by said motor.

42. A permutational character-selecting mechanism, having (a) a plurality of controlling elements; (b) a motor serving to actuate all said controlling elements, each as required; one of the controlling elements aforesaid being normally adapted to be operated by the motor aforesaid; (c) key mechanism whereby the other controlling elements before mentioned are connected, each as required, with the motor aforesaid; and (d) means whereby the controlling element before mentioned as being normally adapted to be operated by the motor aforesaid is prevented from being operated thereby when any of the other controlling elements before mentioned is connected with the motor aforesaid.

43. A permutational character-selecting mechanism, having (a) a plurality of controlling elements; (b) a motor serving to actuate all said controlling elements, each as required; one of the controlling elements aforesaid being normally adapted to be operated by the motor aforesaid; (c) keys, whereby the other controlling elements before mentioned are connected, each as required, with the motor aforesaid; and (d) means operated by said keys, whereby the controlling element before mentioned as being normally adapted to be operated by the motor aforesaid, is prevented from being operated thereby when any of the other controlling elements before mentioned is connected with the motor aforesaid.

44. In combination, (a) a plurality of groups of character-corresponding devices; (b) a motor; (c) a group of elements, adapted to be impelled by said motor, each element as required; each of said elements controlling one of the groups of character-corresponding devices above mentioned; one of said elements being normally connected with said motor; and (d) means whereby the element before mentioned as being normally connected with the motor aforesaid, is disconnected from said motor when any other element of the group of elements before mentioned is connected with said motor.

45. In combination, (a) a plurality of groups of character-corresponding devices; (b) a motor; (c) a group of elements adapted to be impelled by said motor, each element as required; each of said elements controlling one of the groups of character-corresponding devices above mentioned; one of said elements being normally adapted to be operated by the motor aforesaid; (d) keys acting to connect the other elements of the group of elements aforesaid with the motor aforesaid, each as required; and (e) means whereby the element before mentioned as being normally adapted to be operated by the motor aforesaid, is prevented from being operated by said motor, when any other element of the group of elements before mentioned is connected with said motor.

46. In combination, (a) a plurality of groups of character-corresponding devices; (b) a motor; (c) a group of elements adapted to be impelled by said motor, each element as required; each of said elements controlling one of the groups of character-corresponding devices above mentioned; one of said elements being normally connected with said motor; (d) keys, acting to connect the other elements of the group of elements aforesaid with the motor aforesaid, each as required; and (e) means controlled by said keys and serving to break the connection between the motor aforesaid and that one of the elements before mentioned as being normally connected with said motor.

47. In combination, (a) a plurality of groups of character-corresponding devices; (b) a motor; (c) a group of elements adapted to be impelled by said motor, each element as required; each of said elements controlling one of the groups of character-corresponding devices above mentioned; one of said elements being normally connected with the motor aforesaid; (d) keys, acting to connect the other elements of the group of elements aforesaid, with the motor aforesaid, each as required; (e) means whereby the element before mentioned as being normally connected with the motor aforesaid is disconnected from said motor, when any other element of the group of elements before mentioned is connected with said motor; and (f) keys, acting to connect the different elements of the group above mentioned with the different character-corresponding devices which they respectively control.

48. In combination, (*a*) a plurality of groups of character-corresponding devices; (*b*) a motor; (*c*) a group of elements, adapted to be impelled by said motor, each element as required; each of said elements controlling the action of one of the groups of character-corresponding devices above mentioned; one of said elements being normally connected with the motor aforesaid; (*d*) keys, acting to connect the other elements of the group of elements aforesaid with the motor aforesaid, each as required; (*e*) means controlled by the keys before mentioned and serving to break the connection between the motor aforesaid and that one of the elements before mentioned as being normally connected with said motor; and (*f*) keys, acting to connect the different elements of the group above mentioned with the different character-corresponding devices which they respectively control.

49. In a type-writing machine, and in combination therein with a set of type-bars arranged in such a manner that they strike to a common printing-center, a permutational type-bar-selecting mechanism, including, (*a*) a motor; (*b*) a group of elements adapted to be impelled by said motor, each as required; one of said elements being normally connected with said motor, and (*c*) means whereby the element before mentioned as being normally connected with the motor aforesaid is disconnected from said motor when any other element of the group of elements before mentioned is connected with said motor.

50. In a type-writing machine, and in combination therein with a set of type-bars arranged in such a manner that they strike to a common printing-center, a permutational type-bar-selecting mechanism, including, (*a*) a motor; (*b*) a group of elements adapted to be impelled by said motor, each as required; one of said elements being normally connected with said motor; (*c*) key mechanism whereby the other elements of the group of elements aforesaid are connected with the motor aforesaid, each as required; and (*d*) means whereby the element before mentioned as being normally connected with the motor aforesaid is disconnected from said motor when one of the other elements of the group of elements aforesaid is connected with said motor.

51. In a type-writing machine, and in combination therein with a set of type-bars arranged in such a manner that they strike to a common printing-center, a permutational type-bar-selecting mechanism, including, (*a*) a motor; (*b*) a group of elements adapted to be impelled by said motor, each as required; one of said elements being normally connected with said motor; (*c*) keys whereby the other elements of the group aforesaid are connected with the motor aforesaid, each as required; and (*d*) means operated by said keys, and serving to break the connection between the motor aforesaid and that one of the elements before mentioned as being normally connected with said motor.

52. In a type-writing machine, and in combination therein with a set of type-bars arranged in such a manner that they strike to a common printing-center, a permutational type-bar-selecting mechanism, including, (*a*) a group of controlling elements; and (*b*) a single motor serving to actuate all the controlling elements of the group aforesaid, each controlling element as required; one of the controlling elements of the group aforesaid being normally adapted to be operated by the motor aforesaid.

53. In a type-writing machine, and in combination therein with a set of type-bars arranged in such a manner that they strike to a common printing-center, a permutational type-bar-selecting mechanism, including, (*a*) a group of controlling elements; (*b*) a motor serving to actuate all the controlling elements of the group aforesaid, each controlling element as required; one of the controlling elements of the group aforesaid being normally adapted to be operated by the motor aforesaid; and, (*c*) means whereby the controlling element before mentioned as being normally adapted to be operated by the motor aforesaid, is prevented from being operated thereby when any other controlling element of the same group is operated by said motor.

54. In a type-writing machine, and in combination therein with a set of type-bars arranged in such a manner that they strike to a common printing-center, a permutational type-bar-selecting mechanism, including, (*a*) a group of controlling elements; (*b*) a motor serving to actuate all the controlling elements of the group aforesaid, each controlling element as required; one of the controlling elements of the group aforesaid being normally adapted to be operated by the motor aforesaid; (*c*) key mechanism whereby the other controlling elements of the group before mentioned are connected, each as required, with the motor aforesaid; and (*d*) means whereby the controlling element before mentioned as being normally adapted to be operated by the motor aforesaid is prevented from being operated thereby when one of the other controlling elements of the group aforesaid is connected with the motor aforesaid.

55. In a type-writing machine, and in combination therein with a set of type-bars arranged in such a manner that they strike to a common printing-center, a permutational type-bar-selecting mechanism, including, (*a*) a group of controlling elements; (*b*) a motor, serving to actuate all the controlling elements of the group aforesaid, each controlling element as required; one of the controlling elements of the group aforesaid being normally adapted to be operated by the motor aforesaid; (*c*) keys, whereby the other controlling elements of the group before mentioned are connected, each as required, with the motor aforesaid; and (d) a frame, operated by said keys, whereby the controlling element before mentioned as being normally adapted to be operated by the motor aforesaid, is prevented from being operated thereby when one of the other controlling elements of the group aforesaid, is connected with the motor aforesaid.

56. In a type-writing machine, and in combination, (a) a plurality of groups of type-bars, (b) a motor; (c) a group of elements adapted to be impelled by said motor, each element as required, each of said elements controlling one of the groups of type-bars above mentioned; one of said elements being normally connected with said motor; and (d) means whereby the element above mentioned as being normally connected with the motor aforesaid is disconnected from said motor, when any other element of the group of elements before mentioned is connected with said motor.

57. In a type-writing machine and in combination, (a) a plurality of groups of type-bars; (b) a motor; (c) a group of elements adapted to be impelled by said motor, each element as required; each of said elements controlling one of the groups of type-bars above mentioned; one of said elements being normally adapted to be operated by said motor; (d) keys, acting to connect the other element of the group of elements aforesaid with the motor aforesaid, each as required; and (e) means whereby the element above mentioned as being normally adapted to be operated by the motor aforesaid is prevented from being operated by said motor when any other element of the group of elements before mentioned is connected with said motor.

58. In a type-writing machine, and in combination, (a) a plurality of groups of type-bars, (b) a motor; (c) a group of elements adapted to be impelled by said motor, each element as required, each of said elements controlling one of the groups of type-bars above mentioned; one of said elements being normally connected with the motor aforesaid; (d) keys, acting to connect the other elements of the group of elements aforesaid with the motor aforesaid, each as required; and (e) means controlled by said keys, serving to break the connections between the motor aforesaid, and that one of the elements before mentioned as being normally connected with said motor.

59. In a type-writing machine and in combination, (a) a plurality of groups of type-bars, (b) a motor; (c) a group of elements adapted to be impelled by said motor, each element as required, each of said elements controlling one of the groups of type-bars above mentioned; one of said elements being normally connected with the motor aforesaid; (d) keys, acting to connect the other elements of the group of elements aforesaid with the motor aforesaid, each as required; (e) means, whereby the element above mentioned as being normally connected with the motor aforesaid is disconnected from said motor when any other element of the group of elements before mentioned is connected with said motor and (f) keys, acting to connect the different elements of the group above mentioned with the different type-bars which they respectively control.

60. In a type-writing machine, and in combination, (a) a plurality of groups of type-bars; (b) a motor; (c) a group of elements adapted to be impelled by said motor, each element as required, each of said elements controlling one of the groups of type-bars above mentioned; one of said elements being normally connected with the motor aforesaid; (d) keys, acting to connect the other elements of the group of elements aforesaid with the motor aforesaid, each as required; (e) means, controlled by said keys and serving to break the connection between the motor aforesaid and that one of the elements which is before mentioned as being normally connected with said motor; and (f) keys, acting to connect the different elements of the group above mentioned with the different type-bars which they respectively control.

61. In a permutational character-selecting mechanism, (a) a frame or lever; (d) a group of elements adapted to be set in motion by said frame or lever; one of said elements being normally connected with said frame or lever, and (c) means whereby the element before mentioned as being normally connected with the frame or lever aforesaid, is disconnected from said frame or lever when any other element of the group of elements before mentioned is connected with said frame or lever.

62. In a permutational character-selecting mechanism, (a) a frame or lever; (b) a group of elements adapted to be set in motion by said frame or lever; one of said elements being normally connected with said frame or lever; (c) keys, whereby the other elements of the group aforesaid are connected with the frame or lever aforesaid, each element as required; and, (d) means whereby the element before mentioned as being normally connected with the frame or lever aforesaid, is disconnected from said frame or lever when any other element of the group of elements before mentioned is connected with said frame or lever.

63. In a permutational character-selecting mechanism, (a) a frame or lever; (b) a group of elements adapted to be set in motion by said frame or lever; one of said elements being normally connected with said frame or lever; (c) keys whereby the other elements of the group aforesaid are connected with the lever or frame aforesaid, each element as required; (d) means whereby the element before mentioned as being normally connected with the frame or lever aforesaid is disconnected from said frame or lever, when any other element of the group of elements before mentioned is connected with said frame or lever; and (*e*) means controlled by the keys aforesaid and serving to control the movements of the frame or lever before mentioned.

64. In combination, (*a*) a plurality of groups of character-corresponding devices; (*b*) a plurality of elements each controlling one of the groups of character-corresponding devices aforesaid; and (*c*) a frame or lever, serving to communicate movement to the elements last above mentioned, each as required, thereby to operate the character-corresponding devices aforesaid.

65. In combination, (*a*) a plurality of groups of character-corresponding devices; (*b*) a plurality of elements each controlling one of the groups of character-corresponding devices aforesaid; (*c*) a frame or lever, serving to communicate movement to the elements last above mentioned, thereby to operate the character-corresponding devices; and (*d*) keys, acting to connect the different elements above mentioned as each controlling one of the groups of character-corresponding devices aforesaid with the frame or lever aforesaid, each element as required; said keys acting also to control the movements of the frame or lever aforesaid.

66. In combination, (*a*) a plurality of groups of character-corresponding devices; (*b*) a plurality of elements, each controlling one of the groups of character-corresponding devices aforesaid; (*c*) a frame or lever, serving to communicate movement to the elements last above mentioned, thereby to operate the character-corresponding devices aforesaid; (*d*) keys, acting to connect the different elements above mentioned as each controlling one of the groups of character-corresponding devices aforesaid with the frame or lever aforesaid, each element as required; and (*e*) a motor device, controlled by said keys and serving, when said keys are acted upon, to impel the frame or lever before mentioned.

67. In combination, (*a*) a plurality of groups of character-corresponding devices; (*b*) a plurality of elements each controlling one of the groups of character-corresponding devices aforesaid; (*c*) a frame or lever, serving to communicate movement to the elements last above mentioned, thereby to operate the character-corresponding devices; (*d*) keys acting to connect the different elements above mentioned as each controlling one of the groups of character-corresponding devices aforesaid, with the frame or lever aforesaid, thereby to operate the character-corresponding devices; said keys acting also to control the movements of the frame or lever aforesaid; and (*e*) keys controlling the action of the different elements above mentioned upon the different character-corresponding devices which they respectively control.

68. In combination, (*a*) a plurality of groups of character-corresponding devices; (*b*) a plurality of elements, each controlling one of the groups of character-corresponding devices aforesaid; (*c*) a frame or lever, serving to communicate movement to the elements last above mentioned, thereby to operate the character-corresponding devices; (*d*) keys, acting to connect the different elements above mentioned as each controlling one of the groups of character-corresponding devices aforesaid, with the frame or lever aforesaid, each element as required; and (*e*) keys, controlling the action of the different elements above mentioned upon the different character-corresponding devices which they respectively control.

69. In combination, (*a*) a plurality of groups of character-corresponding devices; (*b*) a group of elements each controlling one of said groups of character-corresponding devices; (*c*) a frame or lever, serving to communicate movement to the elements last above mentioned, thereby to operate the character-corresponding devices aforesaid; one of said elements being normally connected with said frame or lever; and (*d*) keys, whereby the other elements of the group of elements aforesaid, are connected with the frame or lever aforesaid, each element as required; the element above mentioned as being normally connected with the frame or lever aforesaid, being disconnected from said frame or lever when any other element of the same group is connected with said frame or lever.

70. In combination, (*a*) a plurality of groups of character-corresponding devices, (*b*) a group of elements each controlling one of said groups of character-corresponding devices; (*c*) a frame or lever serving to communicate movement to the elements last above mentioned, thereby to operate the character-corresponding devices aforesaid; one of said elements being normally connected with said frame or lever; (*d*) keys, whereby the other elements of the group of elements aforesaid, are connected with the frame or lever aforesaid, each element as required; the element above mentioned as being normally connected with the frame or lever aforesaid, being disconnected from said frame or lever when any other element of the same group is connected with said frame or lever; and (*e*) a motor device, controlled by said keys and serving, when said keys are acted upon, to impel the frame or lever aforesaid.

71. In combination, (*a*) a plurality of groups of character-corresponding devices, (*b*) a group of elements, each controlling one of said groups of character-corresponding devices; (*c*) a frame or lever serving to communicate movement to the elements last above mentioned, thereby to operate the character-corresponding devices aforesaid; one of said elements being normally connected with said frame or lever; (*d*) keys, whereby the other elements of the group of elements aforesaid are connected with the frame or lever aforesaid, each element as required; the element above mentioned as being normally connected with the frame or lever aforesaid being disconnected from said frame or lever, when any other element of the same group is connected with said frame or lever; and (*e*) keys controlling the action of the elements of the group above mentioned upon the different character-corresponding devices which they respectively control.

72. In combination, (*a*) a plurality of groups of character-corresponding devices; (*b*) a group of elements, each controlling one of the groups of character-corresponding devices; (*c*) a frame or lever serving to communicate movement to the elements last above mentioned, thereby to operate the character-corresponding devices aforesaid; one of said elements being normally connected with said frame or lever; (*d*) keys, whereby the other elements of the group of elements aforesaid, are connected with the frame or lever aforesaid, each element as required; the element above mentioned as being normally connected with the frame or lever aforesaid, being disconnected from said frame or lever when any other element of the same group is connected with said frame or lever; (*e*) a motor device controlled by said keys and serving when said keys are acted upon to impel the frame or lever aforesaid; and (*f*) keys, controlling the action of the elements of the group above mentioned upon the different character-corresponding devices which they respectively control.

73. In combination, (*a*) a plurality of groups of type-bars, said type-bars striking to a common center; (*b*) a plurality of elements, each controlling one of the groups of type-bars aforesaid; and (*c*) a frame or lever, serving to communicate movement to the elements above mentioned, each element as required, thereby to operate the type-bars aforesaid.

74. In a type-writing machine and in combination, (*a*) a plurality of groups of type-bars, said type-bars striking to a common printing-center; (*b*) a plurality of elements each controlling one of the groups of type-bars aforesaid; (*c*) a frame or lever, serving to communicate movement to the elements last above mentioned, thereby to operate the type-bars aforesaid, and (*d*) keys acting to connect the different elements above mentioned as each controlling one of the group of type-bars aforesaid, with the frame or lever aforesaid, each element as required; said keys acting also to control the movements of the frame or lever aforesaid.

75. In a type-writing machine and in combination, (*a*) a plurality of groups of type-bars, said type-bars striking to a common printing-center; (*b*) a plurality of elements, each controlling one of the groups of type-bars aforesaid; (*c*) a frame or lever, serving to communicate movement to the elements last above mentioned, thereby to operate the type-bars aforesaid; (*d*) keys, acting to connect the different elements last above mentioned as each controlling one of the groups of type-bars aforesaid with the frame or lever aforesaid, each element as required; and (*e*) a motor, controlled by said keys and serving when said keys are acted upon to impel the frame or lever before mentioned.

76. In a type-writing machine and in combination, (*a*) a plurality of groups of type-bars, said type-bars striking to a common printing-center; (*b*) a plurality of elements each controlling one of the groups of type-bars aforesaid; (*c*) a frame or lever, serving to communicate movement to the elements last above mentioned, thereby to operate the type-bars aforesaid; (*d*) keys, acting to connect the different elements above mentioned as each controlling one of the groups of type-bars aforesaid with the frame or lever aforesaid, each element as required; said keys acting also to control the movements of the frame or lever aforesaid, and (*e*) keys, controlling the action of the different elements last above mentioned upon the type-bars which they respectively control.

77. In a type-writing machine and in combination, (*a*) a plurality of groups of type-bars, said type-bars striking to a common printing-center; (*b*) a plurality of elements each controlling one of the groups of type-bars aforesaid; (*c*) a frame or lever, serving to communicate movement to the elements last above mentioned, thereby to operate the type-bars aforesaid; (*d*) keys acting to connect the different elements above mentioned as each controlling one of the groups of type-bars aforesaid with the frame or lever aforesaid, each element as required; (*e*) a motor, controlled by said keys and serving when said keys are acted upon to impel the frame or lever before mentioned; and (*f*) keys controlling the action of the different elements last above mentioned upon the type-bars, which they respectively control.

78. In a type-writing machine and in combination, (*a*) a plurality of groups of type-bars, said type-bars striking to a common printing-center; (*b*) a group of elements each controlling one of said groups of type-bars; (*c*) a frame or lever, serving to communicate movement to the elements last above mentioned, thereby to operate the type-bars aforesaid, one of said elements being normally connected with said frame or lever; and (*d*) keys whereby the other elements of the group of elements aforesaid are connected with the frame or lever aforesaid, each element as required; the element above mentioned as being normally connected with the frame or lever aforesaid, being disconnected from said frame or lever when any other element of the same group is connected with said frame or lever.

79. In a type-writing machine and in combination, (*a*) a plurality of groups of type-bars, said type-bars striking to a common printing-center; (*b*) a group of elements each controlling one of said groups of type-bars; (*c*) a frame or lever, serving to communicate movement to the elements last above mentioned, thereby to operate the type-bars aforesaid, one of said elements being normally connected with said frame or lever; (d) keys, whereby the other elements of the group of elements aforesaid are connected with the frame or lever aforesaid, each element as required; the element above mentioned as being normally connected with the frame or lever aforesaid, being disconnected from said frame or lever when any other element of the same group is connected with said frame or lever; and (e) a motor, controlled by said keys and serving when the keys are acted upon to impel the frame or lever aforesaid.

80. In a type-writing machine and in combination, (a) a plurality of groups of type-bars, said type-bars striking to a common printing-center; (b) a group of elements each controlling one of said groups of type-bars; (c) a frame or lever, serving to communicate movement to the elements last above mentioned, thereby to operate the type-bars aforesaid, one of said elements being normally connected with said frame or lever; (d) keys, whereby the other elements of the group of elements aforesaid, are connected with the frame or lever aforesaid, each element as required; the element above mentioned as being normally connected with the frame or lever aforesaid being disconnected from said frame or lever when any other element of the same group is connected with said frame or lever; and (e) keys, controlling the action of the elements of the group above mentioned upon the different type-bars which they respectively control.

81. In a type-writing machine and in combination, (a) a plurality of groups of type-bars, said type-bars striking to a common printing-center; (b) a group of elements, each controlling one of said groups of type-bars; (c) a frame or lever, serving to communicate movement to the elements last above mentioned thereby to operate the type-bars aforesaid, one of said elements being normally connected with said frame or lever; (d) keys, whereby the other elements of the group of elements aforesaid, are connected with the frame or lever aforesaid, each element as required; the element above mentioned as being normally connected with the frame or lever aforesaid, being disconnected from said frame or lever when any other element of the same group is connected with said frame or lever; (e) a motor, controlled by said keys and serving when the keys are acted upon to impel the frame or lever aforesaid; and (f) keys, controlling the action of the elements of the group above mentioned upon the different type-bars which they respectively control.

82. In combination, (a) a plurality of groups of character-corresponding devices; (b) a plurality of elements each controlling one of said groups of character-corresponding devices; (c) a frame or lever, acting to give movement to the controlling elements aforesaid, each as required, thereby to actuate the character-corresponding devices; (d) a plurality of keys; (e) a plurality of tilting pieces connected with the controlling elements before mentioned and controlled by the keys; said tilting pieces lying normally out of the path of movement of the frame or lever aforesaid; each key serving when depressed to move the tilting piece controlled by it into the path of movement of the frame or lever aforesaid.

83. In combination, (a) a plurality of groups of character-corresponding devices; (b) a plurality of elements each controlling one of said groups of character-corresponding devices, and hereinafter in this paragraph termed "controlling elements;" (c) a frame or lever, acting to give movement to the controlling elements aforesaid, each as required, thereby to actuate the character-corresponding devices; (d) a plurality of keys; (e) a plurality of tilting pieces connected with the controlling elements before mentioned and controlled by the keys, said tilting pieces lying normally out of the path of movement of the frame or lever aforesaid; each key serving when depressed to move the tilting piece controlled by it into the path of movement of the frame or lever aforesaid; said keys controlling the movement of said frame or lever.

84. In combination, (a) a plurality of groups of character-corresponding devices; (b) a plurality of elements, each controlling one of said groups of character-corresponding devices and hereinafter in this paragraph termed "controlling elements," (c) a frame or lever acting to give movement to the controlling elements aforesaid, each element as required, thereby to actuate the character-corresponding devices; (d) a plurality of keys; (e) a plurality of tilting pieces, connected with the controlling elements before mentioned and controlled by the keys, said tilting pieces lying normally out of the path of movement of the frame or lever aforesaid, each key serving when depressed to move the tilting piece controlled by it into the path of movement of said frame or lever; and (f) a motor, controlled by said keys and serving to actuate the frame or lever aforesaid.

85. In combination, (a) a plurality of groups of character-corresponding devices; (b) a plurality of elements each controlling one of said groups of character-corresponding devices, and hereinafter in this paragraph termed "controlling elements;" (c) a frame or lever, acting to give movement to the controlling elements aforesaid, each element as required, thereby to actuate the character-corresponding devices; (d) a plurality of keys; (e) a plurality of tilting pieces connected with the controlling elements before mentioned and controlled by the keys; said tilting pieces lying normally out of the path of movement of the frame or lever aforesaid; each key serving when depressed to move the tilting piece controlled by it into the path of movement of said frame or lever; and (*f*) other keys controlling the action of the controlling elements aforesaid upon the different character-corresponding devices which they respectively control.

86. In combination, (*a*) a plurality of groups of character-corresponding devices; (*b*) a plurality of elements, each controlling one of said groups of character-corresponding devices and hereinafter in this paragraph termed "controlling elements;" (*c*) a frame or lever, acting to give movement to the controlling elements aforesaid, each element as required, thereby to actuate the character-corresponding devices; (*d*) tilting pieces connected with the controlling elements before mentioned, one of said tilting pieces being normally adapted to be impelled by the frame or lever aforesaid; and (*e*) keys whereby the other tilting pieces are connected, each as required, with the frame or lever aforesaid; that tilting piece before mentioned as being normally adapted to be impelled by the frame or lever aforesaid, being prevented from being impelled by said frame or lever when any other tilting piece is connected with said frame or lever.

87. In combination, (*a*) a plurality of groups of character-corresponding devices; (*b*) a plurality of elements each controlling one of said groups of character-corresponding devices, and hereinafter in this paragraph termed "controlling elements;" (*c*) a frame or lever, acting to give movement to the controlling elements aforesaid, each element as required, thereby to actuate the character-corresponding devices; (*d*) tilting pieces connected with the controlling elements before mentioned, one of said tilting pieces being normally adapted to be impelled by the frame or lever aforesaid; and (*e*) keys whereby the other tilting pieces are connected, each as required, with the frame or lever aforesaid; that tilting piece before mentioned as being normally adapted to be impelled by the frame or lever aforesaid being prevented from being impelled by said frame or lever when any other tilting piece is connected with said frame or lever; and (*f*) a motor, controlled by said keys and serving to actuate the frame or lever aforesaid.

88. In combination, (*a*) a plurality of groups of character-corresponding devices; (*b*) a plurality of elements each controlling one of said groups of character-corresponding devices and hereinafter in this paragraph termed "controlling elements;" (*c*) a frame or lever acting to give movement to the controlling elements aforesaid, each element as required, thereby to actuate the character-corresponding devices aforesaid; (*d*) tilting pieces connected with the controlling elements before mentioned, one of said tilting pieces being normally adapted to be impelled by the frame or lever aforesaid, (*e*) keys, whereby the other tilting pieces are connected, each as required, with the frame or lever aforesaid; that tilting piece before mentioned as being normally adapted to be impelled by the frame or lever aforesaid, being prevented from being impelled by said frame or lever when any other tilting piece is connected with said frame or lever; and (*f*) other keys controlling the action of the elements aforesaid upon the different character-corresponding devices which they respectively control.

89. In combination, (*a*) a plurality of groups of character-corresponding devices; (*b*) a plurality of elements, each controlling one of said groups of character-corresponding devices and hereinafter in this paragraph termed "controlling elements;" (*c*) a frame or lever, acting to give movement to the controlling elements aforesaid, each element as required, thereby to actuate the character-corresponding devices; (*d*) tilting pieces connected with the controlling elements before mentioned, one of said tilting pieces being normally adapted to be impelled by the frame or lever aforesaid; (*e*) keys whereby the other tilting pieces are connected, each as required, with the frame or lever aforesaid, that tilting piece before mentioned as being normally adapted to be impelled by the frame or lever aforesaid being prevented from being impelled by said frame or lever when any other tilting piece is connected with said frame or lever; (*f*) a motor, controlled by said keys and serving to actuate the frame or lever aforesaid; and (*g*) other keys, controlling the action of the controlling elements aforesaid upon the different character-corresponding devices which they respectively control.

90. In combination, (*a*) a group of character-corresponding devices; (*b*) a motor; (*c*) a key; (*d*) an element controlled by the key and the motor aforesaid, said element being normally disconnected from said motor; said key acting, when depressed, to connect said element with said motor; and (*e*) means whereby said element is connected with the different character-corresponding devices of the group before mentioned, each as required.

91. In combination, (*a*) a group of character-corresponding devices; (*b*) a motor; (*c*) a key; (*d*) an element controlled by the key and the motor aforesaid, said element being normally disconnected from said motor, said key acting when depressed to connect said element with said motor; and (*e*) key mechanism, whereby said element is connected with the different character-corresponding devices of the group before mentioned, each as required.

92. In combination, (*a*) a group of character-corresponding devices; (*b*) a motor; (*c*) a key controlling said motor; (*d*) a part or element normally disconnected from the motor aforesaid; the key before mentioned acting when depressed both to connect the element aforesaid with the motor aforesaid and to bring said motor into action, so that it gives movement to said element; and (*e*) means whereby said element is connected with the different character-corresponding devices of the group before mentioned, each as required.

93. In combination, (a) a group of character-corresponding devices; (b) a motor; (c) a key, controlling said motor; (d) a part or element normally disconnected from the motor aforesaid; the key before mentioned acting when depressed both to connect the element aforesaid with the motor aforesaid, and to bring said motor into action, so that it gives movement to said element, and (e) key mechanism, whereby said element is connected with the different character-corresponding devices of the group before mentioned, each as required.

94. In a type-writing machine, and in combination, (a) a group of type-bars; (b) a motor; (c) a key; (d) an element controlled by the key and the motor aforesaid, said element being normally disconnected from said motor; said key acting, when depressed, to connect said element with said motor; and (e) means whereby said element is connected with the different type-bars of the group before mentioned, each as required.

95. In a type-writing machine, and in combination, (a) a group of type-bars; (b) a motor; (c) a key; (d) an element controlled by the key and by the motor aforesaid, said element being normally disconnected from said motor; said key acting when depressed to connect said element with said motor; and (e) key mechanism, whereby said element is connected with the different type-bars of the group before mentioned, each as required.

96. In a type-writing machine and in combination, (a) a group of type-bars; (b) a motor; (c) a key controlling said motor; (d) a part or element normally disconnected from the motor aforesaid; the key before mentioned acting, when depressed, both to connect the element aforesaid with the motor aforesaid, and to bring said motor into action, so that it gives movement to said element; and (e) means whereby said element is connected with the different type-bars of the group before mentioned, each as required.

97. In a type-writing machine and in combination, (a) a group of type-bars; (b) a motor; (c) a key controlling said motor; (d) a part or element normally disconnected from the motor aforesaid, the key before mentioned acting, when depressed, both to connect the element aforesaid with the motor aforesaid, and to bring said motor into action, so that it gives movement to said element; and (e) key mechanism, whereby said element is connected with the different type-bars of the group before mentioned, each as required.

98. In combination, (a) a group of character-corresponding devices; (b) a motor; (c) a key; (d) an element controlled by the key and the motor aforesaid, said element being normally disconnected from said motor; said key acting when depressed to connect said element with said motor and (e) a member continuously in operative relation to the element above mentioned and movable to connect said element with the different character-corresponding devices of the group before mentioned, each as required.

99. In combination, (a) a group of character-corresponding devices; (b) a motor; (c) a key; (d) an element controlled by the key and the motor aforesaid; said element being normally disconnected from said motor; said key acting when depressed to connect said element with said motor; (e) a member continuously in operative relation to the element above mentioned; and (f) key mechanism, whereby said member is moved into different positions, thereby to connect the element above mentioned with the different character-corresponding devices of the group before mentioned, each as required.

100. In combination, (a) a group of character-corresponding devices; (b) a motor; (c) a key controlling said motor, (d) a part or element normally disconnected from the motor aforesaid; the key before mentioned acting when depressed both to connect the element aforesaid with the motor aforesaid, and to bring said motor into action so that it gives movement to said element; and (e) a member continuously in operative relation to the element above mentioned and movable to connect said element with the different character-corresponding devices of the group before mentioned, each as required.

101. In combination, (a) a group of character-corresponding devices; (b) a motor; (c) a key, controlling said motor; (d) a part or element normally disconnected from the motor aforesaid; the key before mentioned acting when depressed both to connect the element aforesaid with the motor aforesaid, and to bring said motor into action, so that it gives movement to said element; (e) a member continuously in operative relation to the element above mentioned; and (f) key mechanism whereby said member is moved into different positions, thereby to connect the element before mentioned with the different character-corresponding devices of the group above mentioned, each as required.

102. In combination, (a) a plurality of groups of character-corresponding devices; (b) a motor; (c) a plurality of keys; (d) a plurality of elements each corresponding to and controlled by one of the keys aforesaid, conjointly with the motor aforesaid; each of said elements being normally disconnected from said motor; each of said keys acting, when depressed, to connect that one of the elements before mentioned which corresponds to said key with the motor aforesaid; and (e) a set of members corresponding to the elements aforesaid; each member being continuously in operative relation to that element with which it corresponds, said members being connected together and moving to connect the different elements with which they respectively correspond with the different character-corresponding devices of the groups which said elements respectively control.

103. In combination, (a) a plurality of groups of character-corresponding devices; (b) a motor; (c) a plurality of keys; (d) a plurality of elements each corresponding to and controlled by one of the keys aforesaid conjointly with the motor aforesaid; each of said elements being normally disconnected from said motor; each of said keys acting, when depressed, to connect that one of the elements before mentioned which corresponds to said key, with the motor aforesaid; (e) a set of members corresponding to the elements aforesaid, each member being continuously in operative relation to the element with which it corresponds, said members being connected together and movable to bring each member into operative relation with the different character-corresponding devices of the group with which each corresponds; and (f) key mechanism, controlling the movements of the set of members aforesaid.

104. In a type-writing machine, and in combination, (a) a group of type-bars; (b) a motor; (c) a key; (d) an element controlled by the key and the motor aforesaid, said element being normally disconnected from said motor; said key acting when depressed to connect said element with said motor; and (e) a member continuously in operative relation to the element above mentioned and movable to connect said element with the different type-bars of the group before mentioned, each as required.

105. In a type-writing machine, and in combination, (a) a group of type-bars; (b) a motor; (c) a key; (d) an element controlled by the key and the motor aforesaid; said element being normally disconnected from said motor; said key acting when depressed to connect said element with said motor; (e) a member continuously in operative relation to the element above mentioned, and (f) key mechanism whereby said member is moved into different positions, thereby to connect the element above mentioned with the different type-bars of the group above mentioned, each as required.

106. In a type-writing machine, and in combination, (a) a group of type-bars; (b) a motor; (c) a key controlling said motor; (d) a part or element normally disconnected from the motor aforesaid; the key before mentioned acting when depressed both to connect the element aforesaid with the motor aforesaid, and to bring said motor into action so that it gives movement to said element, and (e) a member continuously in operative relation with the element above mentioned, and movable to connect said element with the different type-bars of the group before mentioned, each as required.

107. In a type-writing machine, and in combination, (a) a group of type-bars; (b) a motor; (c) a key, controlling said motor; (d) a part or element normally disconnected from the motor aforesaid, the key before mentioned acting, when depressed, both to connect the element aforesaid with the motor aforesaid, and to bring said motor into action, so that it gives movement to said element; (e) a member continuously in operative relation to the element above mentioned; and (f) key mechanism, whereby said member is moved into different positions, thereby to connect the element before mentioned with the different type-bars of the group above mentioned, each as required.

108. In a type-writing machine, and in combination, (a) a plurality of groups of type-bars; (b) a motor; (c) a plurality of keys; (d) a plurality of elements each corresponding to and controlled by one of the keys aforesaid, conjointly with the motor aforesaid; each of said elements being normally disconnected from said motor; each of said keys acting, when depressed, to connect that one of the elements before mentioned which corresponds to said key with the motor aforesaid; and (e) a set of members corresponding to the elements aforesaid; each member being continuously in operative relation with that element with which it corresponds, said members being connected together and moving to connect the different elements with which they respectively correspond, with the different type-bars of the groups which said elements respectively control.

109. In a type-writing machine, and in combination, (a) a plurality of groups of type-bars; (b) a motor; (c) a plurality of keys; (d) a plurality of elements, each corresponding to and controlled by one of the keys aforesaid conjointly with the motor aforesaid; each of said elements being normally disconnected from said motor; each of said keys acting, when depressed, to connect that one of the elements before mentioned, which corresponds to said key, with the motor aforesaid; (e) a set of members corresponding to the elements aforesaid, each member being continuously in operative relation to the element with which it corresponds, said members being connected together and movable to bring each member into operative relation with the different type-bars of the group with which such member corresponds; and (f) key mechanism, controlling the movements of the set of members aforesaid.

110. In combination, (a) a plurality of groups of character-corresponding levers; (b) a motor, adapted to give movement to all of said character-corresponding levers, each lever as required; (c) group-controlling elements, normally disconnected from the motor aforesaid; (d) keys, acting to connect the different group-controlling elements aforesaid, each as required, with the motor aforesaid; and (e) connecting members, intermediate the group-controlling elements aforesaid and the groups of character-corresponding levers, controlled respectively by said group-controlling elements; said connecting members being movable to connect the controlling elements corresponding respectively to them with the different character-corresponding levers which said group-controlling elements respectively control.

111. In combination, (a) a plurality of groups of character-corresponding levers; (b) a motor, adapted to give movement to all said character-corresponding levers, each as required; (c) a group of controlling elements, normally disconnected from the motor aforesaid; (d) keys, acting to connect the different group-controlling elements aforesaid, each as required, with the motor aforesaid; said keys acting also to bring said motor into action for the impelling of the controlling elements connected with it, and (e) connecting members intermediate the group-controlling elements aforesaid, and the groups of character-corresponding levers which said group-controlling elements respectively control; said connecting members being movable to connect the controlling elements corresponding respectively to them with the different character-corresponding levers which said group-controlling elements respectively control.

112. In combination, (a) a plurality of groups of character-corresponding levers; (b) a motor, adapted to give movement to all said character-corresponding levers, each as required; (c) group-controlling elements normally disconnected from the motor aforesaid; (d) keys, acting to connect the different group-controlling elements aforesaid, each as required, with the motor aforesaid; (e) connecting members, equal in number to the number of groups of character-corresponding levers aforesaid and corresponding respectively each with one of said groups of character-corresponding levers, and with one of the controlling elements before mentioned; said connecting members being movable to connect the group-controlling elements aforesaid with the character-corresponding levers controlled respectively by them; and (f) key mechanism, whereby the connecting members aforesaid are moved to connect the different group-controlling elements aforesaid with the different character-corresponding levers that they respectively control.

113. In combination, (a) a plurality of groups of character-corresponding levers; (b) a frame or lever normally at rest; (c) group-controlling elements normally disconnected from the frame or lever aforesaid; (d) a motor; (e) keys, acting to connect the different group-controlling elements aforesaid with the frame or lever aforesaid, each as required, said keys acting also to bring the motor aforesaid into action, so that it gives movement to the frame or lever aforesaid; and (f) connecting members intermediate the group-controlling elements aforesaid and the groups of character-corresponding levers controlled respectively by group-controlling elements aforesaid; said connecting members being movable to connect the group-controlling elements corresponding respectively to them with the different character-corresponding levers which said group-controlling elements respectively control.

114. In combination, (a) a plurality of groups of character-corresponding levers; (b) a frame or lever, normally at rest; (c) group-controlling elements normally disconnected from the frame or lever aforesaid; (d) a motor; (e) keys, acting to connect the different group-controlling elements aforesaid with the frame or lever aforesaid, each as required, said keys acting also to bring the motor aforesaid into action, so that it gives movement to the frame or lever aforesaid; (f) a set of connecting members, equal in number to the number of groups of character-corresponding levers aforesaid, and corresponding respectively each with one of said groups of character-corresponding levers, and with one of the group-controlling elements before mentioned; said connecting members being movable to connect the group-controlling elements aforesaid with the character-corresponding levers controlled respectively by them; and (g) key mechanism, whereby the connecting members aforesaid are moved to connect the different group-controlling elements aforesaid with the character-corresponding levers which said group-controlling elements control.

115. In a type-writing machine, and in combination, (a) a plurality of groups of type-bars; (b) a motor, adapted to give movement to all of said type-bars, each type-bar as required; (c) group-controlling elements, normally disconnected from the motor aforesaid; (d) keys, acting to connect the different group-controlling elements aforesaid, each as required, with the motor aforesaid; (e) connecting members, intermediate the group-controlling elements aforesaid, and the groups of type-bars controlled respectively by said group-controlling elements; said connecting members being movable to connect the controlling elements corresponding respectively to them with the different type-bars, which said group-controlling elements respectively control.

116. In a type-writing machine, and in combination, (a) a plurality of groups of type-bars; (b) a motor adapted to give movement to all of said type-bars, each as required; (c) group-controlling elements, normally disconnected from the motor aforesaid; (d) keys, acting to connect the different group-controlling elements aforesaid, each as required, with the motor aforesaid; said keys acting also to bring said motor into action for the impelling of the group-controlling element connected with it; and (e) connecting members intermediate the group-controlling elements aforesaid and the group of type-bars which said group-controlling elements respectively control; said connecting members being movable to connect the controlling elements corresponding respectively to them with the different type-bars which said group-controlling elements respectively control.

117. In a type-writing machine, and in combination, (a) a plurality of groups of type-bars; (b) a motor, adapted to give movement to all of said type-bars, each as required; (c) group-controlling elements normally disconnected from the motor aforesaid; (d) keys, acting to connect the different group-controlling elements aforesaid, each as required, with the motor aforesaid; (e) connecting members, equal in number to the number of groups of type-bars aforesaid, and corresponding respectively each with one of said groups of type-bars, and with one of the controlling elements before mentioned; said connecting members being movable to connect the group-controlling elements aforesaid with the type-bars controlled respectively by them; and (f) key mechanism, whereby the connecting members aforesaid are moved to connect the different group-controlling elements aforesaid with the different type-bars that they respectively control.

118. In a type-writing machine, and in combination, (a) a plurality of groups of type-bars, (b) a frame or lever normally at rest; (c) group-controlling elements, normally disconnected from the frame or lever aforesaid; (d) a motor; (e) keys, acting to connect the different group-controlling elements aforesaid, with the frame or lever aforesaid, each as required, said keys acting also to bring the motor aforesaid into action, so that it gives movement to the frame or lever aforesaid; and (f) connecting members, intermediate the group-controlling elements aforesaid, and the groups of type-bars controlled respectively by the group-controlling elements aforesaid, said connecting members being movable to connect the controlling elements corresponding respectively to them with the different type-bars which said group-controlling elements respectively control.

119. In a type-writing machine, and in combination, (a) a plurality of groups of type-bars; (b) a frame or lever, normally at rest; (c) group-controlling elements, normally disconnected from the frame or lever aforesaid, (d) a motor; (e) keys, acting to connect the different group-controlling elements aforesaid with the frame or lever aforesaid, each as required, said keys acting also to bring the motor aforesaid into action, so that it gives movement to the frame or lever aforesaid; (f) a set of connecting members, equal in number to the number of groups of type-bars aforesaid, and corresponding respectively each with one of said groups of type-bars and with one of the group-controlling elements before mentioned, said connecting members being movable to connect the group-controlling elements aforesaid with the type-bars controlled respectively by them; and (d) key mechanism, whereby the connecting members aforesaid are moved to connect the different group-controlling elements aforesaid with the type-bars which said group-controlling elements control.

120. In combination, (a) a plurality of groups of character-corresponding levers; (b) a motor adapted to give movement to all of said character-corresponding levers, each as required; (c) group-controlling elements, normally disconnected from the motor aforesaid; (d) keys, acting to connect the different group-controlling elements aforesaid, each as required, with the motor aforesaid; (e) pins, intermediate the group-controlling elements aforesaid, and the groups of character-corresponding levers aforesaid, controlled respectively by the different group-controlling elements aforesaid; said pins being mounted and moving as a set to connect the group-controlling elements corresponding respectively to them, with the different character-corresponding levers which such group-controlling elements respectively control.

121. In combination, (a) a plurality of groups of character-corresponding levers; (b) a motor, adapted to give movement to all said character-corresponding levers, each as required; (c) group-controlling elements, normally disconnected from the motor aforesaid; (d) keys, acting to connect the different group-controlling elements aforesaid, each as required, with the motor aforesaid; (e) pins intermediate the group-controlling elements aforesaid, and the groups of character-corresponding levers controlled respectively by said group-controlling elements; said pins being mounted and moving as a set to connect the group-controlling elements corresponding respectively to them with the different character-corresponding levers which said group-controlling elements respectively control; and (f) key mechanism, whereby the pins above mentioned are moved.

122. In combination, (a) a plurality of groups of character-corresponding levers; (b) a frame or lever normally at rest; (c) group-controlling elements, normally disconnected from the frame or lever aforesaid; (d) a motor; (e) keys, acting to connect the different group-controlling elements aforesaid, with the frame or lever aforesaid, each as required; said keys acting also to bring the motor aforesaid into action, so that it gives movement to the frame or lever aforesaid; and (f) pins intermediate the group-controlling elements aforesaid and the groups of character-corresponding levers controlled respectively by said group-controlling elements; said pins moving to connect the group-controlling elements corresponding respectively to them with the different character-corresponding levers which such group-controlling elements respectively control.

123. In combination, (a) a plurality of groups of character-corresponding levers; (b) a frame or lever normally at rest; (c) group-controlling elements normally disconnected from the frame or levers aforesaid; (d) a motor; (e) keys, acting to connect the different group-controlling elements aforesaid with the frame or lever aforesaid, each as required;

said keys acting also to bring the motor aforesaid into action, so that it gives movement to the frame or levers aforesaid; (*f*) pins intermediate the group-controlling elements aforesaid and the groups of character-corresponding levers controlled respectively by the group-controlling elements; said pins moving to connect the group-controlling elements corresponding respectively to them with the different character-corresponding levers, which such group-controlling elements respectively control; and (*g*) key mechanism, whereby the pins above mentioned are moved.

124. In combination, (*a*) a motor; (*b*) a plurality of groups of character-corresponding levers; (*c*) group-controlling levers, equal in number to the number of groups of character-corresponding levers aforesaid and corresponding each to one of the groups of levers aforesaid; (*d*) keys; (*e*) connections between the group-controlling levers aforesaid and the motor aforesaid, controlled by the keys aforesaid; and (*f*) pins, intermediate the group-controlling levers aforesaid and the character-corresponding levers, said pins being shiftable to connect the different levers of a group of character-corresponding levers, each as required, with the corresponding group-controlling levers.

125. In combination, (*a*) a motor; (*b*) a plurality of groups of character-corresponding levers; (*c*) group-controlling levers, equal in number to the number of groups of character-corresponding levers aforesaid, and corresponding each to one of the groups of character-corresponding levers aforesaid; (*d*) keys; (*e*) connections between the group-controlling levers aforesaid and the motor aforesaid; said connections being controlled by the keys aforesaid; (*f*) pins, intermediate the group-controlling levers aforesaid and the character-corresponding levers; said pins being shiftable to connect the different levers of a group of character-corresponding levers, each as required, with the corresponding group-controlling levers; and (*g*) key mechanism, whereby the pins aforesaid are moved into different positions, as required.

126. In a type-writing machine, and in combination, (*a*) a plurality of groups of type-bars; (*b*) a motor, adapted to give movement to all of said type-bars, each as required; (*c*) group-controlling elements, normally disconnected from the motor aforesaid; (*d*) keys, acting to connect the different group-controlling elements aforesaid, each as required, with the motor aforesaid; (*e*) pins, intermediate the group-controlling elements aforesaid and the groups of type-bars aforesaid; said pins being mounted and moving as a set to connect the group-controlling elements corresponding respectively to them with the different type-bars which said group-controlling elements respectively control.

127. In a type-writing machine, and in combination, (*a*) a plurality of groups of type-bars; (*b*) a motor, adapted to give movement to all of said type-bars, each as required; (*c*) group-controlling elements, normally disconnected from the motor aforesaid; (*d*) keys, acting to connect the different group-controlling elements aforesaid, each as required, with the motor aforesaid; (*e*) pins, intermediate the group-controlling elements aforesaid and the groups of character-corresponding levers, controlled respectively by said group-controlling elements; said pins being mounted and moving as a set to connect the group-controlling elements corresponding respectively to them with the different type-bars which said group-controlling elements respectively control; and (*f*) key mechanism whereby the pins above mentioned, are moved.

128. In a type-writing machine, and in combination, (*a*) a plurality of groups of type-bars; (*b*) a frame or lever, normally at rest; (*c*) group-controlling elements, normally disconnected from the frame or lever aforesaid; (*d*) a motor; (*e*) keys, acting to connect the different group-controlling elements aforesaid with the frame or lever aforesaid, each as required; said keys acting also to bring the motor aforesaid into action, so that it gives movement to the frame or lever aforesaid; and (*f*) pins intermediate the group-controlling elements aforesaid, and the groups of type-bars controlled respectively by said group-controlling elements, said pins moving to connect the group-controlling elements corresponding respectively to them with the different type-bars which said group-controlling elements respectively control.

129. In a type-writing machine, and in combination, (*a*) a plurality of groups of type-bars; (*b*) a frame or lever normally at rest; (*c*) group-controlling elements normally disconnected from the frame or lever aforesaid; (*d*) a motor; (*e*) keys, acting to connect the different group-controlling elements aforesaid, with the frame or lever aforesaid, each as required, said keys acting also to bring the motor aforesaid into action, so that it gives movement to the frame or lever aforesaid; (*f*) a set of pins, intermediate the group-controlling elements aforesaid, and the groups of type-bars controlled respectively by said group-controlling elements; said pins moving to connect the group-controlling elements corresponding respectively to them with the different type-bars, which such group-controlling elements respectively control and (*g*) key mechanism, whereby the pins above mentioned are moved.

130. In a type-writing machine, and in combination, (*a*) a motor; (*b*) a plurality of groups of type-bars; (*c*) group-controlling levers, equal in number to the number of groups of type-bars aforesaid; said group-controlling elements corresponding each to one of the groups of type-bars aforesaid; (*d*) keys, (*e*) connections between the group-controlling levers aforesaid and the motor aforesaid, controlled by the keys aforesaid; and (*f*) pins, intermediate the group-controlling levers aforesaid and the type-bars aforesaid; said pins being shiftable to connect the different type-bars of a group, each type-bar, as required, with the corresponding group-controlling lever.

131. In a type-writing machine, and in combination, (a) a motor; (b) a plurality of groups of type-bars; (c) group-controlling levers, equal in number to the number of groups of type-bars aforesaid, said group-controlling levers corresponding each to one of the groups of type-bars aforesaid; keys; (e) connections between the group-controlling levers aforesaid and the motor aforesaid, said connections being controlled by the keys aforesaid; (f) a set of pins intermediate the group-controlling levers aforesaid, and the type-bars aforesaid; said pins being shiftable to connect the different type-bars of a group, each type-bar as required, with the corresponding group-controlling lever; and (g) key mechanism whereby the set of pins aforesaid is moved into different positions, as required.

132. In a type-writing machine or other similar instrument, an organization for producing consecutive letters by simultaneous actions of the operator, said organization including in combination, (A) two sets of type-bars; the type-bars of each set being arranged in such a manner that they strike to a printing-point common to the bars of such set; and (B) a type-bar-controlling mechanism for each of the sets of type-bars above mentioned; one of the type-bar-controlling mechanisms above mentioned being a permutational type-bar-selecting device, having a number of keys less than the number of type-bars controlled by it; said permutational type-bar-selecting device being constructed and arranged in such a manner that its small number of keys, operating in various permutations or combinations, serves to bring the various type-bars controlled by it into action, each as required; said permutational type-bar-selecting device including (a) a single-motor device, common to the type-bars of the set controlled by said permutational type-bar-selecting device, and serving to impel all said type-bars, each type-bar as required; a plurality of said type-bars being normally disconnected from said motor device; and (b) means, whereby said type-bars are connected, each as required, with the motor device aforesaid.

133. In a type-writing machine, or other similar instrument, an organization for producing consecutive letters by simultaneous actions of the operator, said organization including in combination, (A) two sets of type-bars; the bars of each set being arranged in such a manner that they strike to a printing-point common to the bars of such set; and (B) a type-bar-controlling mechanism for each of the sets of type-bars above mentioned; each of the type-bar-controlling mechanisms above mentioned being a permutational type-bar-selecting device, having a number of keys less than the number of type-bars controlled by it; said permutational type-bar-selecting device being constructed and arranged in such a manner that its small number of keys operating in various permutations or combinations, serves to bring the various type-bars controlled by it into action, each type-bar as required; each of said permutational type-bar-selecting devices including (a) a motor device, common to the type-bars of the set controlled by such permutational type-bar-selecting device; said motor device serving to impel all said type-bars, each type-bar as required; a plurality of said type-bars being normally disconnected from said motor device; and (b) means whereby said type-bars are connected, each as required, with the motor device aforesaid.

134. In a type-writing machine or other similar instrument, an organization for producing consecutive letters by simultaneous actions of the operator, said organization including, in combination, (A) two sets of type-bars; the bars of each set being arranged in such a manner that they strike to a printing-point common to the bars of such set; (B) a quick-acting type-bar-controlling mechanism for one of the sets of type-bars above mentioned; and (C) a slow-acting type-bar-controlling mechanism for the other set of type-bars above mentioned; each of the type-bar-controlling mechanisms above mentioned being a permutational type-bar-selecting device, having a number of keys less than the number of type-bars controlled by it; said permutational type-bar-selecting device being constructed and arranged in such a manner that a small number of keys operating in various permutations or combinations serves to bring the various type-bars controlled by it into action, each type-bar as required; each of said permutational type-bar-selecting devices including (a) a single motor device, common to the type-bars of the set controlled by such permutational type-bar-selecting device; said motor device serving to impel all said type-bars, each type-bar as required; a plurality of said type-bars being normally disconnected from said motor device; and (b) means whereby said type-bars are connected, each as required, with a motor device serving for the set of type-bars to which it belongs.

135. In a type-writing machine or other similar instrument, an organization for producing consecutive letters by simultaneous actions of the operator, said organization including, two sets of type-bars, the type-bars of each set being arranged in such a manner that they strike to a printing-point common to the type-bars of such set, the printing-points of the two sets of type-bars being distinct from and adjacent to each other; two motor devices, one motor device serving to actuate all the type-bars of one of the two sets aforesaid, and the other motor device serving to actuate all the type-bars of the other set above mentioned; and permutational selecting mechanism for each set of type-bars, including (*a*) keys less in number than the type-bars of the set controlled by them; and (*b*) means, controlled by said keys acting singly and in different combinations, whereby the different type-bars of such set are connected, each type-bar as required, with the motor device serving for the type-bars of such set.

136. In a type-writing machine or other similar instrument, an organization for producing consecutive letters by simultaneous actions of the operator, said organization including two sets of type-bars, the bars of each set being arranged in such a manner that they strike to a printing-point common to the bars of such set; (B) two motor devices, to wit, a quick-acting motor device, serving to actuate all the type-bars of one of the two sets aforesaid; and a slow-acting motor device, serving to actuate all the type-bars of the other set above mentioned; and (C) a permutational selecting mechanism for each of the sets of type-bars aforesaid; each of said permutational selecting mechanisms including (*a*) keys less in number than the type-bars of the set controlled by them; and (*b*) means controlled by said keys acting singly and in different combinations, whereby the different type-bars of such set are connected, each type-bar as required, with the motor device serving for the type-bar of such set.

137. In a type-writing machine, and in combination, (*a*) a plurality of groups of type-bars; said type-bars striking to a common printing-center; (*b*) a motor device, acting to impel all said type-bars, each as required; (*c*) keys, each controlling a different group of the type-bars aforesaid, and acting, when depressed, to cause some one of the type-bars of said group to be connected with the motor device aforesaid; and (*d*) means, controlling what type-bar of the group shall be connected with the motor device aforesaid.

138. In a type-writing machine, and in combination, (*a*) a plurality of groups of type-bars; said type-bars striking to a common printing-center; (*b*) a motor device, acting to impel all said type-bars, each as required; (*c*) keys, each controlling a different group of the type-bars aforesaid, and acting when depressed to cause some one of the type-bars of said group to be connected with the motor device aforesaid; and (*d*) means, operated by one or more other keys acting simultaneously with the keys aforesaid to control what type-bar of the group shall be connected with the motor device aforesaid.

139. In a type-writing machine, and in combination, (*a*) a plurality of groups of type-bars, said type-bars striking to a common printing-center; (*b*) a single motor device, acting to impel all said type-bars, each type-bar as required; (*c*) a group of keys, each key controlling a different group of the type-bars aforesaid; (*d*) other keys, and means controlled thereby coacting with the keys first named to connect the type-bars aforesaid, each as required, with the motor device aforesaid; the keys first in this paragraph mentioned acting, when depressed, to control what group of type-bars shall have one of its bars connected with the motor device aforesaid, and the keys of the other group acting simultaneously to control what type-bar of such group shall be connected with the motor device aforesaid.

140. In a type-writing machine and in combination, (*a*) a plurality of groups of type-bars, said type-bars striking to a common printing-center; (*b*) a single motor device, acting to impel all said type-bars, each type-bar as required; (*c*) a group of finger-keys, each controlling a different group of the type-bars aforesaid; and (*d*) one or more thumb-keys, and means operated thereby coacting with the finger-keys to connect the type-bars aforesaid each as required, with the motor device aforesaid; the finger-keys aforesaid acting, when depressed, to control what group of type-bars shall have one of its bars connected with the motor device aforesaid, and the thumb-key or thumb-keys acting to control what type-bar of such group shall be connected with said motor device.

141. In a type-writing machine, and in combination, (*a*) a plurality of groups of type-bars; said type-bars striking to a common printing-center; (*b*) a single motor device, acting to impel all said type-bars, each type-bar as required; (*c*) keys, less in number than the groups of type-bars aforesaid, each of said keys controlling a different group of said type-bars, and acting to cause some one of the type-bars of the group controlled by it to be connected with the motor device aforesaid; (*d*) an element, controlling one or more other type-bars striking to the same printing-center as the type-bars above mentioned; said element being itself controlled by the keys above mentioned, and acting as an alternative to said keys; and (*e*) means, controlling what type-bar of the group shall be connected with the motor device aforesaid.

142. In a type-writing machine, and in combination, (*a*) a plurality of groups of type-bars; said type-bars striking to a common printing-center; (*b*) a single motor device, acting to impel all said type-bars, each type-bar as required; (*c*) keys, less in number than the groups of type-bars aforesaid, each of said keys controlling a different group of said type-bars and acting to cause some one of the type-bars of the group controlled by it to be connected with the motor device aforesaid; (*d*) an element, controlling one or more other type-bars striking to the same printing-center as the type-bars above mentioned; said element being itself controlled by the keys above mentioned and acting as an alternative to said keys, and (*e*) one or more other keys, controlling what type-bars of a group shall be connected with the motor device aforesaid.

143. In a type-writing machine, and in combination, (a) a plurality of groups of type-bars; said type-bars striking to a common printing-center; (b) a motor device, acting to impel all said type-bars, each type-bar as required; (c) finger-keys, less in number than the groups of type-bars aforesaid; said finger-keys each controlling a different group of said type-bars and acting to cause some one of the type-bars of the group controlled by it to be connected with the motor device aforesaid; (d) an element, controlling one or more other type-bars striking to the same printing-center as the other type-bars first above mentioned; said element being itself controlled by the keys above mentioned, and serving as an alternative to said keys; and (e) one or more thumb-keys, coacting with the finger-keys above mentioned to control what type-bar of the group controlled by the finger-key depressed shall be connected with the motor device aforesaid.

144. In combination, (A) a plurality of groups of character-corresponding devices; (B) a single motor device, serving to actuate all of said character-corresponding devices; each as required; and (C) double selective devices, acting both (a) to select what group of the character-corresponding devices aforesaid shall have one of its character-corresponding devices connected with the motor device aforesaid, and (d) to select what character-corresponding device in such group shall be connected with said motor device.

145. In combination, (A) a plurality of groups of character-corresponding devices; (B) a single motor device, serving to actuate all said character-corresponding devices, each as required; and (C) double selective devices acting both (a) to select what group of the character-corresponding devices aforesaid shall have one of its character-corresponding devices connected with the motor device aforesaid, and (b) to select what character-corresponding device in such group shall be connected with said motor device; said double selective devices including two groups of keys; the keys of one group controlling what group of the character-corresponding devices aforesaid shall have one of its character-corresponding devices connected with the motor device aforesaid; and the keys of the other group controlling what character-corresponding device in such group shall be connected with the motor device aforesaid.

146. In combination, (A) a plurality of groups of character-corresponding devices; (B) a single motor device, serving to actuate all of said character-corresponding devices, each as required; and (C) double selective devices, acting both (a) to select what group of the character-corresponding devices aforesaid shall have one of its character-corresponding devices connected with the motor device aforesaid; and (b) to select what character-corresponding device in such group shall be connected with said motor device; said double selective devices including finger-keys, controlling what group of the character-corresponding devices aforesaid shall have one of its character-corresponding devices connected with the motor device aforesaid; and one or more thumb-keys, controlling what character-corresponding device in such group shall be connected with said motor device.

147. In a type-writing machine, and in combination, (A) a plurality of groups of type-bars; said type-bars striking to a common printing-center; (B) a single motor device, acting to impel all said type-bars, each as required; and (C) double selective devices, acting both (a) to select what group of type-bars shall have one of its type-bars connected with the motor device aforesaid, and (b) to select what type-bar in such group shall be connected with said motor device.

148. In a type-writing machine, and in combination, (A) a plurality of groups of type-bars, said type-bars striking to a common printing-center; (B) a single motor device, acting to impel all said type-bars, each as required; and (C) double selective devices, acting both (a) to select what group of type-bars shall have one of its type-bars connected with the motor device aforesaid; and (b) to select what type-bar in such group shall be connected with said motor device; said double selective devices including two groups of keys; the keys of one group controlling what group of the type-bars aforesaid shall have one of its type-bars connected with the motor device aforesaid; and the keys of the other group controlling what type-bars in such group shall be connected with the motor device aforesaid; some or all of the keys aforesaid controlling also the motor device aforesaid.

149. In a type-writing machine, and in combination, (A) a plurality of groups of type-bars; said type-bars striking to a common printing-center; (B) a single motor device, acting to impel all of said type-bars, each as required; and (C) double selective devices, acting both (a) to select what group of type-bars shall have one of its type-bars connected with the motor device aforesaid, and (b) to select what type-bar in such group shall be connected with said motor device; said double selective devices including finger-keys, controlling what group of type-bars aforesaid shall have one of its type-bars connected with the motor device aforesaid, and one or more thumb-keys controlling what type-bars in such group shall be connected with said motor device; some or all of the keys aforesaid controlling the motor device aforesaid.

150. In combination, (A) a plurality of groups of character-corresponding devices; (B) a frame or lever, serving to give movement to all said character-corresponding devices, each as required; and (C) double selective devices, acting both (a) to select what group of the character-corresponding devices aforesaid shall have one of its number connected with the frame or lever aforesaid, and (b) to select what character-corresponding device in such group shall be connected with said frame or lever.

151. In combination, (A) a plurality of groups of character-corresponding devices; (B) a frame or lever, serving to give movement to all said character-corresponding devices, each as required; (C) double selective devices, acting both (a) to select what group of the character-corresponding devices aforesaid shall have one of its number connected with the frame or lever aforesaid and (b) to select what character-corresponding device in such group shall be connected with said frame or lever; said double selective devices including a plurality of keys, controlling what group of the character-corresponding devices aforesaid shall have one of its number connected with the frame or lever aforesaid, and one or more other keys, controlling what character-corresponding device in such group shall be connected with said frame or lever.

152. In combination, (A) a plurality of groups of character-corresponding devices; (B) a frame or lever, serving to give movement to all said character-corresponding devices, each as required; and (C) double selective devices, acting both (a) to select what group of the character-corresponding devices aforesaid shall have one of its number connected with the frame or lever aforesaid, and (b) to select what character-corresponding device in such group shall be connected with said frame or lever; said double selective devices including finger-keys controlling what group of the character-corresponding devices aforesaid shall have one of its number connected with the frame or lever aforesaid, and one or more thumb-keys controlling what character-corresponding device in such group shall be connected with said frame or lever.

153. In a type-writing machine and in combination, (A) a plurality of groups of type-bars, said type-bars striking to a common printing-center; (B) a frame or lever, serving to give movement to all said type-bars, each as required; and (C) double selective devices, acting both (a) to select what group of type-bars shall have one of its type-bars connected with the frame or lever aforesaid, and (b) to select what type-bar in such group shall be connected with said frame or lever.

154. In a type-writing machine, and in combination, (A) a plurality of groups of type-bars; said type-bars striking to a common printing-center; (B) a frame or lever, serving to give movement to all said type-bars, each as required; and (C) double selective devices, acting both (a) to select what group of type-bars shall have one of its type-bars connected with the frame or lever aforesaid, and (b) to select what type-bar in such group shall be connected with said frame or lever; said double selective devices including a plurality of keys, controlling what group of the type-bars aforesaid shall have one of its type-bars connected with the frame or lever aforesaid, and one or more other keys, controlling what type-bar in such group shall be connected with said frame or lever; some or all of the keys above mentioned controlling the frame or lever aforesaid.

155. In a type-writing machine and in combination, (a) a plurality of groups of type-bars; said type-bars striking to a common printing-center; (B) a frame or lever, serving to give movement to all said type-bars, each as required; and (C) double selective devices, acting both (a) to select what group of type-bars shall have one of its type-bars connected with the frame or lever aforesaid, and (b) to select what type-bar in such group shall be connected with said frame or lever; said double selective devices including finger-keys, controlling what group of the type-bars aforesaid shall have one of its type-bars connected with the frame or lever aforesaid, and one or more thumb-keys controlling what type-bar in such group shall be connected with said frame or lever; some or all of the keys aforesaid controlling the frame or lever aforesaid.

156. In a type-writing machine, and in combination, (a) a plurality of groups of type-bars; said type-bars striking to a common printing-center, (b) a frame or lever, serving to give movement to all said type-bars, each as required; (c) keys, each controlling a different group of the type-bars aforesaid, and acting, when depressed, to cause some one of the type-bars of said group to be connected with the frame or lever aforesaid; and (d) means controlling what type-bar of a group shall be connected with said frame or lever.

157. In a type-writing machine, and in combination, (a) a plurality of groups of type-bars; said type-bars striking to a common printing-center; (b) a frame or lever serving to give movement to all said type-bars, each as required; (c) keys, each controlling a different group of the type-bars aforesaid, and acting, when depressed, to cause some one of the type-bars of said group to be connected with the frame or lever aforesaid; and (d) means, operated by one or more other keys acting simultaneously with the keys aforesaid to control what type-bar of a group shall be connected with the motor device aforesaid.

158. In a type-writing machine, and in combination, (a) a plurality of groups of type-bars, said type-bars striking to a common printing-center; (b) a frame or lever, acting to give movement to all said type-bars, each type-bar as required; (c) a group of finger-keys, each controlling a different group of the type-bars aforesaid; and (d) one or more thumb-keys and means operated thereby, co-acting with the finger-keys to connect the type-bars aforesaid, each as required, with the frame or lever aforesaid; the finger-keys aforesaid acting, when depressed, to control what group of type-bars shall have one of its type-bars connected with the frame or lever aforesaid, and the thumb-key or thumb-keys acting to control what type-bar of such group shall be connected with said frame or lever.

In testimony whereof I have hereunto set my hand, at Washington, in the District of Columbia, this 19th day of June, A. D. 1897, in the presence of subscribing witnesses, whose names are hereunto affixed.

THADDEUS CAHILL.

Witnesses:
ARTHUR T. CAHILL,
GEO. F. CAHILL.